United States Patent
Keagy et al.

(10) Patent No.: US 8,468,535 B1
(45) Date of Patent: Jun. 18, 2013

(54) AUTOMATED SYSTEM AND METHOD TO PROVISION AND ALLOCATE HOSTING RESOURCES

(75) Inventors: John Martin Keagy, San Francisco, CA (US); Jeffery Carr, San Francisco, CA (US); Paul Lappas, San Francisco, CA (US)

(73) Assignee: Gogrid, LLC, San Francisco, CA (US)

( * ) Notice: Subject to any disclaimer, the term of this patent is extended or adjusted under 35 U.S.C. 154(b) by 1026 days.

(21) Appl. No.: 12/421,605

(22) Filed: Apr. 9, 2009

Related U.S. Application Data

(60) Provisional application No. 61/099,254, filed on Sep. 23, 2008, provisional application No. 61/140,838, filed on Dec. 24, 2008, provisional application No. 61/140,835, filed on Dec. 24, 2008, provisional application No. 61/145,962, filed on Jan. 20, 2009, provisional application No. 61/145,965, filed on Jan. 20, 2009, provisional application No. 61/159,437, filed on Mar. 11, 2009, provisional application No. 61/159,438, filed on Mar. 11, 2009, provisional application No. 61/165,900, filed on Apr. 1, 2009.

(51) Int. Cl.
 *G06F 9/50* (2006.01)
(52) U.S. Cl.
 USPC .............................................. 718/104; 718/1
(58) Field of Classification Search
 USPC ..................................................... 718/1, 104
 See application file for complete search history.

(56) References Cited

U.S. PATENT DOCUMENTS

| | | | |
|---|---|---|---|
| 6,529,784 B1 | 3/2003 | Cantos et al. | |
| 6,868,444 B1 | 3/2005 | Kim et al. | |
| 6,888,836 B1 | 5/2005 | Cherkasova | |
| 6,985,937 B1 | 1/2006 | Keshav et al. | |
| 7,080,378 B1 | 7/2006 | Noland et al. | |
| 7,146,482 B2 * | 12/2006 | Craddock et al. | 711/200 |
| 7,158,972 B2 * | 1/2007 | Marsland | 1/1 |
| 7,234,037 B2 * | 6/2007 | Errickson et al. | 711/202 |
| 7,257,811 B2 | 8/2007 | Hunt et al. | |
| 7,321,893 B1 | 1/2008 | Rambacher et al. | |
| 7,383,327 B1 | 6/2008 | Tormasov et al. | |
| 7,392,403 B1 | 6/2008 | Munetoh | |
| 7,398,471 B1 | 7/2008 | Rambacher et al. | |
| 7,512,815 B1 | 3/2009 | Munetoh | |
| 7,519,696 B2 | 4/2009 | Blumenau et al. | |

(Continued)

OTHER PUBLICATIONS

U.S. Appl. No. 11/834,761, filed Aug. 7, 2007, Lappas, Paul, et al.

(Continued)

*Primary Examiner* — Aimee Li
(74) *Attorney, Agent, or Firm* — Adeli & Tollen LLP

(57) ABSTRACT

Some embodiments provide a virtual machine hosting system. The virtual machine hosting system includes several nodes. Each node includes resources for hosting at least one virtual machine. The virtual machine hosting system includes a first management module for automatedly provisioning resources of the several to a several virtual machines by identifying a particular node with sufficient available resources to host a user-specified virtual machine configuration and by allocating to the virtual machine, an amount of resources of the particular node required to host said virtual machine. The virtual machine hosting system includes, at the particular node, a second management module for receiving the user-specified virtual machine configuration from the first management module and for configuring the allocated resources of the particular node to perform the virtual machine as specified within the user-specified virtual machine configuration.

13 Claims, 34 Drawing Sheets

U.S. PATENT DOCUMENTS

| | | | |
|---|---|---|---|
| 7,577,722 B1 | 8/2009 | Khandekar et al. | |
| 7,587,492 B2 | 9/2009 | Dyck et al. | |
| 7,649,851 B2 | 1/2010 | Takashige et al. | |
| 7,702,843 B1* | 4/2010 | Chen et al. | 711/6 |
| 7,716,446 B1* | 5/2010 | Chen et al. | 711/170 |
| 7,730,486 B2* | 6/2010 | Herington | 718/1 |
| 7,743,107 B2 | 6/2010 | Kovacs et al. | |
| 7,783,856 B2 | 8/2010 | Hashimoto et al. | |
| 7,802,251 B2 | 9/2010 | Kitamura | |
| 7,814,495 B1 | 10/2010 | Lim et al. | |
| 7,827,294 B2 | 11/2010 | Merkow et al. | |
| 7,843,821 B2 | 11/2010 | Kunhappan et al. | |
| 7,856,549 B2 | 12/2010 | Wheeler | |
| 7,865,893 B1 | 1/2011 | Omelyanchuk et al. | |
| 7,912,955 B1 | 3/2011 | Machiraju et al. | |
| 7,925,850 B1 | 4/2011 | Waldspurger et al. | |
| 7,941,470 B2 | 5/2011 | Le et al. | |
| 7,970,917 B2 | 6/2011 | Nakano et al. | |
| 7,996,835 B2* | 8/2011 | Griffith et al. | 718/1 |
| 8,001,247 B2* | 8/2011 | Salevan et al. | 709/226 |
| 8,006,079 B2 | 8/2011 | Goodson et al. | |
| 8,032,899 B2 | 10/2011 | Archer et al. | |
| 8,037,016 B2 | 10/2011 | Odulinski et al. | |
| 8,037,280 B2 | 10/2011 | Pandey et al. | |
| 8,046,694 B1 | 10/2011 | Lappas et al. | |
| 8,091,086 B1 | 1/2012 | Ershov et al. | |
| 8,095,662 B1 | 1/2012 | Lappas et al. | |
| 8,095,931 B1* | 1/2012 | Chen et al. | 718/104 |
| 8,117,495 B2 | 2/2012 | Graham et al. | |
| 8,171,115 B2 | 5/2012 | Hamilton et al. | |
| 8,184,631 B2 | 5/2012 | Kunhappan et al. | |
| 8,195,866 B2* | 6/2012 | Ginzton | 711/6 |
| 8,219,653 B1 | 7/2012 | Keagy et al. | |
| 8,280,790 B2 | 10/2012 | Lappas et al. | |
| 2003/0159028 A1 | 8/2003 | Mackin et al. | |
| 2004/0267897 A1 | 12/2004 | Hill et al. | |
| 2005/0038834 A1 | 2/2005 | Souder et al. | |
| 2005/0120160 A1 | 6/2005 | Plouffe et al. | |
| 2006/0089995 A1 | 4/2006 | Kerr et al. | |
| 2006/0136761 A1 | 6/2006 | Frasier et al. | |
| 2006/0155735 A1 | 7/2006 | Traut et al. | |
| 2006/0168224 A1 | 7/2006 | Midgley | |
| 2006/0174087 A1 | 8/2006 | Hashimoto et al. | |
| 2006/0184653 A1 | 8/2006 | van Riel | |
| 2006/0195715 A1 | 8/2006 | Herington | |
| 2006/0218544 A1 | 9/2006 | Chakraborty et al. | |
| 2006/0277542 A1 | 12/2006 | Wipfel | |
| 2007/0028239 A1 | 2/2007 | Dyck et al. | |
| 2007/0043860 A1* | 2/2007 | Pabari | 709/224 |
| 2007/0050763 A1 | 3/2007 | Kagan et al. | |
| 2007/0101334 A1* | 5/2007 | Atyam et al. | 718/102 |
| 2007/0174429 A1 | 7/2007 | Mazzaferri et al. | |
| 2007/0233838 A1 | 10/2007 | Takamoto et al. | |
| 2007/0234302 A1 | 10/2007 | Suzuki et al. | |
| 2007/0240160 A1 | 10/2007 | Paterson-Jones et al. | |
| 2007/0250608 A1 | 10/2007 | Watt | |
| 2007/0260721 A1 | 11/2007 | Bose et al. | |
| 2007/0266433 A1 | 11/2007 | Moore | |
| 2007/0283348 A1 | 12/2007 | White | |
| 2007/0297428 A1 | 12/2007 | Bose et al. | |
| 2008/0033902 A1 | 2/2008 | Glaizel et al. | |
| 2008/0049786 A1 | 2/2008 | Ram et al. | |
| 2008/0059556 A1 | 3/2008 | Greenspan et al. | |
| 2008/0065854 A1 | 3/2008 | Schoenberg et al. | |
| 2008/0086726 A1 | 4/2008 | Griffith et al. | |
| 2008/0104608 A1 | 5/2008 | Hyser et al. | |
| 2008/0201414 A1 | 8/2008 | Amir Husain et al. | |
| 2008/0244600 A1 | 10/2008 | Wong et al. | |
| 2008/0301674 A1* | 12/2008 | Faus | 718/1 |
| 2009/0037680 A1 | 2/2009 | Colbert et al. | |
| 2009/0049453 A1 | 2/2009 | Baran et al. | |
| 2009/0051492 A1* | 2/2009 | Diaz et al. | 340/10.1 |
| 2009/0063750 A1 | 3/2009 | Dow | |
| 2009/0089781 A1 | 4/2009 | Shingai et al. | |
| 2009/0164990 A1 | 6/2009 | Ben-Yehuda et al. | |
| 2009/0172662 A1 | 7/2009 | Liu | |
| 2009/0182605 A1 | 7/2009 | Lappas et al. | |
| 2009/0228883 A1 | 9/2009 | Gebhart et al. | |
| 2009/0235067 A1 | 9/2009 | Miller et al. | |
| 2009/0300210 A1* | 12/2009 | Ferris | 709/235 |
| 2009/0300607 A1 | 12/2009 | Ferris | |
| 2010/0011178 A1 | 1/2010 | Feathergill | |
| 2010/0046546 A1 | 2/2010 | Ram et al. | |
| 2010/0058106 A1* | 3/2010 | Srinivasan et al. | 714/2 |
| 2010/0070970 A1 | 3/2010 | Hu et al. | |
| 2010/0070978 A1 | 3/2010 | Chawla et al. | |
| 2010/0082799 A1 | 4/2010 | DeHaan et al. | |
| 2010/0114825 A1 | 5/2010 | Siddegowda | |
| 2010/0138828 A1 | 6/2010 | Hanquez et al. | |
| 2010/0235831 A1 | 9/2010 | Dittmer | |
| 2011/0004676 A1 | 1/2011 | Kawato | |
| 2011/0153697 A1 | 6/2011 | Nickolov et al. | |
| 2012/0185852 A1 | 7/2012 | Scales et al. | |

OTHER PUBLICATIONS

U.S. Appl. No. 11/834,768, filed Aug. 7, 2007, Lappas, Paul, et al.
U.S. Appl. No. 11/834,722, filed Aug. 7, 2007, Lappas, Paul, et al.
U.S. Appl. No. 11/834,726, filed Aug. 7, 2007, Lappas, Paul, et al.
U.S. Appl. No. 11/834,732, filed Aug. 7, 2007, Lappas, Paul, et al.
U.S. Appl. No. 12/185,774, filed Aug. 4, 2008, Lappas, Paul, et al.
U.S. Appl. No. 12/421,597, filed Apr. 9, 2009, Keagy, John Martin, et al.
U.S. Appl. No. 12/421,598, filed Apr. 9, 2009, Keagy, John Martin, et al.
U.S. Appl. No. 12/421,599, filed Apr. 9, 2009, Keagy, John Martin, et al.
U.S. Appl. No. 12/421,602, filed Apr. 9, 2009, Keagy, John Martin, et al.
U.S. Appl. No. 12/421,604, filed Apr. 9, 2009, Keagy, John Martin, et al.
U.S. Appl. No. 12/421,608, filed Apr. 9, 2009, Keagy, John Martin, et al.
U.S. Appl. No. 12/421,610, filed Apr. 9, 2009, Keagy, John Martin, et al.
U.S. Appl. No. 12/421,611, filed Apr. 9, 2009, Keagy, John Martin, et al.
U.S. Appl. No. 12/421,612, filed Apr. 9, 2009, Keagy, John Martin, et al.
U.S. Appl. No. 12/421,613, filed Apr. 9, 2009, Keagy, John Martin, et al.
U.S. Appl. No. 12/421,614, filed Apr. 9, 2009, Keagy, John Martin, et al.
Amazon Elastic Compute Cloud (Amazon EC2)—Limited Beta, Amazon Web Services, Jul. 2007 (web page archive date from web.archive.org), http://web.archive.org/web/20070705164650rn_2/www.amazon.com/b?ie=UTF8&node=201590011, Amazon.Com, Inc.
Amazon Elastic Compute Cloud (Amazon EC2)—Limited Beta FAQs, Amazon Web Services, Jul. 2007 (web page archive date from web.archive.org), http://web.archive.org/web/20070621080008/www.amazon.com/b?ie=UTF8&node=201591011, Amazon.Com, Inc.
Amazon EC2: Developer Guide (API Version Jun. 26, 2006), 2006 (Month NA), Amazon.Com, Inc.
Amazon EC2: Developer Guide (API Version Oct. 1, 2006), 2006 (Month NA), Amazon.Com, Inc.
Amazon EC2: Developer Guide (API Version Jan. 3, 2007), 2007 (Month NA), Amazon.Com, Inc.
Amazon EC2: Developer Guide (API Version Jan. 19, 2007), 2006 (Month NA), Amazon.Com, Inc.
Amazon EC2: Developer Guide (API Version Mar. 1, 2007), 2007 (Month NA), Amazon.Com, Inc.
Amazon EC2: Developer Guide (API Version Aug. 29, 2007), 2007 (Month NA), Amazon Web Services LLC.
The first grid operating system that runs and scales existing web applications, Jun. 2006 (web page archive date from web.archive.org), http://web.archive.org/web/20060627045727/www.3tera.com/, 3TERA, Inc.

Utility Computing—he easy way to run and scale online applications, Jul. 2007 (web page archive date from web.archive.org), http://web.archive.org/web/20070718011012/www.3tera.com/, 3TERA, Inc.

AppLogic 2.0—What's new, Jul. 2007 (web page archive date from web.archive.org), http://web.archive.org/web/20070701182957/www.3tera.com/applogic20.html, 3TERA, Inc.

AppLogic Overview, Jul. 2007 (web page archive date from web.archive.org), http://web.archive.org/web/20070701161932/www.3tera.com/applogic.html, 3TERA, Inc.

AppLogic Usage, Jul. 2007 (web page archive date from web.archive.org), http://web.archive.org/web/20070712042731/www.3tera.com/applogic-usage.html, 3TERA, Inc.

AppLogic User Interface, Jul. 2007 (web page archive date from web.archive.org), http://web.archive.org/web/20070704235539/www.3tera.com/applogic-ui.html, 3TERA,Inc.

AppLogic Hardware Configuration, Jul. 2007 (web page archive date from web.archive.org), http://web.archive.org/web/20070707062814/www.3tera.com/applogic-hw.html, 3TERA, inc.

AppLogic Features, Jul. 2007 (web page archive date from web.archive.org), http://web.archive.org/web/20070630051607/www.3tera.com/applogic-features.html, 3TERA, inc.

AppLogic—Application Monitoring, Jul. 2007 (web page archive date from web.archive.org), http://web.archive.org/web/20070629035849/www.3tera.com/applogic-monitor.html, 3TERA, inc.

AppLogic Users, Jul. 2007 (web page archive date from web.archive.org), http://web.archive.org/web/20070630061258/www.3tera.com/applogic-users.html, 3TERA, inc.

AppLogic 2.0 Beta Program, Jul. 2007 (web page archive date from web.archive.org), http://web.archive.org/web/20070701162528/www.3tera.com/applogic20beta.html, 3TERA, inc.

3TERA—Press Release: 3Tera adds Application Monitoring of Multi-CPU Scalability to AppLogic Utility Computing Platform for SaaS and Web 2.0 Customers, May 24, 2007, http://www.3tera.com/News/Press-Releases/Archive/3Tera-adds-Application-Monitoring-and-Multi-CPU-Scalability-to-AppLogic.php, 3TERA, Inc.

Introduction to VMware Infrastructure: ESX Server 3.5, ESX Server 3i version 3.5, VirtualCenter 2.5, Dec. 2007, Revision: 20071213, VMware, Inc., Palo Alto, CA.

iSCSI SAN Configuration Guide: ESX Server 3.5, ESX Server 3i version 3.5, VirtualCenter 2.5, Nov. 2007, Revision: 20071129, VMware, Inc., Palo Alto, CA.

VMware Infrastructure 3 Primer: ESX Server 3.5, ESX Server 3i version 3.5, VirtualCenter 2.5, Nov. 2007, Revision: 20071129, VMware, Inc., Palo Alto, CA.

U.S. Appl. No. 13/481,762, filed May 25, 2012, Keagy, John Martin, et al.

U.S. Appl. No. 13/607,642, filed Sep. 7, 2012, Lappas, Paul, et al.

Updated portions of prosecution history of U.S. Appl. No. 12/421,597, Oct. 25, 2012, Keagy, John Martin, et al.

Updated portions of prosecution history of U.S. Appl. No. 12/421,598, Sep. 10, 2012, Keagy, John Martin, et al.

Updated portions of prosecution history of U.S. Appl. No. 12/421,599, Aug. 3, 2012, Keagy, John Martin, et al.

Updated portions of prosecution history of U.S. Appl. No. 12/421,602, Sep. 13, 2012, Keagy, John Martin, et al.

Updated portions of prosecution history of U.S. Appl. No. 12/421,608, Oct. 5, 2012, Keagy, John Martin, et al.

Author Unknown, "VMware Introduces New Release of Its Powerful Desktop Virtualization Software," Sep. 12, 2005, 3 pages, PR Newswire Association LLC, New York, USA.

Portions of prosecution history of U.S. Appl. No. 12/421,597, Feb. 18, 2011, Keagy, John Martin, et al.

Portions of prosecution history of U.S. Appl. No. 12/421,598, Jun. 14, 2011, Keagy, John Martin, et al.

Portions of prosecution history of U.S. Appl. No. 12/421,599, Oct. 20, 2009, Keagy, John Martin, et al.

Portions of prosecution history of U.S. Appl. No. 12/421,602, Oct. 20, 2009, Keagy, John Martin, et al.

Portions of prosecution history of U.S. Appl. No. 12/421,604, Jun. 15, 2011, Keagy, John Martin, et al.

Portions of prosecution history of U.S. Appl. No. 12/421,608, Oct. 20, 2009, Keagy, John Martin, et al.

U.S. Appl. No. 12/982,487, filed Dec. 30, 2010, Lappas, Paul, et al.

U.S. Appl. No. 13/225,372, filed Sep. 2, 2011, Lappas, Paul, et al.

U.S. Appl. No. 13/316,431, Dec. 9, 2011, Lappas, Paul, et al.

Updated portions of prosecution history of U.S. Appl. No. 12/421,597, Oct. 26, 2011, Keagy, John Martin, et al.

Updated portions of prosecution history of U.S. Appl. No. 12/421,598, Dec. 15, 2011, Keagy, John Martin, et al.

Updated portions of prosecution history of U.S. Appl. No. 12/421,602, Oct. 4, 2011, Keagy, John Martin, et al.

Updated portions of prosecution history of U.S. Appl. No. 12,421,604, Dec. 6, 2011, Keagy John Martin et al.

Updated portions of prosecution history of U.S. Appl. No. 12/421,597, Jan. 23, 2012, Keagy, John Martin, et al.

Updated portions of prosecution history of U.S. Appl. No. 12/421,602, Mar. 15, 2012, Keagy, John Martin, et al.

U.S. Appl. No. 12/652,730, filed Jan. 5, 2010, Lappas, Paul, et al.

Updated portions of prosecution history of U.S. Appl. No. 12/421,597, Jul. 18, 2011, Keagy, John Martin, et al.

Updated portions of prosecution history of U.S. Appl. No. 12/421,604, Jul. 13, 2011, Keagy, John Martin, et al.

* cited by examiner

1: hostname will be 16323_730_5756
2: image will be windows/purexen/windows_2003_ent_32_gold_iis6.suse.ready.gz
3: password will be set to 68fdb984
4: RUN: ssh node20 /home/bin/uvm.pl clean
5: RUN: ssh node20 /home/bin/create_drive '16323_730_5756' 60
6: lvcreate -n '16323_730_5756' -L 60G vg1
7: xm block-attach uvm 'phy:/dev/vg1/16323_730_5756' /dev/hdc w
8: RUN: ssh uvm20 /home/bin/install.pl
9: RUNNING: gzip -d –stdout
10: /home/gold/windows/purexen
11: windows_2003_ent_32_gold_iis6.suse.ready.gz | dd of=/dev/hdc bs=10M
12: 46+117448 records in
13: 46+117448 records out
14: 5368709120 bytes (5.4 GB) copied, 56.5239 s, 95.0 MB/s
15: Disk /dev/hdc: 64.4GB
16: Sector size (logical/physical): 512B/512B
17: Partition Table: msdos
18: Number  Start   End     Size    Type    File system  Flags
19:  1      32.3kB  5355MB  5355MB  primary ntfs         boot
20: RUNNING: parted --script /dev/hdc rm 1
21: RUNNING: parted --script /dev/hdc mkpart primary ntfs 32.3k 64.4GB
22: RUNNING: parted --script /dev/hdc set 1 boot on
23: RUNNING: cat /proc/partitions
24: RUNNING: ntfsfix /dev/hdc1
25: Mounting volume... OK
26: Processing of $MFT and $MFTMirr completed successfully.
27: NTFS partition /dev/hdc1 was processed successfully.
28: RUN: ntfsresize -f /dev/hdc1 -f
29: ntfsresize v2.0.0 (libntfs 10:0:0)
30: Device name        : /dev/hdc1
31: Cluster size       : 4096 bytes
32: Current volume size: 5354623488 bytes (5355 MB)
33: Current device size: 64420360704 bytes (64421 MB)
34: New volume size    : 64420356608 bytes (64421 MB)
35: Checking filesystem consistency ...
36: Accounting clusters ...
37: Collecting resizing constraints ...
38: Schedule chkdsk for NTFS consistency check at Windows boot time ...
39: Updating $BadClust file ...
40: Updating $Bitmap file ...
41: Updating Boot record ...
42: Syncing device ...
43: Successfully resized NTFS on device '/dev/hdc1'.
44: RUN: ssh node20 /home/bin/create_xen_cfg
45: RUN: ssh node20 /home/bin/uvm.pl clean

*Figure 24*

AUTOMATED SYSTEM AND METHOD TO PROVISION AND ALLOCATE HOSTING RESOURCES

CLAIM OF BENEFIT TO PRIOR APPLICATION

This patent application claims the benefit of the U.S. Provisional Patent Application 61/099,254, entitled "System and Method for Automated Allocation and Configuration of Hosted Services", filed Sep. 23, 2008, the U.S. Provisional Patent Application 61/140,838, entitled "System and Method for Automated Allocation and Configuration of Hosted Services", filed Dec. 24, 2008, the U.S. Provisional Patent Application 61/140,835, entitled "Method and Apparatus for Adapting and Hosting a Configuration of a Computer System", filed Dec. 24, 2008, the U.S. Provisional Patent Application 61/145,962, entitled "System and Method for Automated Allocation and Configuration of Hosted Services", filed Jan. 20, 2009, the U.S. Provisional Patent Application 61/145,965, entitled "Method and Apparatus for Adapting and Hosting a Configuration of a Computer System", filed Jan. 20, 2009, the U.S. Provisional Patent Application 61/159,437, entitled "System and Method for Automated Allocation and Configuration of Hosted Services", filed Mar. 11, 2009, the U.S. Provisional Patent Application 61/159,438, entitled "Method and Apparatus for Adapting and Hosting a Configuration of a Computer System", filed Mar. 11, 2009, and the U.S. Provisional Patent Application 61/165,900, entitled "System and Method for Automated Allocation and Configuration of Hosted Services", filed Apr. 1, 2009. All of the above enumerated Provisional Patent Applications are incorporated herein by reference.

CROSS REFERENCE TO RELATED APPLICATIONS

This Application is related to the following applications: U.S. patent application Ser. No. 12/421,597, entitled "System and Method for Automated Allocation of Hosting Resources Controlled by Different Hypervisors", filed Apr. 9, 2009; U.S. patent application Ser. No. 12/421,598, entitled "System and Method for Monitoring a Grid of Hosting Resources in Order to Facilitate Management of the Hosting Resources", filed Apr. 9, 2009; U.S. patent application Ser. No. 12/421,599, entitled "System and Method for Automated Criteria Based Deployment of Virtual Machines Across a Grid of Hosting Resources", filed Apr. 9, 2009; U.S. patent application Ser. No. 12/421,602, entitled "System and Method for Automated Configuration of Hosting Resources", filed Apr. 9, 2009; U.S. patent application Ser. No. 12/421,604, entitled "Automated System and Method to Customize and Install Virtual Machine Configurations for Hosting in a Hosting Environment", filed Apr. 9, 2009; and U.S. patent application Ser. No. 12/421,608, entitled "Automated System and Method for Managing Hosting Resources", filed Apr. 9, 2009.

FIELD OF THE INVENTION

The present invention relates to virtualized hosting services.

BACKGROUND OF THE INVENTION

Hosting services provide a means whereby multiple users can implement custom server configurations without the overhead costs associated with purchasing, upgrading, and maintaining equipment needed to implement the configuration. Instead, a hosting service provider maintains and provisions a grid of hardware nodes that are shared amongst the multiple users. More specifically, resources of a single node can be partitioned and each of these partitions can be allocated to host a virtual server configuration of a different user.

Each hardware node in the grid includes one or more processing units (e.g., a CPU, multiple CPUs, CPUs with multiple processing cores, ASICs, graphics processing units, etc.), memory, block devices (e.g., disk storage devices), networking capabilities, and other such computing resources that often exceed the computing resources required by any single user's server configuration. By partitioning the resources of a hardware node amongst multiple server configurations, a hosting service provider minimizes the amount of hardware needed to host all such server configurations, while maximizing the usage of the available hardware.

Virtualization provides the means for partitioning the hardware resources amongst the multiple server configurations. Virtualization creates the façade that each server configuration is individually hosted on dedicated equipment with a particular set of resources. Two or more server configurations are provided non-conflicting sets of resources of the same hardware node such that a guaranteed amount of processing resources is available to each such configuration. In other words, a single physical resource is partitioned to operate as multiple logical resources.

As shown in FIG. 1, virtualization allows a single computing device 110 the ability to function as two or more different computing devices with each device having distinct sets of hardware resources and software resources. For instance, configuration 120 may be allocated 40% of the memory and 80% of the processor cycles of the device 110 and configuration 130 may be allocated the remaining 60% of the memory and 20% of the processor cycles of the device 110. Additionally, the configuration 120 may operate using a first operating system with a first set of configuration parameters and the configuration 130 may operate using a second operating system with a second set of configuration parameters.

An added benefit of virtualization is that a failure in one configuration does not disrupt the operation of the other configurations, even though all such configurations operate over physical resources of a single device. With reference to FIG. 1, should the configuration 120 crash due to an improper configuration of the operating system, the configuration 130 will continue operating unhindered as the resources used by each configuration 120 or configuration 130 operate independent of one another.

At the core of each virtualization solution is the hypervisor. The hypervisor, also referred to as the virtual machine monitor, manages a logical partitioning of a physical set of hardware resources of a physical device or node between different virtualized guests. Each virtualized guest implements one or more virtual machines over a logical partition. The hypervisor partitions underlying hardware resources such that each virtual machine is provided what logically appears as a distinct and unshared set of hardware resources. However, the hypervisor maps the virtual machine hardware calls to a corresponding subset of physical hardware resources that are actually shared by all virtual machines operating on a particular hardware node. The hypervisor is thus responsible for mapping the hardware resources of a node to a set of virtual resources. The set of virtual resources can then be distributed independently to one or more operating systems or applications that together form the one or more virtual machines. In this manner, each virtual machine effectively is provided its own resources (e.g., a processor, memory, disk storage, networking, etc.), and the operating system of each virtual machine operates with little to no change over the provided set of resources.

Different vendors implement hypervisors differently (e.g., Xen®, Parallels®, VMware®, Kernel Virtual Machine® (KVM), etc.). Two prominent hypervisor types are defined as "type 1" hypervisors and "type 2" hypervisors. FIG. 2 illustrates a type 1 hypervisor 210 of a prior art virtualization implementation. In this figure, the type 1 hypervisor 210, is located at a layer below domain 0 (Dom0) 225, where Dom0 225 is the first domain or virtual machine started by the hypervisor on boot. Other virtual machines that execute one or more different guest operating systems and one or more applications in conjunction with the type 1 hypervisor 210 are enumerated as Dom1 through DomN 230.

As shown, the type 1 hypervisor 210 is located between the various Doms and the hardware resources 220. The type 1 hypervisor 210 controls access to the hardware resources 220. Accordingly, there is only a single layer of abstraction between the type 1 hypervisor 210 and the hardware resources 220.

FIG. 3 illustrates a type 2 hypervisor 310 with a host operating system (OS) as Dom0 320. The host OS at Dom0 320 operates at a layer between the type 2 hypervisor 310 and the hardware resources 330. In this configuration, Dom0 320 is provided special access to the hardware resources 220 while Doms 1-n are unprivileged domains that by default are not provided direct access to the hardware. In this figure, there are two layers of abstraction between the type 2 hypervisor 310 and the hardware resources 330 since the host OS 320 directly controls the hardware resources 330 of the electronic device. Therefore, the type 2 hypervisor 310 utilizes a combination of host OS calls and direct hardware calls to facilitate the logical partitioning of the hardware resources 330 of the electronic device in order to allow for the simultaneous and non-conflicting operation of multiple virtual machines represented as Doms 1-n 340.

In some instances, a type 1 hypervisor more efficiently performs a set of operations issued by a virtual machine over the hardware resources of a node than a type 2 hypervisor. In other instances, a type 2 hypervisor more efficiently performs the set of operations issued by the virtual machine over the hardware resources of a node than a type 1 hypervisor. Each virtualization vendor may implement type 1, type 2, or other hypervisor types differently from other vendors. Each particular vendor may utilize a distinct application programming interface (API) with a distinct set of commands in order to provide virtualization. Therefore, even hypervisors of the same type that are implemented differently by different vendors may have different performance parameters.

Even though current virtualization solutions (i.e., hypervisors) allow hosting service providers the ability to better utilize their hardware resources on individual nodes, these solutions nevertheless lack the functionality needed to create a diverse multi-node hosting service grid operable with multiple different hypervisors. Each hypervisor of the prior art virtualization solutions operates independent of other hypervisors and other nodes. The calls and interfaces of the various hypervisors are not cross-compatible. Therefore, a hosting service is unable to provide a unified grid of nodes that leverages the flexibility and efficiencies of each of the various different hypervisor implementations.

FIG. 4 illustrates proprietary hypervisor managers 410 and 420 implemented by some prior art virtualization solutions to automate the interaction with one or more hypervisors 430 and 440 across the node grid 450. As noted above, these proprietary hypervisor managers 410 and 420 only interface with a single hypervisor from a single virtualization software provider. Therefore, each proprietary manager 410 and 420 is administered separately from the others. Such separate administration partitions the node grid 450 rather than unifies the grid. Additionally, such separate administration does not provide a unified view of the resources of the grid. Instead, each proprietary manager provides a disjointed view that makes it difficult to monitor the grid resource usage and availability of resources over the entire grid of nodes.

A further shortcoming of current virtualization solutions is that the hypervisor and other virtualization components do not provide custom software configurations to automatedly tailor a virtual server configuration per user specifications. In fact, the goal of most hypervisors is to permit the independent operation of the virtual machine such that the virtual machine is wholly unaware of the virtualization occurring underneath. Current hypervisors avoid accessing and modifying the file system of the virtual machine. Accordingly, current hypervisors circumvent the ability to provide automated hosting, requiring system administrators to manually establish and deploy virtual machine configurations.

To attempt to alleviate this issue, some hosting service providers employ a grid management system to retrieve and copy static software images from an image store to the resources allocated for the virtual machine configuration. However, this manner of configuration restricts the ability of hosting service providers to customize the configurations. Specifically, a static set of configurations are available and a "one-size-fits-all" approach is taken to satisfy the requirements of multiple different users. Therefore, after each install, a system operator manually accesses each virtual machine in order to adjust the configurations to create the modified or custom configuration. Such manual operation increases the time needed to deploy a virtual machine configuration and increases the costs associated therewith. For example, the virtual machines are only deployed when a system administrator is present and after the system administrator performs the manual customization to the configuration.

FIG. 5 presents an illustration of a prior art grid management system 510 that copies static software images 520-540 to configure sets of allocated resources on multiple hardware nodes 550-570. In this figure, the grid management system 510 retrieves a static image 520 from an image store 580 and applies the image 520 as retrieved to an allocated set of resources for a virtual machine on node 570. To customize the configuration according to a particular user's specifications, a system operator manually customizes the configuration per the user's specifications.

FIG. 5 illustrates still another shortcoming of current virtualization solutions and the grid management system 510 utilized by some hosting service providers. In this figure, the grid management system 510 becomes a bottleneck within the hosting service system. The grid management system 510 is the central point through which all virtual machines on all nodes are configured. As such, each image for configuring each virtual machine first passes through the grid management system 510 before reaching the corresponding node. This causes the nodes to compete for the input/output resources of the grid management system 510. For large configurations or for periods of high traffic volume, the effectiveness of the grid is compromised as delays arise during the configuration of a virtual machine.

Accordingly, there is a need to provide a more robust, automated, efficient, and synergized virtualization solution for multi-node hosting services. Such a virtualization solution should operate over multiple hardware nodes in order to optimally distribute the resources of the multiple nodes amongst multiple different virtual machine configurations irrespective of the hypervisors operating on each node. There is further a need for such a virtualization solution to automatedly custom configure partitioned resources without manual user intervention based on user-specified parameters for a virtual machine configuration irrespective of the quality or quantity of user customization.

SUMMARY OF THE INVENTION

Some embodiments provide a hosting system and method for automatedly distributing, configuring, and managing virtual machines across a group of hardware nodes where at least two nodes in the group of nodes are controlled by different hypervisors. The different hypervisors include hypervisors of different types (e.g., type 1, type 2, etc.) and/or different vendor implementations. In some embodiments, the automated hosting system includes a (1) hypervisor management module and/or a (2) utility management module to implement the hosting functionality.

The hypervisor management module of some embodiments manages the nodes and the various virtual machines operating on the nodes with the different hypervisors. The hypervisor management module normalizes the messaging for each of the distinct hypervisors so that there is a uniform set of control messages and provisioning messages to control the allocation and operation of the virtual machines operating across the nodes irrespective of the hypervisors operating on the nodes. The hypervisor management module uses various application programming interfaces (APIs) to convert the normalized set of control messages and provisioning messages to the particular control messages and provisioning messages that are specific to the hypervisor of each target node. In this manner, the hypervisor management module provides a multi-tenancy solution whereby each node and the hypervisor of the node is a tenant managed by the hypervisor management module.

In the multi-tenancy hosting system of some embodiments, the hypervisor management module stores a mapping that identifies the location of each virtual machine to the one or more nodes hosting the virtual machine and the corresponding hypervisors operating on each such node. The hypervisor management module then formats the messages so that they are executable by the hypervisor at the node. The hypervisor management module issues provisioning messages to the various hypervisors in order to allocate resources needed to deploy a virtual machine configuration at one or more nodes. For example, the hypervisor management module issues messages to create, delete, or copy virtual machines to and from the nodes. The hypervisor management module issues control messages to the various hypervisors in order to start, stop, resume, reboot, take a snapshot, restore to a snapshot, report statistics, save an image, or migrate any virtual machine at any node irrespective of the hypervisor operating at the node.

The hypervisor management module of some embodiments generates the mapping of the virtual machines across the nodes and a mapping of the used and unused resources for the entire grid of nodes by monitoring the operation of the virtual machines, hypervisors, and nodes within the grid of nodes. The hypervisor management module provides such functionality by interfacing with two or more distinct virtualization hypervisors operating on two or more hardware nodes. Through the interface, the hypervisor management module is able to determine the availability of resources (e.g., CPU cycles, available memory, block input/output, network traffic, etc.) on each node in the group of nodes.

In some embodiments, the hypervisor management module retrieves the data from the hypervisors operating on the nodes. In other embodiments, the hypervisor management module bypasses the virtualization hypervisors operating on the nodes and directly retrieves usage and availability data from the hardware resources and/or virtual machines of each node directly. In still other embodiments, the hypervisor management module retrieves some usage data from the hypervisors while retrieving other data directly from the hardware resources of the nodes. The data is normalized to create the unified view of the resource usage and the availability of all hosting resources for all nodes in the group of nodes.

By storing and combining the resources from each node, the hypervisor management module of some embodiments creates a unified view for the used and unused resources of the group of nodes. In this manner, the hypervisor management module seamlessly merges resources from physically separate hardware nodes that operate using incompatible hypervisors to create a single logical amalgamation of resources irrespective of the hypervisor type or vendor implementation. Scheduling and deployment decisions for additional virtual machines are based on this unified view.

The hypervisor management module of some embodiments utilizes the unified view of the group of nodes within the grid to facilitate the efficient deployment of virtual machines across the nodes. The efficient deployment of virtual machines across the nodes includes identifying and allocating resources of (1) underutilized nodes or (2) nodes that are more optimal to host a virtual machine relative to another node based on resources of the node (e.g., hardware resources and hypervisor efficiency). Accordingly, the hypervisor management module controls and manages this efficient deployment of the virtual machines across the group of nodes without user intervention in order to fully maximize the usage of the resources while optimizing the performance of each virtual machine based on the performance advantages of each hypervisor operating across the nodes and the available resources of the nodes.

In some embodiments, the hypervisor management module, using the various messages, tasks the utility management modules of the corresponding nodes to custom configure the allocated resources once the hardware resources have been allocated. The utility management modules custom configure the allocated resources based on a user's specified virtual machine configuration. In some embodiments, the hypervisor management module instantiates each of the utility management modules. In some such embodiments, the hypervisor management module instantiates a utility management module by directing the utility management modules to mount a remote file system containing one or more scripts. The hypervisor management module then identifies one or more of the scripts to be executed locally by the utility management module on a particular node at which the utility management module operates. These scripts direct the utility management module to perform specific tasks on the particular node that assist in the automated configuration of one or more user virtual machines on the particular node as each utility management module is responsible for configuring the hardware resources allocated for a particular virtual machine configuration on a particular node.

To configure the resources, the utility management module identifies (1) an operating system (OS) image from an OS image store and (2) application images from an application image store that collectively provide the software resources specified within the user virtual machine configuration. The utility management module of some embodiments retrieves compressed images of the various OS and software applications from the image stores. Since each utility management module retrieves the images required for the virtual machines on its corresponding node, some embodiments remove the bottleneck associated with a central image retrieval solution that retrieves images for all nodes of the grid of nodes. The utility management module then decompresses the retrieved images locally on the node. In this manner, the utility management module only transfers data from the image stores that is needed for a particular virtual machine configuration while preserving block input/output (e.g., input/output bandwidth). In some embodiments, the utility management module modifies the retrieved images based on the specified parameters within the virtual machine configuration. The utility management module directly accesses the file system allocated to the virtual machine and applies (e.g., partitions, formats, installs, etc.) the customized images to the provisioned resources of the virtual machine configuration in order to instantiate or modify a virtual machine configuration.

The utility management module of some embodiments securely deletes virtual machine configurations operating on a particular node by accessing the file system allocated for the virtual machine configuration and securely deleting the data from the file system. Some embodiments securely delete the data by writing random data to the file system. Some embodiment securely delete the data by zeroing out all storage bits of the disk storage previously allocated for use by the virtual machine.

The utility management module of some embodiments encrypts the virtual machine configuration. Such encryption provides an added layer of security to prevent a configuration error or other software bug from being exploited by one virtual machine that attempts to access the block device or file systems of other virtual machines operating on the same or other nodes. Additionally, the utility management module facilitates the migration of virtual machines from one node to another node when instructed by the hypervisor management module. In such instances, the utility management module of a first node passes virtual machine configuration data directly to a second node within the group of nodes such that the virtual machine configuration may be instantiated on the second node. The configuration is then deleted from the first node by the utility management module.

BRIEF DESCRIPTION OF THE DRAWINGS

The novel features of the invention are set forth in the appended claims. However, for purpose of explanation, several embodiments of the invention are set forth in the following figures.

FIG. 24 illustrates an exemplary set of operations performed by a utility management module of some embodiments to modify a configuration.

DETAILED DESCRIPTION OF THE INVENTION

Figure 1:
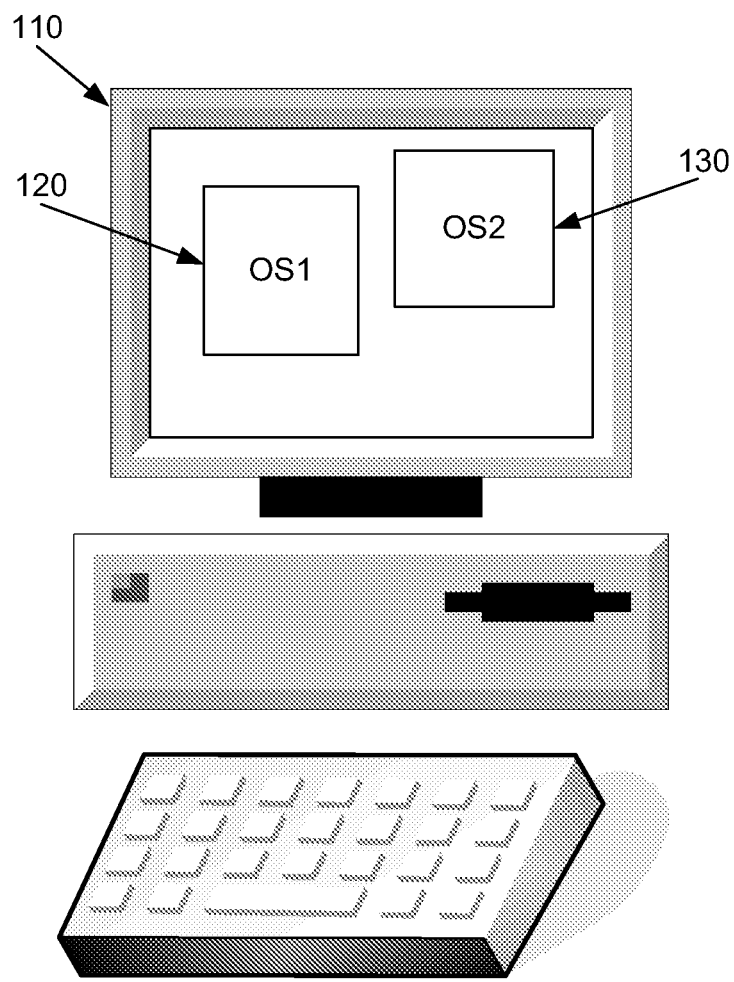
FIG. 1 illustrates a single computing device running virtualization in order to function as two or more different computing devices with each device having distinct sets of hardware and software resources.
Figure 2:
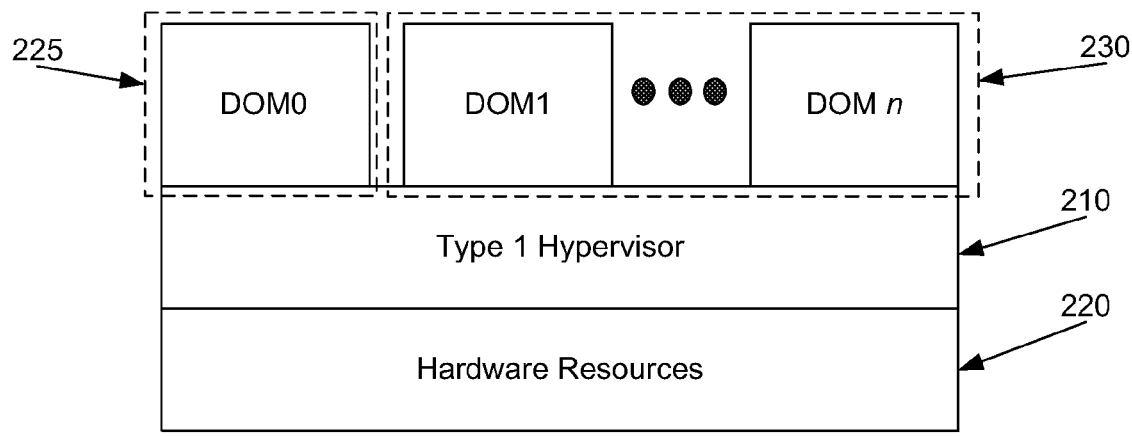
FIG. 2 illustrates a type 1 hypervisor of a prior art virtualization implementation.
Figure 3:
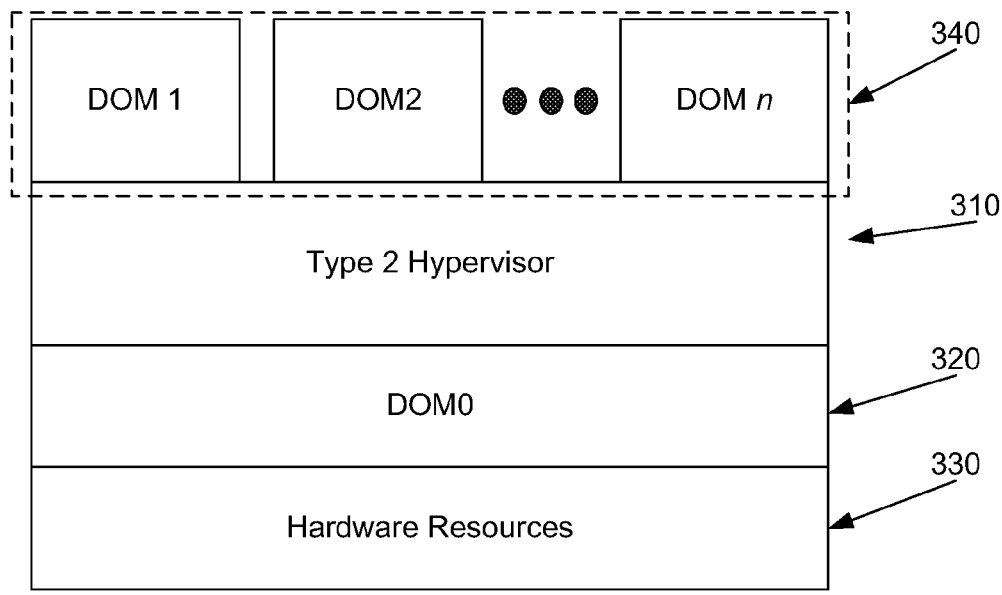
FIG. 3 illustrates a type 2 hypervisor of a prior art virtualization implementation.
Figure 4:
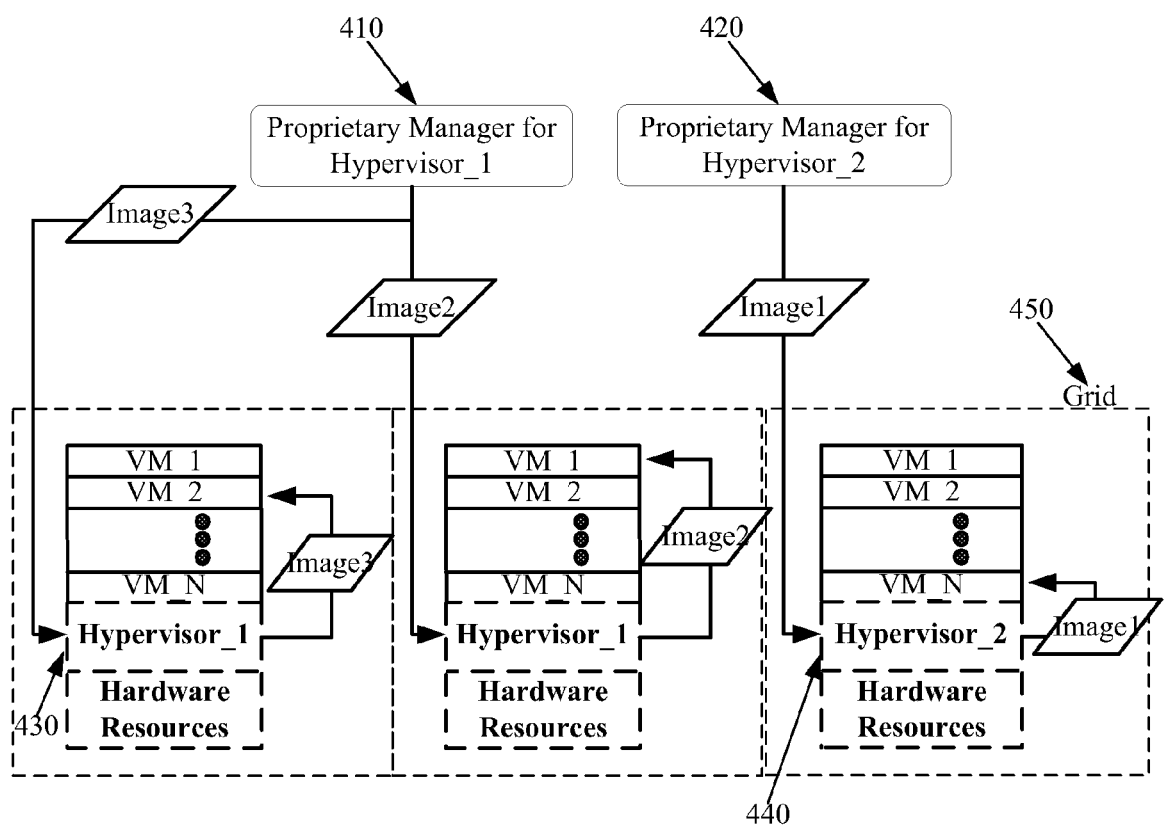
FIG. 4 illustrates a prior art virtualization solution implementing a proprietary hypervisor manager.
Figure 5:
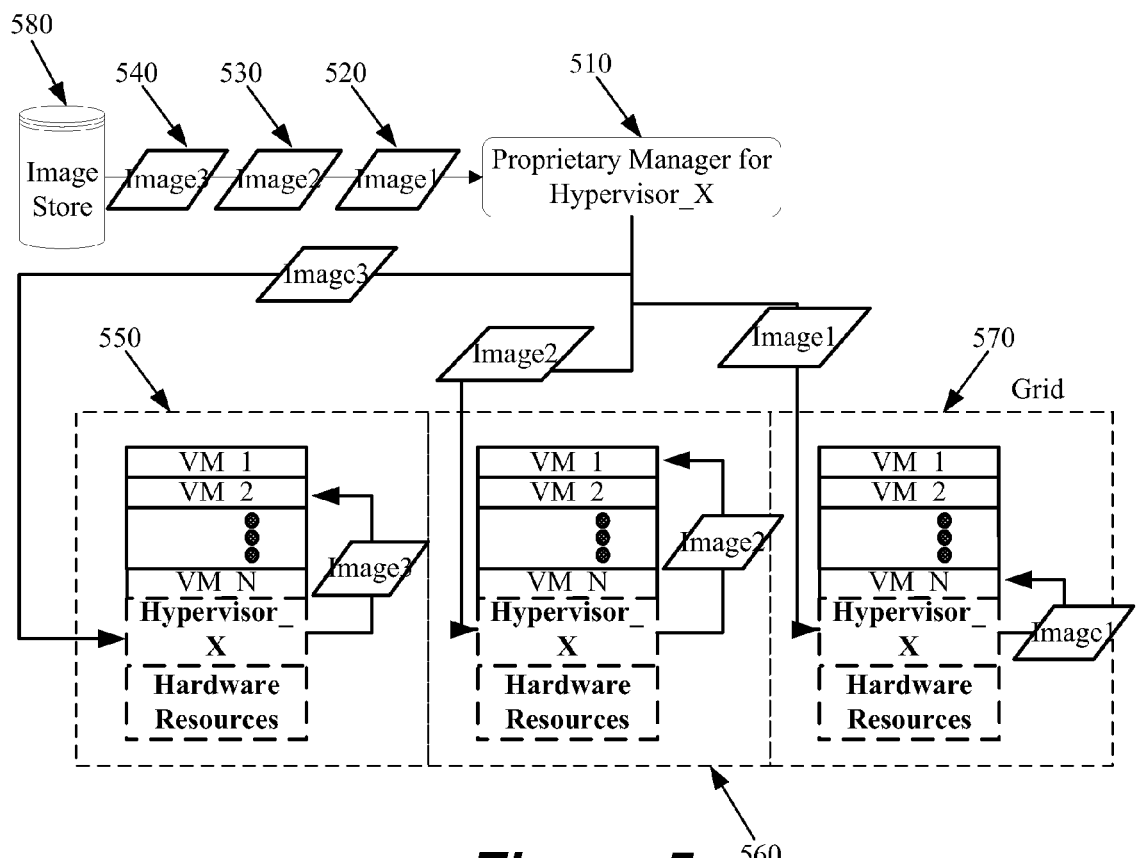
FIG. 5 presents an illustration of a prior art grid management system that copies static software images to configure sets of allocated resources on multiple hardware nodes.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Overview

Some embodiments provide a hosting system and method for automatedly distributing, configuring, and managing virtual machines across a group of hardware nodes. In some embodiments, the virtual machines include system virtual machines. A system virtual machine is a particular configuration of a computer system platform with its own file system and operating system (OS). The computer system platform may also include various application programs that are installed on the file system and that are compiled to directly execute on the OS platform. A system virtual machine is therefore a complete configuration that is independently operable on a hardware node.

On a particular hardware node of the hosting system that hosts multiple virtual machines, a system virtual machine operates independent of other operating systems of the other virtual machines operating on the particular hardware node. In this manner, multiple OS environments (e.g., Microsoft Vista®, Linux, etc.) co-exist on a node without mutually interfering with each other's operations. In other words, a hardware node of some embodiments concurrently executes virtual machines of different computer system configurations for one or more users using a single set of hardware resources of the node.

System virtual machines are different than process virtual machines. Unlike system virtual machines, a process virtual machine does not include its own OS. Rather, a process virtual machine runs as an application on a host operating system. The process virtual machine provides a platform independent programming environment for application programs that interface with the process virtual machine in order to run on the host operating system. The application programs therefore cannot run on the host operating system without the process virtual machine. Similarly, the process virtual machine cannot run the application programs without the host operating system.

In some embodiments, a node is a particular physical machine such as a server or other computer device/machine that includes processing resources, memory resources, block/storage resources, network resources, etc. that implement and execute the one or more computer system configurations of the virtual machines. The node also includes a hypervisor that operates at a lower layer than the virtual machines on the node.

The hypervisor manages the access of the virtual machines on a node to the underlying hardware resources of the node. The hypervisor manages the hardware resources of a particular node by partitioning a set of the hardware resources to each virtual machine operating on the particular node. In some embodiments, the hypervisor provides exclusive use of a partitioned set of the hardware resources to a particular virtual machine. In this manner, some embodiments guarantee that an amount of hardware resources is always available to each virtual machine. The virtualization or mapping of the hardware resources occurs transparently to the operations of the virtual machine causing each virtual machine to believe that they are operating using a dedicated set of resources. Such transparent virtualization or mapping of resources prevents one virtual machine from accessing or interfering with resources of another virtual machine. For example, a virtual machine is prevented from accessing the file system or memory (i.e., random access memory) of another virtual machine on the same node.

In some embodiments, within the group of nodes for hosting the virtual machines, the hardware resources of at least two nodes are controlled by different hypervisors, a first hypervisor operating on a first node and a second different hypervisor operating on a second node. In some embodiments, the different hypervisors include hypervisors of different types. For instance, a type 1 hypervisor controls the resources of the first node and a type 2 hypervisor controls the resources of the second node.

In some embodiments, the different hypervisors include hypervisors of different vendors. For instance, different vendors may implement the same type 1 hypervisor but with different messaging interfaces where the different messaging interfaces define two or more messaging protocols, commands, and interfaces to the operating systems being virtualized by the hypervisors. Additionally, the same hypervisor vendor may have multiple different hypervisor implementations. For example, the same vendor implements different hypervisors that support virtualization of different sets of guest operating systems. Currently, no single hypervisor currently provides an all-in-one virtualization solution that virtualizes every commercially available operating system (e.g., a first hypervisor that supports virtualization of Windows® and MAC OS® and a second hypervisor that supports virtualization of LINUX and Solaris®).

In some embodiments, the different hypervisors include hypervisors that support virtualization of a particular set of hardware. For example, a first hypervisor supports virtualization of an x86 based processor and not a RISC based processor, whereas a second hypervisor support virtualization of the RISC based processor and not the x86 based processor.

In some embodiments, the different hypervisor provide different levels of virtualization. For instance, some hypervisor provide full virtualization, partial virtualization, paravirtualization, etc.

To provide an automated hosting system for such a hosting environment with different hypervisors, some embodiments provide (1) a hypervisor management module and/or (2) one or more utility management modules to implement the automated hosting functionality. The hypervisor management module of some embodiments manages the nodes and the various virtual machines operating on the nodes with the different hypervisors. The hypervisor management module normalizes the messaging for each of the distinct hypervisor types and distinct hypervisor vendor implementations. This allows the hypervisor management module of some embodiments to provide a uniform set of control and provisioning messages for controlling the allocation and operation of the virtual machines operating across the nodes irrespective of the hypervisor operating on the node. The hypervisor management module converts the uniform set of control and provisioning messages to different provisioning messages and control messages that are specific to the hypervisor of each target node. Consequently, the hypervisor management module provides a multi-tenancy solution for the different hypervisors operating across the group of nodes where each node and the corresponding hypervisor operating at the node is a tenant.

The hypervisor management module therefore enables a scalable hosting system whereby new or different hypervisors may be integrated into one or more nodes of the hosting system at any time. To support the new or different hypervisors, the hypervisor management module of some embodiments requires only minimal updates to normalize the messaging for new or different hypervisors that are introduced into the hosting system.

The hypervisor management module uses the provisioning messages to optimally allocate the various resources needed for deploying a virtual machine configuration from one or more nodes that are best suited to host the configuration. For example, the hypervisor management module optimizes performance of a virtual machine based on the hypervisor(s) operating on the nodes and the hardware resources of the nodes where certain hypervisors more efficiently execute networking message exchanges and other hypervisors more efficiently execute local input/output (I/O) message exchanges. The provisioning messages include messages to create, delete, scale resources, or copy a virtual machine. These provisioning messages are described in further detail in Section III B below. It should be apparent to one of ordinary skill in the art that the list of provisioning messages is not meant to be a complete list of all provisioning messages but rather an exemplary set of messages used by the hypervisor management module of some embodiments.

The hypervisor management module uses the control messages to control the operation of any virtual machine deployed across the nodes irrespective of the different hypervisors managing the resources of each node. Some examples of control messages include messages to start, stop, resume, reboot, take a snapshot, restore to a snapshot, report statistics, save an image, or migrate operation of a virtual machine. These control messages are described in further detail in Section III B below. It should be apparent to one of ordinary skill in the art that the list of control messages is not meant to be a complete list of all control messages but rather an exemplary set of messages used by the hypervisor management module of some embodiments. Additionally, the hypervisor management module monitors the virtual machine across the nodes to collects statistics about the hardware resources, hypervisor, or virtual machines of a node.

In some embodiments, the hypervisor management module leverages functionality provided by the utility management modules, also referred to as utility virtual machines (depicted in the figures as "UVM"). In some embodiments, the utility management modules are virtual machines that locally reside on each node in the group of nodes. The utility management modules provide utility functions that assist the hypervisor management module in automatically installing, configuring, and deleting virtual machines from the group of nodes. In some embodiments, the utility functionality includes (1) automatedly instantiating custom virtual machine images onto the utility management module's corresponding node based on user-specified parameters within a particular virtual machine configuration, (2) automatedly modifying existing configurations by adding to or removing from the software components of the existing configuration, (3) securely deleting virtual machines, and (4) encrypting the virtual machines.

Figure 6:
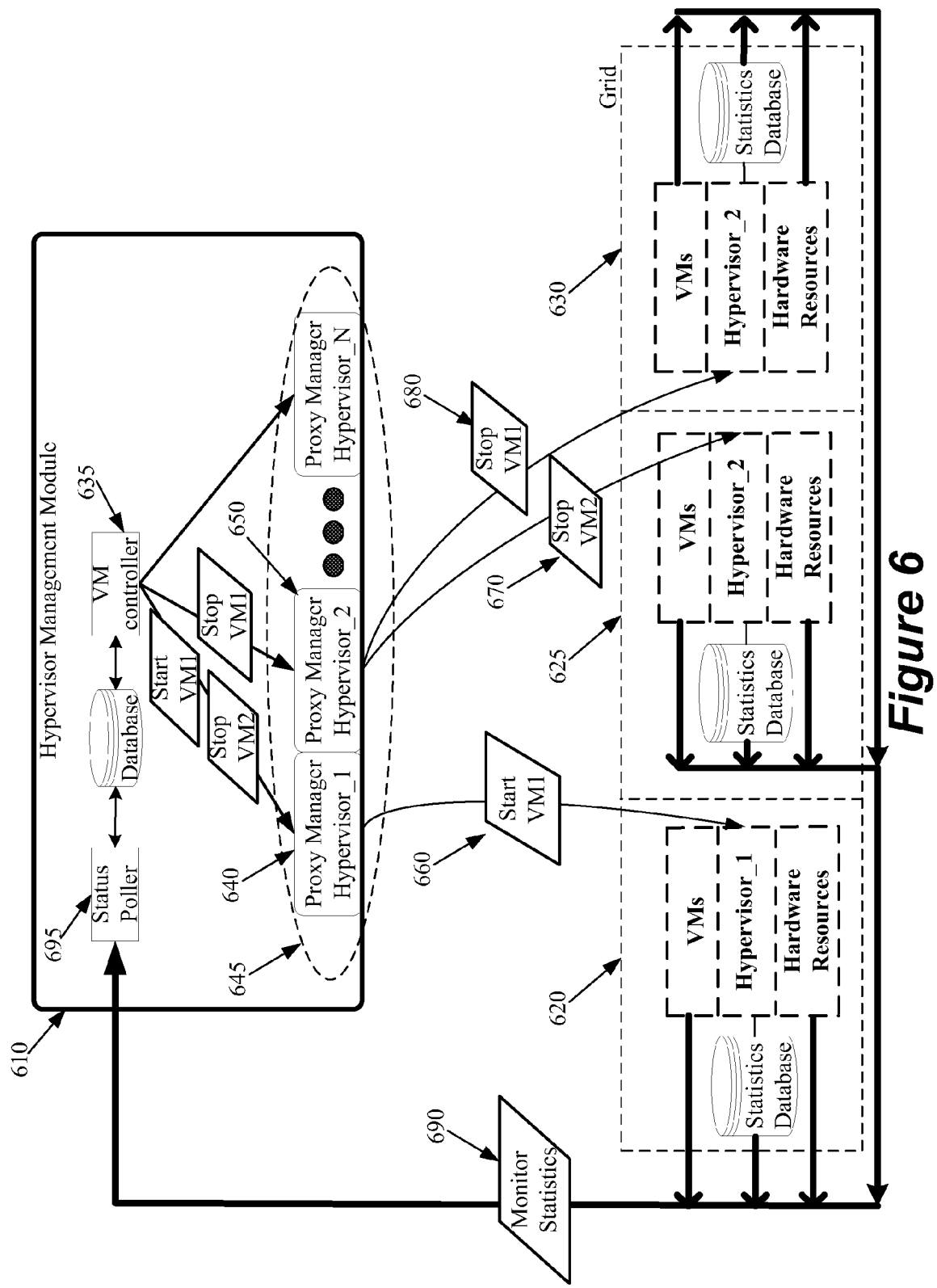
FIG. 6 illustrates a hypervisor management module that controls the operation of the virtual machines across the grid of nodes and monitors the resources of the nodes in accordance with some embodiments.

FIG. 6 illustrates a hypervisor management module 610 that controls the operation of the virtual machines across the grid of nodes and monitors the resources of the nodes in accordance with some embodiments. The components of the hypervisor management module 610 illustrated in FIG. 6 and other components are described in further detail with reference to FIG. 10 below. The hypervisor management module 610 interfaces with at least three different nodes 620, 625, and 630. In this figure, the nodes 620, 625, and 630 include different resources with different hypervisors virtualizing the resources of the node. For instance, the resources of node 620 are virtualized using a first hypervisor (e.g., Hypervisor_1 of FIG. 6) and the resources of nodes 625 and 630 are virtualized using a second hypervisor (e.g., Hypervisor_2 of FIG. 6), where the first and second hypervisors are different. As noted above, the different hypervisors include type 1, type 2, and other types of hypervisors. The different hypervisors may also include hypervisors of the same type that are implemented differently by different vendors.

To control the operations of the nodes 620, 625, and 630, the hypervisor management module 610 interfaces with the various hypervisors of the nodes. The hypervisor management module 610 interfaces with the hypervisors by adapting control messaging such that the control messages are executable on each node irrespective of the hypervisor operating on the node.

Specifically, a virtual machine controller 635 of the hypervisor management module 610 generates the control message. Then, using one or more different proxy managers 645, the hypervisor management module interfaces the control message to a particular hypervisor of a node. In this manner, the hypervisor management module 610 of some embodiments normalizes the distinct interfaces of each of the different hypervisors in order to provide a multi-tenancy solution. It should be apparent to one of ordinary skill in the art that the hypervisor management module of some embodiments is scalable to support any number of hypervisors via a corresponding proxy manager.

The proxy managers 645 include application programming interfaces (APIs) that specify the protocols and functions for communicating with each of the different hypervisors on the nodes 620, 625, and 630. For example, for node 620 that is virtualized with a first hypervisor, the hypervisor management module 610 interfaces with this node through a first proxy manager 640, and for nodes 625 and 630 virtualized with a second hypervisor, the hypervisor management module 610 interfaces with node 630 through a second proxy manager 650.

The proxy managers 640 and 650 translate the messages originating from the virtual machine controller 635 to messages that are executable by the various hypervisors operating on each corresponding node. For instance, the hypervisor management module 610 using virtual machine controller 635 in conjunction with the appropriate proxy manager, (1) configures, translates, and sends a first message 660 to cause a first virtual machine on node 620 to commence its operations, (2) configures, translates, and sends a second message 670 to cause a second virtual machine on the node 625 to halt its operations, and (3) configures, translates, and sends a third message 680 to cause a first virtual machine on the node 630 to halt its operations.

Also, through the interfaces to the nodes 620, 625, and 630, the hypervisor management module 610 monitors resource statistics of each node, such as available CPU processing resources, memory, disk storage, block input/output, or network traffic passing into and out of a virtual machine. These statistics may be used to indicate the availability of the various resources on each node. In some embodiments, the monitoring is performed using a status poller 695 of the hypervisor management module 610, where the status poller 695 retrieves the statistics on particular intervals, on particular triggers, or on a continuous basis in order to create a real-time or near real-time view of the usage and availability of resources across the grid of nodes.

In some embodiments, the hypervisor management module 610 retrieves the statistics 690 from the node directly (e.g., directly from the hardware resources). For instance, through hardware probes and low-level processes, the hypervisor management module is able to retrieve statistics directly from the hardware. Additionally, the hypervisor management module 610 is able to retrieve the statistics 690 by interfacing with the virtual machines either directly or indirectly through a utility management module described below. Further still, the hypervisor management module 610 of some other embodiments retrieves the statistics 690 from the hypervisor operating on each node where each hypervisor may keep a copy of the statistics within a local database. It should be apparent to one of ordinary skill in the art that the hypervisor management module of some embodiments is able to retrieve statistics from some or all such sources in addition to various other sources.

In this manner, the hypervisor management module 610 seamlessly controls and merges resources from physically separate hardware nodes to create a single logical amalgamation of resources. In so doing, the hypervisor management module 610 seamlessly gathers, normalizes, and merges statistics from physically separate hardware nodes. As a result, a system administrator no longer has to view the group of nodes as separate resources, but rather can interface with the group of nodes as if they were a single resource irrespective of the various hypervisors that operate across the grid of nodes or the various hardware resources present on each node in the grid of nodes. This unified view of the group of nodes facilitates the efficient deployment of virtual machines across the nodes such that the utilization of the resources of all nodes is maximized.

Figure 7:
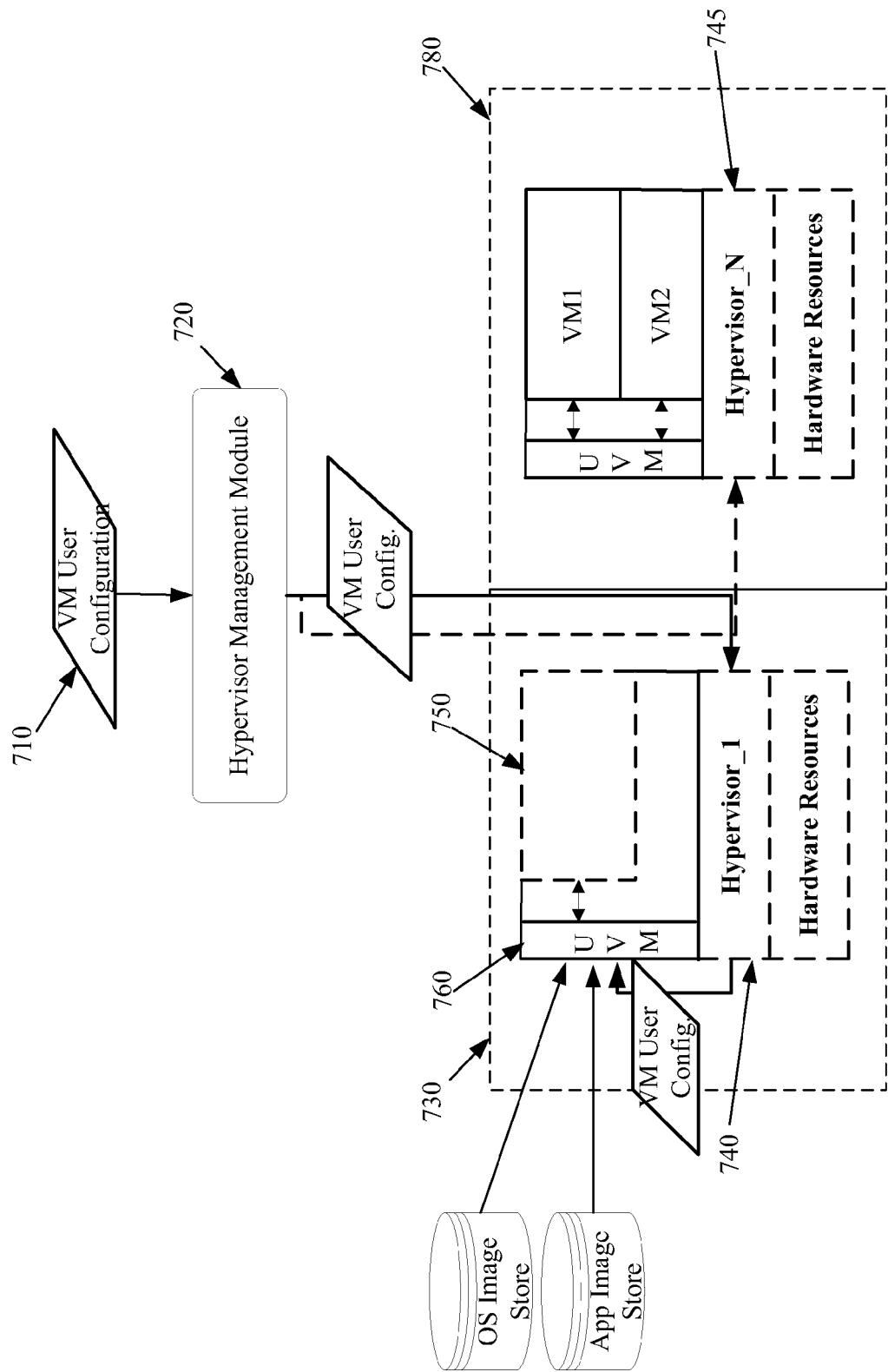
FIG. 7 illustrates some operations performed by the hypervisor management module for allocating a set of resources of a node from a group of nodes based on a specified virtual machine configuration in accordance with some embodiments.

FIG. 7 illustrates some operations performed by the hypervisor management module 720 in order to allocate a set of resources of a node from a group of nodes based on a user specified virtual machine configuration in accordance with some embodiments. Specifically, the hypervisor management module 720 interfaces with a first hypervisor 740 of node 730 and a second different hypervisor 745 of node 780.

As noted above with reference to FIG. 6, the hypervisor management module 720 is able to develop a mapping of the available and used resources across the grid of nodes by monitoring the statistics of the nodes 730 and 780. From this mapping, the hypervisor management module 720 identifies node 730 as a node with sufficient resources to host the virtual machine configuration 710 based on requirements specified within the virtual machine configuration 710. Additionally, in some embodiments, the hypervisor management module 720 identifies node 730 as an optimal node for hosting the virtual machine configuration 710. In some embodiments, such a determination is based on the efficiency with which the hypervisor operating on the node executes the virtual machine configuration 710 or is based on the various hardware resources on the node 730. It should be apparent to one of ordinary skill in the art that various other criteria may be used to determine the optimal node for hosting configuration 710.

After identifying the node 730 with the sufficient resources for hosting, the hypervisor management module 720 requests that the hypervisor 740 provision a specified set of resources 750 for the operation of the virtual machine configuration 710. In response, the hypervisor allocates the set of resources 750 to the virtual machine configuration 710 and restricts other virtual machine configurations from accessing the provisioned set of resources 750.

Figure 8:
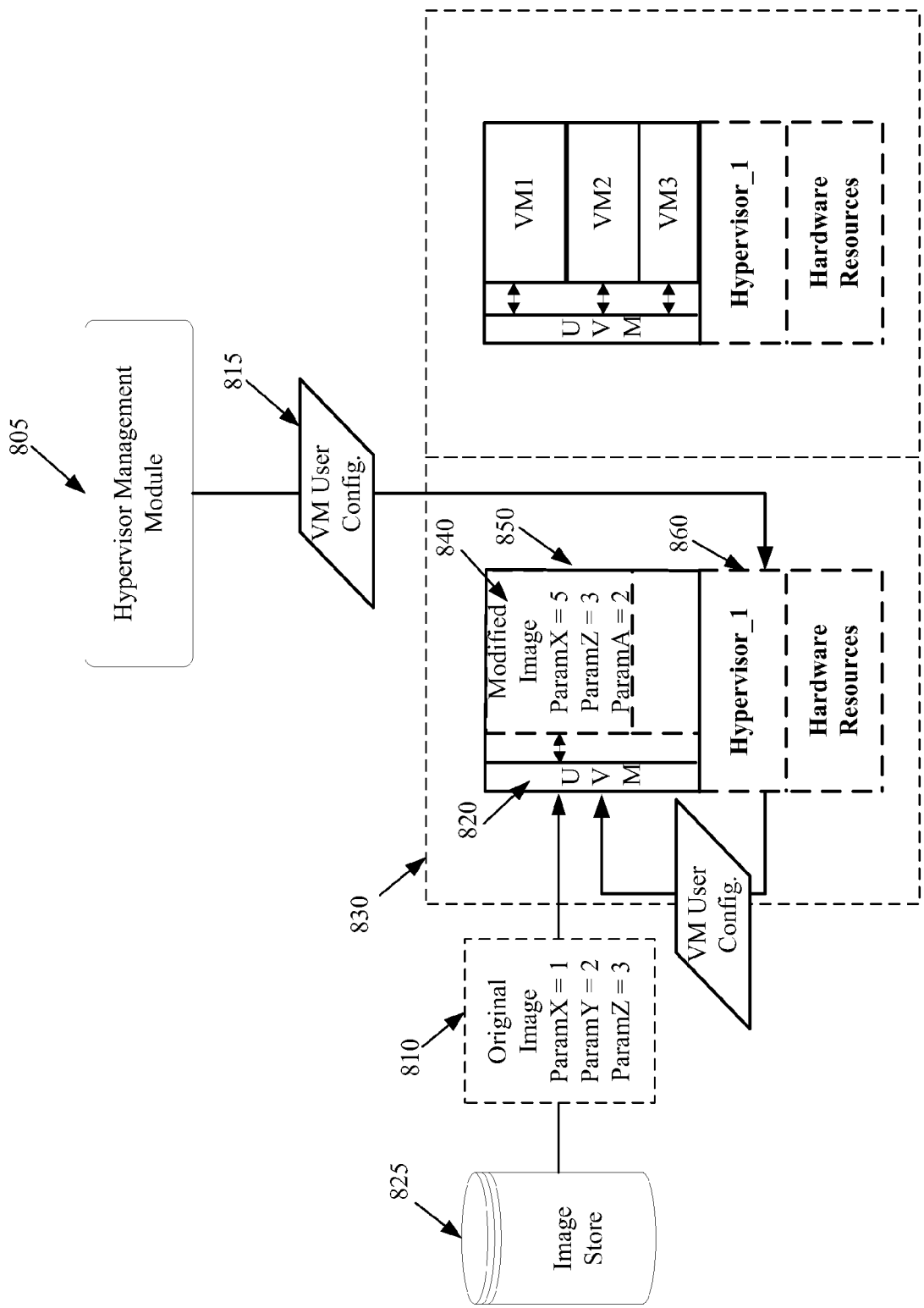
FIG. 8 illustrates some operations performed by a utility management module of a particular node to custom configure a set of resources that the particular node has allocated for a virtual machine configuration.

The hypervisor management module 720 then passes the virtual machine configuration 710 to the utility management module 760 for the utility management module 760 to configure the allocated resources 750. FIG. 8 illustrates some operations performed by a utility management module 820 operating on a particular node 830 to custom configure a set of resources 850 of the particular node 830 that have been allocated by the hypervisor management module 805 for a virtual machine configuration 815.

In some embodiments, the utility management module 820 is a software module (e.g., virtual machine) operating within each node that has input/output interfaces for communicating with the hypervisor management module 805, the hypervisor 860 of the particular node 830, the hardware resources 850, and the image store 825. The hypervisor management module 805 instantiates each utility management module as needed. For instance, when adding a new virtual machine to a particular node, the hypervisor management module 805 provisions the set of resources 850 for the virtual machine and then directs the utility management module 820 to configure the resources. The utility management module 820 begins configuring the allocated set of resources 850 after receiving a virtual machine configuration 815 from the hypervisor management module 805. In some embodiments, the virtual machine configuration 815 specifies a set of scripts on a remote file system that the utility management module 820 locally executes at the particular node in order to configure the allocated resources.

To configure the allocated resources, the utility management module 820 partitions and formats the allocated resources to create a file system for the virtual machine. In some embodiments, the utility management module 820 also partitions and formats a local logical file system. The utility management module 820 builds the user-specified virtual machine on the local file system. When the configuration is complete, the utility management module 820 then copies the virtual machine from the local file system to the file system of the allocated set of resources. Once the virtual machine resides on the allocated resources, the virtual machine may commence operations.

It should be apparent to one of ordinary skill in the art that the utility management module executes each of the partitioning, formatting, and custom configuring operations based on different scripts stored on the remote file system. In some embodiments, the hypervisor management module controls each instance of these operations for each utility management module. Other operations performed by the utility management module may similarly reside on the remote file system where each instance of the utility management module executing one or more such scripts is controlled by the hypervisor management module. For example, the remote file system may include scripts for retrieving images, modifying images, installing images, etc. as described below. In some embodiments, each utility management module mounts the remote file system in order to access the scripts. However, it should be apparent to one of ordinary skill in the art that in some embodiments the scripts are locally stored within the file system of each utility management module.

In some embodiments, the file system of the virtual machine is created to store all configuration files for the virtual machine operating system, application programs, and user data. The hypervisor management module in conjunction with either the hypervisor of a node or the utility management module of a node creates the file system from an array of fixed-sized blocks of the block device (e.g., disk storage device) of the node. The blocks may be clustered into sectors. The file system then organizes the sectors to create, store, move, and delete the various files and directories of a virtual machine. An operating system controls access to the file system. However, a hypervisor may introduce a layer of abstraction between the actual sectors of the block device and the file system managed by an operating system of a virtual machine. In such configurations, the operating system believes that it is in exclusive control over the file system and thus in control of the underlying block device. Yet, actual control over the physical block device is retained by the hypervisor. The file system thus represents a portion of a block device of a node that is set aside to store data and configuration files of a virtual machine, where the block device itself is shared amongst multiple different virtual machines.

In some embodiments, a file system is hierarchically organized. For example, a hierarchical organization of data may include a nested directory structure with each directory storing one or more files or other directories. Some embodiments leverage such a hierarchical organization and directory structure when building the virtual machines. This allows the utility management module 820 to build the virtual machine modularly by separating, for example, operating system files from application program files and by modularly installing drivers for a particular operating system into a nested directory of the particular operating system. It should be apparent to one of ordinary skill in the art that a flat structure may also be used to organize the file system. In some embodiments, the hypervisor retains the structure of all file systems of all virtual machines operating on a node in order to permit or restrict access by the virtual machines and the utility management module.

To build the user-specific virtual machine, the utility management module 820 retrieves a software image 810 from an image store 825 and temporarily copies the image to the local file system of the utility management module 820. In some embodiments, the image store 825 includes a separate image store for storing operating system images and a separate image store for storing application images that operate with one or more operating systems.

In some embodiments, the utility management module 820 retrieves a compressed image from the image store 825 whereby only actual data and not redundant or empty blocks of an image is transferred between the image store 825 and the utility management module 820. The utility management module 820 decompresses the data and modifies the retrieved image 810 based on parameters specified within the received virtual machine configuration 815 before using the modified image to configure the user virtual machine.

In some embodiments, modification of the retrieved image 810 includes modifying default parameters within the configuration image 810 such as specifying IP address values for firewall settings or specifying a unique hostname for the operating system of the virtual machine configuration. In some embodiments, modification of the retrieved image 810 includes removing extraneous components within the retrieved image 810 that are not needed for the virtual machine configuration. In this manner, the utility management module 820 minimizes the file size of the image to be copied to the allocated disk storage. This allows for the utility management module 820 to bring online the virtual machine configuration faster as less data has to be copied and resources, such as disk space and I/O bandwidth, are not wasted on copying extraneous data elements not relevant to tasks performed by the virtual machine.

In still other embodiments, modification of the retrieved image 810 includes adding components that are not within the default image 810 retrieved from the image store. These software components may include proprietary software applications particular to a user. Since the utility management module 820 allows for the customization of the software configuration for the resources, any such user configuration can be applied automatically without manual intervention.

As noted above, once the virtual machine is completely configured within the local file system of the utility management module 820, the utility management module 820 then copies the virtual machine over to the file system created for the virtual machine from the allocated set of resources. In some embodiments, the utility management module directly accesses the file system in order to copy the modified virtual machine images to the file system.

The utility management module of some embodiments directly accesses the file system through the hypervisor of a node. In some such embodiments, the hypervisor is modified to permit specialized calls from the utility management module to access and modify the file systems of the other virtual machines on the same node.

The utility management module of some embodiments encrypts the operating configuration for a virtual machine so that other virtual machines on the same node or other nodes will be unable to access components of the virtual machine. The utility management module receives an encryption key as part of the virtual machine configuration. After installing the configuration, the utility management module then uses the key to encrypt the operating configuration. Subsequent access to the configuration of the virtual machine then requires the use of the specific encryption that only select personnel have (e.g., system administrator). In some embodiments, encrypting the operating configuration includes encrypting part of the virtual machine file system that stores the essential configuration data or user data. In other embodiments, encrypting the operating configuration includes encrypting the entire file system of a virtual machine.

The utility management module of some embodiments provides further security functionality by securely removing a software configuration from an allocated set of resources. In some such embodiments, the utility management module uses the access rights to the allocated resources (e.g., disk storage of the node that has been allocated to the virtual machine) in order to write random data to the disk storage before reallocating the disk storage to a different virtual machine. In this manner, some embodiments avoid the issue concerning prior art implementations that simply reallocate the disk storage without deleting the data first, allowing subsequent users the ability to extract potentially sensitive and confidential data from the prior virtual machine configuration.

In some embodiments, the utility management module of some embodiments operates with the hypervisor management module to migrate a virtual machine operating from one node to another. For instance, before performing maintenance on a first node, the hypervisor management module instructs the utility management module on the first node to migrate the virtual machines from the first node to a second node. The utility management module of the first node then interfaces with a utility management module of the second node and the virtual machines operating on the first node are transferred to the second node. The virtual machines may then begin operations on the second node as they are halted on the first node and maintenance is performed on the first node. In this manner, system administrators may automatically take down nodes for maintenance without resulting in disruption or downtime to any virtual machines previously operating on those nodes.

Several more detailed embodiments of the invention are described in the sections below. Before describing these embodiments further, Section II provides a conceptual architectural diagram for the various modules for implementing the automated hosting environment of some embodiments. Next, Section III describes some embodiments of a hypervisor management module for provisioning a set of resources to a virtual machine configuration and for managing the provisioned set of resources. Section IV describes some embodiments of a utility management module for custom configuring a provisioned set of resources to a virtual machine configuration. Lastly, Section V describes a computer system which implements some of the embodiments of the invention.

II. Architecture

Figure 9:
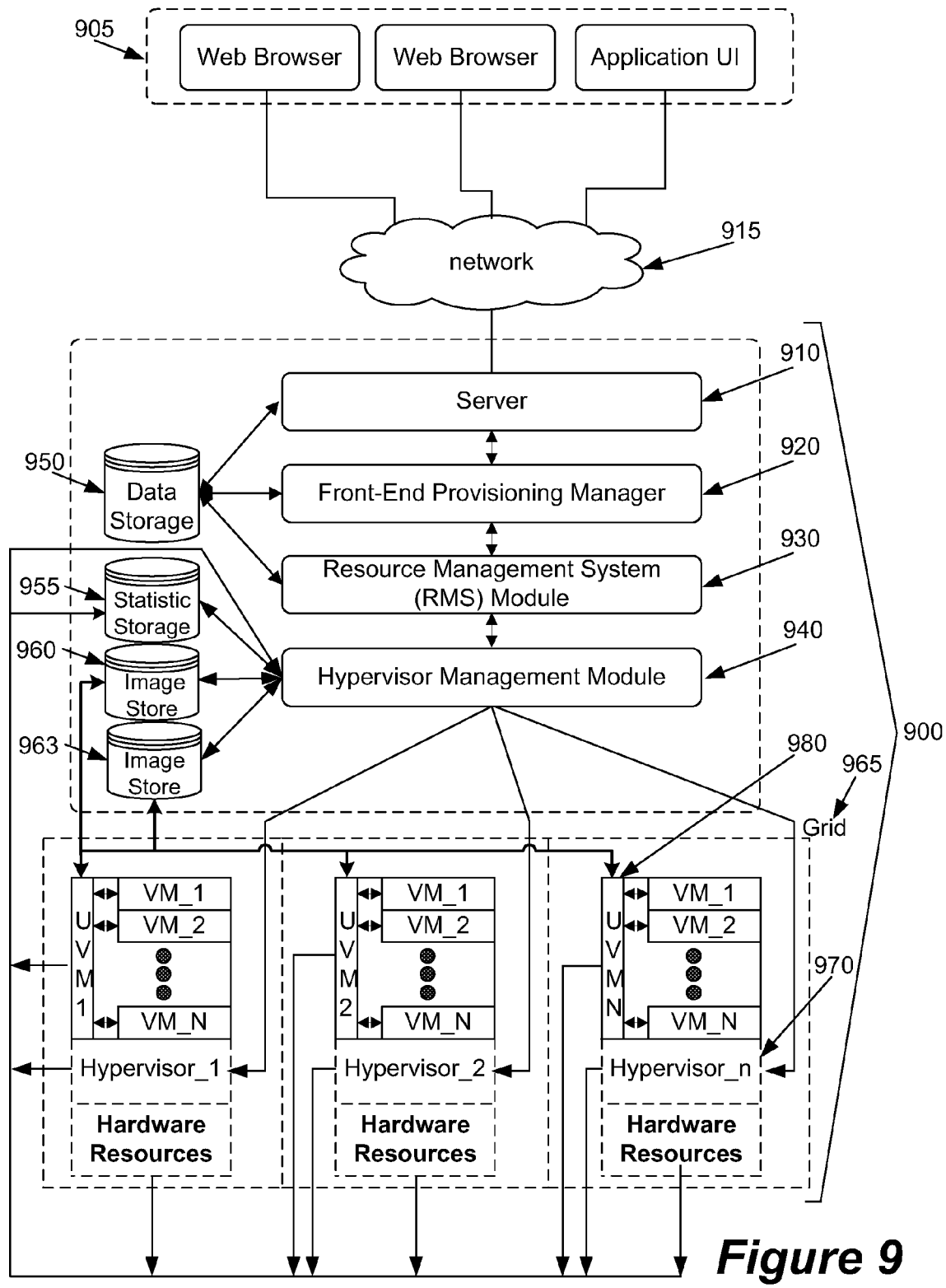
FIG. 9 illustrates a hosting system that implements some embodiments of the invention.

FIG. 9 illustrates a hosting system 900 and the various components of the hosting system 900 that implement some embodiments of the invention. This system automatedly receives new or modified server configurations through front-end user interface (UI) logic and then automatedly deploys the server configuration onto a grid of hardware nodes through back-end placement logic. In some embodiments, the hosting system 900 provides hosting services for multiple unrelated users over the shared grid of hardware nodes. As shown in FIG. 9, the hosting system 900 includes: (1) a service request server 910, (2) front-end provisioning manager 920, (3) a resource management system module 930, (4) a hypervisor management module 940, (5) a data storage 950, (6) a statistics storage 955, (7) an operating system image store 960, (8) an application image store 963, and (9) a grid of hardware nodes 965.

The service request server 910 (1) receives communications (e.g., service requests) from external users through a network 915 and (2) routes the communications to the front-end provisioning manager 920. In some embodiments, the service request server 910 is a web server, which communicates to a user through a network 915 such as the Internet. In such embodiments, a user accesses the hosting system 900 through the user's web browser or through a downloadable client application 905 which may reside on the user's desktop computer, portable notebook computer, personal digital assistant (PDA), digital cellular telephone, or other electronic communication device. In other embodiments, the user can access the hosting system 900 through communication networks other than the Internet. For instance, the network 915 may include wireless data services (e.g., GPRS or other variations of 2G or 3G packet data services) or other electronic communication interfaces. In this manner, users may access the hosting system 900 while being located anywhere throughout the world.

The service request server 910 routes user communications to the front-end provisioning manager 920. On an initial communication, the front-end provisioning manager 920 passes the user communication to a registration module (not shown) for user verification and authentication (e.g., username and password verification). In some embodiments, the registration module is a fully automated component of the hosting system 900 that performs the verification and authentication operations without human intervention.

If the user is not an existing customer, the registration module of some embodiments presents a graphical interface with editable fields through which the user enters additional identification information for creating a user account. The user-specified information is then stored within data storage 950 for subsequent authentication and authorization of the user. If the user is an existing customer, the user's prior virtual machine configurations and usage information are retrieved from the data storage (i.e., database) 950. The information is passed to the front-end provisioning manager 920.

The front-end provisioning manager 920 generates a graphical interface through which users specify graphical representations for the various components of the virtual machine configurations hosted by the group of resource nodes within the grid 965. In some embodiments, the graphical representations include sets of selected graphical items (e.g., icons), where each item represents a component of the server configuration. For instance, a user desiring to create a server configuration having a load balancer, multiple web servers, and a database server simply selects the three graphical elements within the GUI that represent such components. In some embodiments, such selection occurs when users click on (e.g., left-click, right-click, double-click, etc.) items within the graphical display to add, modify, or delete the graphical representations for such items, while some other embodiments allow users the ability to drag and drop the graphical representations for such items across the graphical display. In some embodiments, each graphical representation includes one or more configurable parameters associated with configuring resources or characteristics of a physical device in the grid of nodes represented by the graphical representation. For example, the user selects a graphical representation for a data storage component of a virtual machine configuration and the user then specifies an amount of disk storage that is to be allocated to the data storage.

In some embodiments, the specified configuration is scalable to increase or decrease allocated resources in response to demand through simple modification of the graphical representation. Accordingly, the resources for any previously deployed virtual machine configuration may be modified by a user at any time by simply modifying the graphical representations for the configuration. To facilitate the scaling of a server configuration, the front-end provisioning manager 920 acts as a user interface manager that provides a tiered hierarchical representation of the server configuration.

Some embodiments of the front-end manager 920 further permit users the ability to specify custom configuration parameters for each component of the configuration or for the configuration as a whole. For instance, the front-end manager 920 of some embodiments allows users the ability to specify a desired software configuration (e.g., operating systems, anti-virus protection, anti-spam protection, applications, etc.) to operate in conjunction with the specified hardware configuration. In addition to specifying the operating system and applications to include within the user configuration, some embodiments permit users the ability to further specify configuration settings within the selected operating system and applications. For instance, a user can enter network addresses for load balancers and firewalls or specify hostnames as some examples.

After the graphical specification for the server configuration is complete, some embodiments of the front-end manager 920 automatically provide the configuration to the hosting system's back-end logic, which is formed by the resource management system module 930 and the hypervisor management module 940. In some embodiments, the resource management system module 930 of the back-end logic receives the specified configuration from the front-end manager 920 and performs a logical assignment (i.e., identifies a mapping) of the components within the configuration to the grid of hardware nodes 965. In some embodiments, the logical assignment is stored within the data storage 950 where it can be later accessed by other components of the hosting system 900. In some embodiments, the data storage 950 includes one or more databases that reside on one or more physical devices.

In some embodiments, the hypervisor management module 940 receives the logical assignment from the resource management system module 930 or from the data storage 950 after the resource management system module 930 stores the assignment in the data storage 950. As described in further detail in Section III below, the hypervisor management module 940 then automatically deploys the logical assignment across one or more of the physical hardware nodes 965.

To deploy a configuration, the hypervisor management module 940 performs a constraint optimization process by considering a variety of factors that determine on which nodes to deploy the logical assignment of the user-specified configuration. In some embodiments, the factors used in the constraint optimization process include: (1) the unallocated resources of the hardware nodes, (2) the behavioral characteristics of the specified configuration (e.g., where one web server of a configuration experiences greater loads than a second web server), (3) the behavioral characteristics of the hardware nodes (e.g., performance characteristics of the hypervisor operating on each node), (4) the individual characteristics associated with each user (e.g., the likelihood that a user configuration will be subject to hacking or spamming), and (5) the internal specific parameters (e.g., software licensing costs). By considering these and other factors, the hypervisor management module 940 performs intelligent resource allocation that optimizes the performance of the configuration over the set of hardware nodes 965 and maximizes the number of users able to use the nodes 965.

Some of the statistical information for enumerating these various factors for the constraint optimization process are retrieved from the statistics storage 955. The statistics storage 955 is populated by the hypervisor management module 940. Specifically, in some embodiments, the status poller referenced in FIG. 6 and further described in FIG. 10 performs the statistics gathering for the hypervisor management module 940.

In some embodiments, the hypervisor management module 940 pulls the statistical data from multiple various sources on each node. These sources include (1) the hypervisors (e.g., 970) operating over the nodes 965, (2) the hardware resources of the nodes 965, and (3) the utility management modules of the nodes 965. Because each of these sources may provide statistical information differently, the hypervisor management module 940 normalizes the data and formats the data before storing the data in the statistics storage 955.

The hypervisor management module 940 automatically allocates the logical assignment across one or more of the physical hardware nodes 965 by interfacing with the hypervisor 970 operating on one or more nodes allocated to host the configuration. The hypervisor 970 manages the allocation of resources at the individual node level whereas the hypervisor management module 940 of some embodiments manages the allocation of resources at the grid level for all nodes within the grid 965. In some embodiments, the hypervisor management module 940 virtualizes a single functional component of the configuration across multiple nodes 965. For instance, if a database server of a configuration requires a large allocation of disk space, the hypervisor management module 940 may deploy this database server over two nodes such that the disk space for the server is distributed across multiple nodes.

In summary, the hypervisor 970 of each node allows for a non-conflicting provisioning of a node's resources to two or more virtual machines and the hypervisor management module 940 allows several such nodes with multiple virtual machines and different hypervisors to operate seamlessly together. Through this seamless operation of two or more nodes with different characteristics (e.g., different hypervisors or different hardware resources), the hypervisor management module 940 is able to create the grid 965 that provides a larger potential pool of available resources for hosting virtual machine configurations of any size.

Also operating on each node is a utility management module 980 of some embodiments, also referred to as a utility virtual machine ("UVM"). The utility management module 980 is a hosting system provider instantiated virtual machine that runs on each node. As such, the utility management module 980 receives a partitioned set of hardware resources (e.g., processing resources, memory, block/storage, etc.) of a node on which it operates.

In some embodiments, the utility management module 980 includes an operating system and set of application modules (described in detail with reference to FIG. 18 below) or remotely stored scripts that produce various physical transformations on the particular machine or node on which the utility management module 980 is located. Some such physical transformations include customizing the resources allocated to a user virtual machine by the hypervisor management module 940. Specifically, the utility management module 980 creates the user virtual machine by configuring the allocated resources with a set of software that perform the operations of the user virtual machine. The user specifies the set of software through the front-end manager 920. As described in further detail in Section IV below, the utility management module 980 instantiates, optimizes, and customizes the configurations by retrieving images from one or more image store databases 960 and 963 and modifying the retrieved image according to user specifications. In this manner, the utility management module 980 alters the block device (by changing bits on the physical sectors of the block device) allocated to the user virtual machine. The result of such alterations is to make operational a specific machine implementation that includes the user's virtual machine from an otherwise non-configured set of hardware resources.

In some embodiments, the image store database 960 is a database storing several operating system software images. In some embodiments, the image store database 963 stores software images for applications to run in conjunction with a virtual machine configuration. It should be apparent to one of ordinary skill in the art that the applications image store 963 may store any commercially available software application for multiple different operating systems and other proprietary developed software applications. In this manner, the utility management module 980 permits each virtual machine configuration operating on a node of the grid 965 to be automatically instantiated and unique based on user parameters specified through the graphical user interface of the front-end logic 920.

Together, the resource management system module 930, the hypervisor management module 940, and each of the utility management modules 980 provide an automated method and system to provision and uniquely configure an array of hardware nodes 965 for multiple users without the need for human intervention. Accordingly, some embodiments of the invention provide a hosting system 900 that rapidly deploys and configures a server configuration after the configuration is specified. Such a hosting system 900 can provide such services at any time. Should a user desire to allocate more resources (e.g., hardware, software, or other resources) or modify parameters for already allocated resources, the user may do so by making modifications through the front-end user interface (e.g., by altering the graphical representation of the configuration presented through the front-end user interface). The user can add, delete, and/or modify existing configuration resources through the front-end user interface of some embodiments.

The modifications are then automatically passed from the front-end to the back-end where the hypervisor management module optimally re-provisions the modified configuration. Specifically, the hypervisor management module automatically provides a different allocation for the resources across the hardware nodes to implement the modified configuration and the utility management modules reconfigure the resources. This further provisioning, allocating, and configuring occurs automatedly and without human intervention.

As a result, users may dynamically allocate or reconfigure their set of allocated hardware and software resources via the front-end interface at any time. Such control allows users the ability to actively manage their own configurations without third-party or human intervention. Furthermore, such control allows users the ability to instantaneously and granularly adjust their configuration to account for actual or expected changes in demand. In this manner, some embodiments of the invention create a hosting environment that simulates the user having a virtually unlimited scalable local server configuration while also providing the benefit of access to and control of the simulated local server configuration irrespective of the user's location.

It should be apparent to one of ordinary skill in the art that the grid of hardware nodes 965 includes several distinct physical servers or clusters of servers located in a single server farm or distributed across multiple server farms in multiple disparate locations. Accordingly, the grid of hardware nodes 965 represents a cloud of computing resources shareable by multiple users. One of ordinary skill will appreciate that servers in other embodiments encompass any standalone computational element that can process requests it receives.

In some embodiments, the grid of hardware nodes 965 is uniformly used to implement all components of a server configuration. However, some embodiments segregate various functionality across groups of nodes. For instance, in some embodiments, a first grouping or cluster of nodes is used to implement the load-balancing servers of a configuration and a second grouping or cluster of nodes are used to implement other server components (e.g., web servers, database servers, etc.) of the configuration. In some such embodiments, the load-balancing servers are dedicated F5 load balancing server appliances that can be configured to work in conjunction with the other nodes of the grid.

In some embodiments, the grid of nodes contains an inter-communication pathway by which each node shares data with other nodes of the array and the hypervisor management module. Through, the inter-communication pathway, physically separated nodes together operate as a single functional unit.

Additionally, as mentioned above, the various physical resources of each node can be logically partitioned and allocated to one or more virtual machines. For instance, each node in the grid of hardware nodes 965 includes at least one processing unit, where through the various partitioning, allocation, and deployment performed by the hypervisor management module, hypervisor, and/or utility management module, each physical processing unit conceptually operates as multiple separate processing units for two or more virtual machines of the node. Other resources of a node (e.g., memory, disk space, network bandwidth, etc.) can also be logically split to be shared by multiple users.

Figure 10:
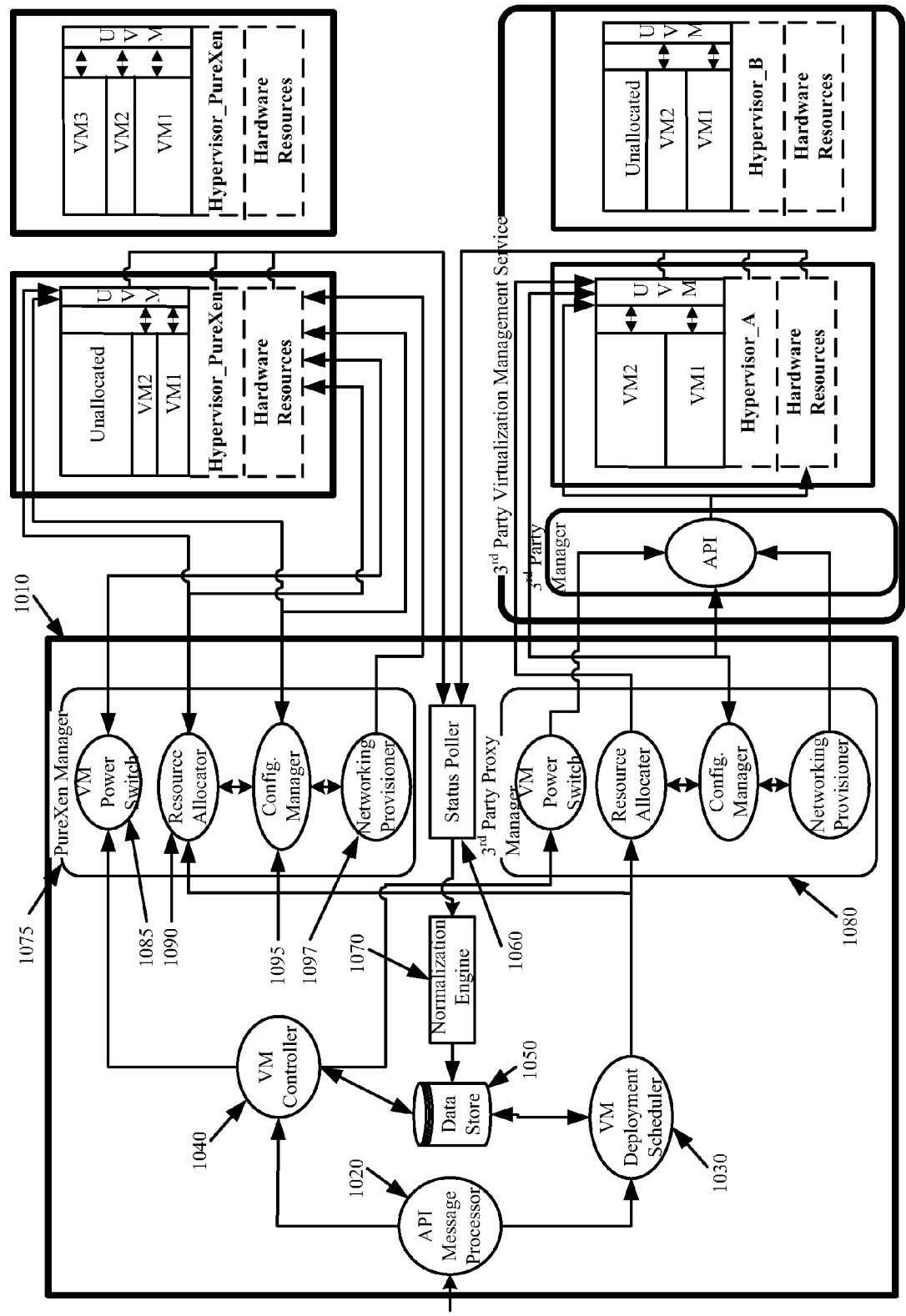
FIG. 10 presents a more detailed illustration of the components of the hypervisor management module and their interactions with the hypervisors and utility management modules of the nodes.

It should be apparent to one of ordinary skill in the art that the architecture depicted in FIGS. 9 and 10 do not encompass all embodiments of the invention. Some embodiments of the architecture may include other various functional components to work in conjunction with or instead of the enumerated components illustrated in FIGS. 9 and 10. Additionally, some embodiments define the hypervisor management module as a separate functional device than each of the utility management modules on each node. However, it should be apparent to one of ordinary skill in the art that in some embodiments the functionality of the utility management modules is integrated into the functionality of the hypervisor management module and the below described functionality for the hypervisor management module and the utility management modules is encompassed within a single device or functional entity. As such, the hypervisor management module of some embodiments performs the virtual machine resource allocation and monitoring, but also performs the partitioning, formatting, configuring, and modifying of the resources in order to fully instantiate a virtual machine on a node.

III. Hypervisor Management Module

A. Hypervisor Management Module Architecture

FIG. 10 presents a more detailed illustration of the components of the multi-tenancy hypervisor management module of some embodiments and their interactions with the hypervisors, utility management modules, and hardware resources of the nodes. In this figure, the hypervisor management module 1010 includes: (1) an API message processor 1020, (2) a virtual machine deployment scheduler 1030, (3) a virtual machine controller 1040, (4) a data store 1050, (5) a status poller 1060, (6) a normalization engine 1070, and (7) hypervisor proxy managers 1075 and 1080.

The API message processor 1020 receives and processes messages received from the resource management system described with reference to FIG. 9 above. These messages may specify a logical assignment of a virtual machine configuration that was specified or modified using the front-end provisioning manager. The API message processor 1020 passes the processed messages to the deployment scheduler 1030.

The deployment scheduler 1030 identifies the particular nodes within the group of nodes that are to receive and implement the virtual machine configuration. The deployment scheduler 1030 identifies the nodes based on the statistical data received from the nodes that is then stored within the data store 1050. Specifically, the statistical data is used to identify which nodes have the available resources to host the virtual machine configuration and which nodes are optimal for hosting the virtual machine configuration. Accordingly, the deployment scheduler 1030 performs a constraint optimization process to identify the one or more nodes that are best suited to optimally host a virtual machine configuration. For example, a first node running with a type 2 hypervisor may be less efficient in hosting a user configuration than a second node running with a type 1 hypervisor based on networking requirements of the user configuration and networking performance characteristics of the type 1 hypervisor relative to the type 2 hypervisor. Therefore, the deployment scheduler 1030 would select the second node over the first node even though both nodes may have the sufficient amount of available resources to host the configuration.

The deployment scheduler 1030 then formulates provisioning messages for allocating resources (e.g., disk space, network bandwidth, memory, etc.) to the virtual machine configurations that are to be hosted or are already hosted by the nodes. These provisioning messages are based on a uniform set of messages that the hypervisor management module has normalized for all nodes irrespective of the different hypervisors on each node.

The provisioning messages issued by the hypervisor management module cause a physical transformation to occur at any node (i.e., computer system) within the grid of nodes. Specifically, the provisioning messages generated by the hypervisor management module cause the physical resources of a node to be allocated to the one or more virtual machines that are to operate using the set of provisioned physical resources. More specifically, the provisioning messages allocate a set of physical resources for the exclusive use by a particular virtual machine. The provisioning of the resources thus restricts other virtual machines from accessing the provisioned set of resources. In this manner, each virtual machine is provided with a dedicated set of hardware resources.

In some embodiments, the provisioning messages cause a physical transformation to the processing resources of a node by allocating a set of the processing resources (e.g., processing cycles) to the operation of a particular virtual machine that is hosted by the node. This allocation may include increasing or decreasing the processing resources that are already allocated to the particular virtual machine. In some embodiments, the provisioning messages cause a physical transformation to the memory resources of a node by allocating a set of the memory resources (e.g., block device and random access memory) to the operation of a particular virtual machine that is hosted by the node. This allocation may include increasing or decreasing the memory resources that are already allocated to the particular virtual machine. In some embodiments, the provisioning messages cause a physical transformation to the networking resources of a node by allocating a set of the networking resources (e.g., networking throughput) to the operation of a particular virtual machine that is hosted by the node. It should be apparent to one of ordinary skill in the art that the provisioning messages issued by the hypervisor management module of some embodiments may include other provisioning messages for allocating other physical resources of a node in addition to or instead of those provisioning messages described throughout this document. Examples of various provisioning messages are provided in the subsection below.

To issue the provisioning messages, the deployment scheduler 1030 identifies the appropriate hypervisor manager of the hypervisor management module 1010, of which only two, 1075 for a Xen® hypervisor and 1080 for a third party hypervisor (e.g., Virtual Iron®), are shown for the sake of simplicity. However, it should be apparent to one of ordinary skill in the art that several addition hypervisor managers may be supported by the hypervisor management module 1010 depending on the number of hypervisor present in the grid of nodes.

The appropriate hypervisor manager is one that is capable of translating the deployment scheduler 1030 defined provisioning messages such that they are executable by the corresponding hypervisors on the nodes for which the messages are intended. The provisioning messages are then sent to the identified hypervisor manager 1075 or 1080 for translation. In some embodiments, the hypervisor management module contains a database storing the message translations between the normalized set of messages and those for the various hypervisors supported across the grid of hosting nodes. Once translated by the hypervisor manager 1075 or 1080 to the proper format, the hypervisor manager 1075 or 1080 interfaces with the hypervisor, utility management module, and/or hardware resources of the receiving node and submits the message for execution on the node.

The API message processor 1020 of some embodiments also receives messages that specify control operations such as starting or stopping an existing virtual machine as some examples. The hypervisor management module then generates control messages to send to the various nodes. Like the provisioning messages, the control messages issued by the hypervisor management module of some embodiments perform a physical transformation on the node receiving the control message. For instance, a control message that specifies that a virtual machine on a particular node halt its operations will cause the physical resources of the particular node processing and executing the operations of the virtual machine to cease operations. Specifically, the processing resources will cease execution of operations for the virtual machine and the memory will be used to retain the state of the virtual machine until operations are resumed. Similarly, a control message generated and sent from the hypervisor management module to a particular node specifying that a virtual machine on the particular node commence operations will cause the resources of the node to begin processing and executing the operations for the virtual machine. As such, the control message issued by the hypervisor management module of some embodiments facilitates control over resources of the various nodes coupled to the hypervisor management module.

The control messages may be specified through, and received from, the front-end provisioning manager described above with reference to FIG. 9. In such instances, the API message processor 1020 utilizes the virtual machine controller 1040 to formulate the control messages and to identify the proper hypervisor manager 1075 or 1080 for translating the control messages such that they are executable by the corresponding hypervisors on the nodes for which the messages are intended. The control messages are then sent to the identified hypervisor manager for translation. Once translated to the proper format, the hypervisor manager interfaces with the hypervisor on the receiving node and submits the message for execution by the hypervisor. Examples of various control messages are provided below.

As illustrated in FIG. 10, the hypervisor managers 1075 and 1080 include various components for performing the translation of provisioning and control messages. As illustrated, the hypervisor managers 1075 and 1080 include (1) a virtual machine power switch 1085, (2) a resource allocator 1090, (3) a configuration manager 1095, and (4) a networking provisioner 1097.

In some embodiments, the virtual machine power switch 1085 of the hypervisor manager translates and passes control messages to the nodes. For example, a Xen hypervisor manager contains the logic and protocols for modifying control messages generated by the virtual machine controller 1040 such that they can be understood and executed by a Xen hypervisor on a specified node receiving the control message.

In some embodiments, the resource allocator 1090 allocates a block device (e.g., disk space) and other processing resources (e.g., memory and processing units) from one or more nodes to a virtual machine configuration. The configuration manager 1095 controls the configuration of the allocated resources. In some embodiments, the configuration manager 1095 communicably couples with the utility management module (UVM) on the node and specifies the configuration parameter to be configured by the utility management module. In some such embodiments, the configuration manager 1095 passes a text file containing the operating system to be installed, other applications to be installed, and custom parameters for the operating system and applications to be modified before installation. In some other embodiments, the configuration manager 1095 bypasses the utility management module and directly configures the allocated resources. This may be the case where the user configuration is a static image that requires no change and the hypervisor operating on the node contains the functionality needed to configure the resources.

In some embodiments, the network provisioner 1097 is tasked with allocating network resources (e.g., I/O bandwidth, load balancing, etc.) and configuring the network resources (e.g., assigning IP addressed, VLANs, etc.) for one or more nodes to the virtual machine configuration. It should be apparent to one of ordinary skill in the art that the virtual machine power switch 1085, resource allocator 1090, configuration manager 1095, and networking provisioner 1097 may include software or hardware modules within the hypervisor management module 1010. Moreover, additional modules may be used in addition to or instead of some of these above enumerated modules.

The hypervisor managers 1075 and 1080 also include various interfaces for directly accessing the utility management modules, the hardware resources, hypervisors, and 3$^{rd}$ party manager that provide various interfaces into some of the nodes. Through these interfaces, the hypervisor management module is able to (1) pass the virtual machine configurations, provisioning messages, and control messages directly to the hardware resources of a node, the hypervisor operating on the node, or to the utility management module on the node and (2) acquire statistical data about the virtual machines operating on the nodes indirectly from the utility management modules or directly from the virtual machines. As noted above, the statistical data is retrieved by the status poller 1060. The statistical data is then normalized by the normalization engine 1070 before it is stored in the data store 1050. The normalization process is described in further detail below.

The hypervisor management module provides hosting service providers the ability to scale hardware resources to virtually unlimited proportions. As noted above, the hypervisor management module seamlessly merges the processing resources of physically separate hardware server nodes to create a logical amalgamation of resources that can be partitioned in any manner to any number of users irrespective of the different hypervisors and hardware resources of each node. By also monitoring the usage and availability of resources across the nodes, the hypervisor management module is able to optimally provision sets of the resources to virtual machine configurations that are modified or created by users.

The hypervisor management module provides such functionality by interfacing with two or more different virtualization hypervisors, each hypervisor operating on a different hardware node. In some embodiments, the hypervisor management module includes one or more APIs (e.g., a hypervisor proxy manager) for facilitating the communications with the different hypervisors. The APIs of the hypervisor management module are able to interface and issue messages in order to automatically instantiate, monitor, and remove virtual machines across the different hypervisors.

As noted above in the Overview section, the different hypervisors include: (1) hypervisors of different types (e.g., type 1, type 2, etc.), (2) hypervisors of different vendor implementations, (3) hypervisors with different messaging interfaces, (4) hypervisors that support virtualization of different sets of guest operating systems, (5) hypervisors that support virtualization of a particular set of hardware, and (6) hypervisors that provide full virtualization, partial virtualization, paravirtualization, etc.

For different hypervisors of different vendor implementations, the hypervisor management module includes different APIs that interface with each of the different vendor implementations. For instance, the APIs of the hypervisor management module are able to interface with Xen® and Microsoft's® Hyper-V hypervisors which are both type 1 hypervisors, but are hypervisors implemented differently by different vendors. These APIs convert the normalized set of messages supported by the hypervisor management module of some embodiments to the different messaging protocols, commands, and interfaces of the different hypervisors.

As mentioned above, the different hypervisors used within the grid of nodes of some embodiments include hypervisors that support virtualization of different sets of guest operating systems. For instance, a first hypervisor operating on a first node in the grid of nodes supports virtualization of Microsoft Windows® and Apple MAC OS® guest operating systems and a second hypervisor operating on a second node in the grid of nodes supports virtualization of Linux, UNIX, Solaris, and FreeBSD operating systems. By providing the different APIs to communicate with the different hypervisors, the hypervisor management module further facilitates the ability for the hosting system of some embodiments to support user virtual machines of any commercially available operating system. This is because each of the different hypervisors supports virtualization of a specified set of guest operating systems. Currently, no single hypervisor provides an all-in-one virtualization solution that virtualizes every commercially available operating system. Therefore, it is necessary for the hypervisor management module of some embodiments to interface with multiple different hypervisors in order to provide a hosting system that is able to virtualize and host any such commercially available hosting system.

Each of the different hypervisors may also support virtualization of different sets of hardware. For example, a first hypervisor virtualizes resources of a first node in the grid of nodes that includes an x86 based processor and a second hypervisor virtualizes resources of a second node in the grid of nodes that includes a RISC based processor. Since the first hypervisor is compiled for the x86 based processor, it is incompatible with and cannot be used to virtualize the RISC based processor of the second node. It should be apparent to one of ordinary skill in the art that the grid of nodes may include hypervisors for nodes with other processors such as an ARM based processor, a MIPS based processor, etc. Furthermore, the nodes may include other hardware resources that may be virtualized by some but not all of the different hypervisors.

Additionally, different hypervisors have different performance characteristics. This is because different hypervisors provide different levels of virtualization. Some hypervisors provide full virtualization whereby the guest operating system being hosted does not need to be modified in any way. Other hypervisors provide partial virtualization whereby the virtual machine simulates instances of some of the underlying hardware platform. For example, this may include simulation of address spaces. Other hypervisors still provide for paravirtualization. In paravirtualization, the guest operating system of the virtual machine is modified with a special API that provides specialized calls to the hardware. It should be apparent to one of ordinary skill in the art that the foregoing provides an exemplary set of different hypervisors and that other different hypervisors exist and are supported by the hypervisor management module of some embodiments.

By supporting many such hypervisors through its various APIs, the hypervisor management module is able to facilitate an automated hosting system where the hardware nodes of the hosting system execute with different sets of hardware. Additionally, users of hosting system need not be restricted to any particular set of operating systems, virtual machine configuration, etc. as the hypervisor management module of some embodiments hosts any user virtual machine by identifying the appropriate set of hardware, hypervisor, and software needed to host the user virtual machine.

The hypervisor management module API includes a plug-in interface whereby the module is adaptable to support new hypervisors and hypervisor types as they are made available and commercially deployed. In this manner, a new hypervisor may be introduced into the grid of nodes with the hypervisor management module of some embodiments managing the resource allocation and virtual machine configurations for that node. Additionally, the various modules of the hypervisor management module transform a general purpose computer to a special purpose computer that automatedly performs the above described functionality of the hypervisor management module of some embodiments.

B. Messaging

Figure 11:
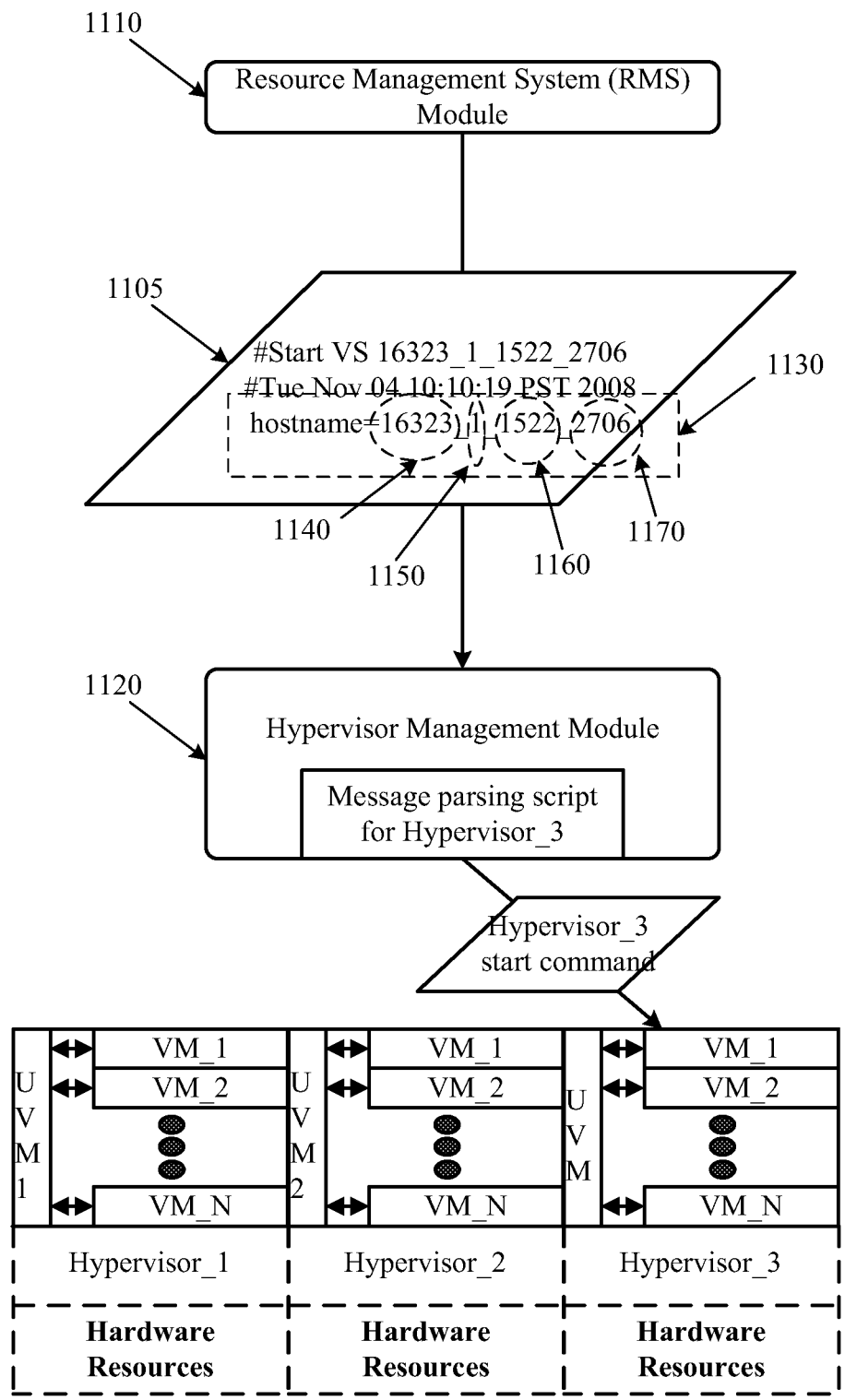
FIG. 11 illustrates a control message for starting the operation of a virtual machine passed from the RMS to the hypervisor management module in accordance with some embodiments.
Figure 12:
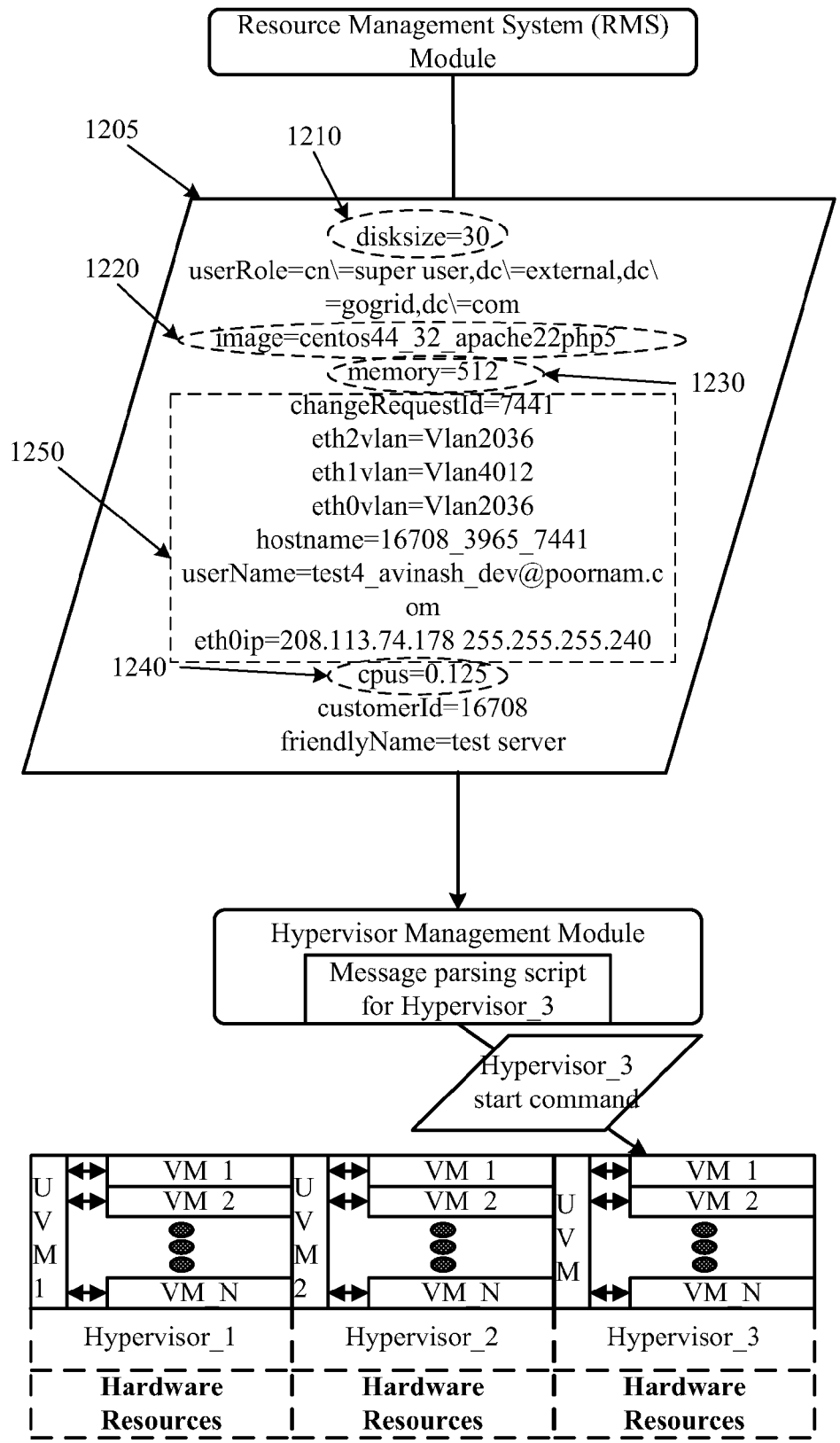
FIG. 12 illustrates a provisioning message for adding a component to an existing virtual machine operating on a particular node in the grid of nodes in accordance with some embodiments.

FIGS. 11 and 12 provide examples of various messages exchanged between the RMS and the hypervisor management module. In some embodiments, the messages are first analyzed by the virtual machine controller or virtual machine deployment scheduler of the hypervisor management module in order to determine the node intended as the destination of the message. Additionally, the virtual machine controller or virtual machine deployment scheduler identifies the hypervisor operating at the destination node. The message is then forwarded to the appropriate proxy manager of the hypervisor management module where scripts parse the operation and parameters associated with the operation in order to issue a corresponding command that is executable by the hypervisor on the node.

FIG. 11 illustrates a control message 1105 for starting the operation of a virtual machine passed from the RMS 1110 to the hypervisor management module 1120 in accordance with some embodiments. The actual executable command is shown at line 1130. In some embodiments, the message 1105 is a series of integer values. The first integer value 1140 identifies the customer issuing the command using a customer identification number. The second integer value 1150 is a grid variable for identifying the particular node on which the virtual machine operates. The third integer value 1160 is a session identifier for identifying the virtual machine. The fourth integer value 1170 specifies a job number that specifies the control operation to be performed (e.g., start, stop, etc.).

Some embodiments include other control messages for stopping operation of a virtual machine, resuming operation of a virtual machine, rebooting a virtual machine, taking a snapshot of a virtual machine, restoring a virtual machine to a previous snapshot, reporting statistics from a virtual machine, saving an image of a virtual machine, or migrating a virtual machine from one node to another. Stopping operation of a virtual machine may be necessary when up-scaling or down-scaling resources of a virtual machine, changing configuration parameters, or simply suspending operation during hours of low usage. By halting operation of the virtual machine, changes can be made to a virtual machine and tested before deploying the changes to the public.

Rebooting a virtual machine is often necessary to implement recent changes that have been made to a virtual machine configuration. In some embodiments, rebooting restarts operation of a virtual machine so that the recently implemented changes become incorporated within the operation of the virtual machine.

Some embodiments utilize the snapshot functionality to instantiate multiple copies of a single virtual machine that is known to be functioning at a particular instance in time. Specifically, the snapshot control message creates an image of a user virtual machine at the particular instance in time. The snapshot includes all functional components of the virtual machine (e.g., application programs, operating system, hardware requirements) and the configuration of the components at the time of the snapshot. From the snapshot, an exact copy of the virtual machine can then be deployed at another node within the grid of hardware nodes to meet increased demand. Additionally, the snapshot may be stored at a database of the hypervisor management module for backup purposes. Saving an image provides similar functionality where the stored image is the originally deployed image.

FIG. 12 illustrates a provisioning message 1205 for adding a component to an existing virtual machine operating on a particular node in the grid of nodes in accordance with some embodiments. In this figure, the multiple parameters are passed in conjunction with the command for adding the component. In this figure, the message 1205 specifies adding a web server to a virtual machine. The message includes a first parameter 1210 specifying an amount of a block device to allocate from the node to the server component, a second parameter 1220 indicating an image with which to configure the component, a third parameter 1230 specifying an amount of memory to allocate from the node to the server component, a fourth parameter 1240 specifying an amount of processor resources to allocate from the node to the server component, and various customization parameters 1250 to configure the server component, such as an IP address, hostname, etc. Other parameters are further specified, however for the sake of simplicity are not discussed.

Some embodiments implement additional provisioning messages. For example, the hypervisor management module may issue a delete provisioning message to remove an already configured resource or component of a user virtual machine. Additionally, a copy provisioning message may be issued to duplicate an already configured component, resource, or virtual machine at a single node or across one or more different nodes. Other provisioning messages include messages to upscale/downscale processing resources, upscale/downscale memory resources, upscale/downscale block device resources, and upscale/downscale network I/O where upscaling involves provisioning additional resources and downscaling involves removing already provisioned resources.

In some embodiments, the RMS passes the messages as text files to a message queue of the hypervisor management module. The hypervisor management module runs a cron job or a process that regularly checks the message queue for newly scheduled messages from the RMS. If a new message exists, the hypervisor management module processes the message. Once the messages are parsed by the appropriate proxy managers, the hypervisor management module then conveys the messages to the nodes using the Secure Shell (SSH) protocol with IP addressing. Accordingly, in some embodiments, the hypervisor management module, each of the nodes, each hypervisor of each node, and each utility management module on each node is identified using an IP address.

The hypervisor management module of some embodiments maintains state information for each of the nodes that the hypervisor management module directs to perform a given control message or provisioning message. The hypervisor management module uses the state information to lock access to certain nodes or virtual machines operating on the nodes. This is because some of the messages require exclusive access to the node's or virtual machine's set of resources. For example, issuing a message to take a snapshot of a particular virtual machine while simultaneously creating a new component for the particular virtual machine creates a potentially invalid snapshot image. Similarly, adding multiple server applications to a particular virtual machine may exhaust the provisioned set of resources for the virtual machine. However, by maintaining state information for the node, the hypervisor management module may serially add each server application and then monitor the resource usage after each such addition in order to prevent the resources from being exhausted. In some embodiments, the node state information is retained within a database of the hypervisor management module. In other embodiments, the hypervisor management module sets the state information for a particular only after issuing a command to the particular node. The hypervisor management module then removes the state information after all provisioning or control operations are complete for the particular node.

C. Statistics Monitoring

The hypervisor management module of some embodiments retrieves usage statistics from the hardware nodes. In some embodiments, the hypervisor management module retrieves statistics directly from the hardware resources of the node, from the hypervisor operating on the node, or from the virtual machines themselves indirectly through the utility management module operating on the node. The statistics include data regarding (1) processor usage (where the processor usage is recorded per processing core), (2) memory usage, (3) block input/output usage (e.g., input/output operations per second (IOPS)), (4) disk usage, (5) type of traffic passing into and out of a particular node, (6) number of virtual machines on a node, and (7) configuration of the virtual machines on a node.

In some embodiments, the statistical data gathered by the hypervisor management module is further detailed to specify statistics for each process running on a virtual machine. Some examples of these statistics include the memory usage per process, the processor usage per process, the amount of disk storage required per process, and the network input/output bandwidth consumed by each process. The memory usage statistics further include statistics for page table overlap and memory over commit data.

In some embodiments, the statistical data gathered by the hypervisor management module provides more detailed disk usage statistics. For example, the detailed disk usage statistics identify the logical volume for each guest virtual machine, free space per virtual machine, amount of file fragmentation per virtual machine, redundant array of inexpensive disks (RAID) errors including bad stripes and RAID performance metrics such as per disk errors, back blocks, and other such performance metrics.

Other statistics monitored by the hypervisor management module include the total bandwidth throughput per network interface, packets per second, errors or dropped packets, and statistics per each virtual local area network (VLAN) tag. Additionally, the hypervisor management module may collect statistics regarding the software operating on each of the nodes. For example, the hypervisor management module of some embodiments gathers statistics regarding operating system performance such as errors by a UNIX "daemon" and daemon reporting information. Other software statistics include: (1) hypervisor virtual machine events including the number of reboot, restart, and stop events, (2) hypervisor network-creation events including create, delete, flap virtual interfaces, and bridging of groups, (3) login and authentication attempts and successes to an operating system or application programs of the virtual machine, and (4) per node control message statistics data including an amount of message per second, failed messages, and number of retry messages.

By collecting these statistics from multiple nodes, the hypervisor management module constructs an overall picture of the resources of the hosting system that includes multiple disparate physical servers. From the collected data, the hypervisor management module is able to report virtual machine performance per virtual machine on a node. Additionally, the hypervisor management module uses the statistical information to determine the availability of resources from which subsequent scheduling and deployment decisions are made for modified or newly created virtual machines. Moreover, these scheduling and deployment decisions can be optimized based on the statistics such that utilization of the resources within the grid of nodes is maximized to support as many virtual machines as possible while guaranteeing a certain level of performance for each such virtual machine.

The retrieved statistical data is received by a normalization engine of the hypervisor management module. The normalization engine is tasked with (1) receiving statistical data that is formatted differently by the different hypervisors, hardware resources, and virtual machines and (2) formatting the data into a uniform structure. For example, the normalization engine of some embodiments converts different data units of a particular measurement into a single data unit (e.g., bits into bytes). Alternatively, the normalization engine of some embodiments converts different data structures into a single data structure, such as converting HTML formatted data structures into XML. It should be apparent to one of ordinary skill in the art that various other normalization techniques may be utilized by the normalization engine.

The normalization engine then supplies the normalized data to the data store for storage and subsequent use by the hypervisor management module. In this manner, the statistical data that is stored within the data store of the hypervisor management module is uniformly formatted for all nodes irrespective of the different types of hypervisors on the nodes or the different hardware and software resources of the nodes.

Additionally, by being able to directly acquire the statistical data from the utility management modules, virtual machines, and the hardware resources of the nodes, the hypervisor management module is able to circumvent the different virtualization databases of the hypervisors that may be implemented differently with different schemas, technology, and statistical parameters. In this manner, some data may be acquired from the various hypervisors, but should a first hypervisor include certain statistical parameters that a second hypervisor does not include, the hypervisor management module may directly interface with the resources of the nodes to acquire the missing parameters. Accordingly, the data store provides a single schema instance from statistical data that may arrive from multiple different schema instances.

Figure 13:
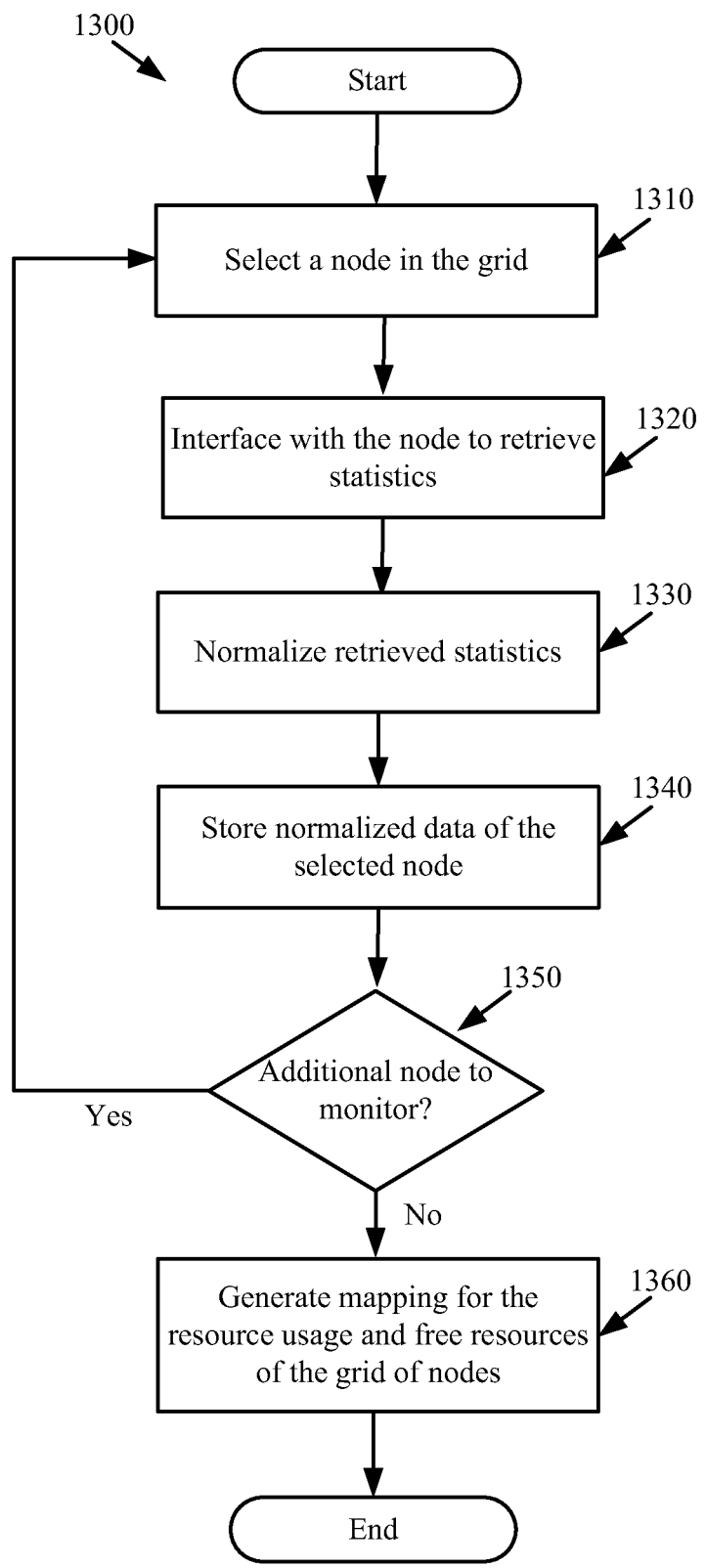
FIG. 13 presents a process for collecting statistical data from the grid of nodes in accordance with some embodiments of the hypervisor management module.

FIG. 13 presents a process 1300 for collecting statistical data from the grid of nodes in accordance with some embodiments of the hypervisor management module. The process 1300 begins by selecting (at 1310) a node in the grid. The process then interfaces (at 1320) with the node in order to retrieve statistics using either the hypervisor, the direct interface to the resources of the node, the interface to the utility management module, or by using two or more such interfaces. The retrieved data is then normalized (at 1330) before it is stored (at 1340) where the data is combined with the statistical data of other nodes in order to generate normalized statistical data for all nodes in the grid. The process determines (at 1350) whether additional nodes need to be monitored. If so, the process selects the next node and retrieves the data as described above. Otherwise, the process generates (at 1360) a mapping for the resource usage and available resources of the grid of nodes.

The mapping may be used internally to facilitate the automated scheduling and deployment of subsequently modified or added virtual machines. Moreover, the statistical data may be presented to one or more users through a graphical interface to display a state of a user's virtual machine. This provides the user with an updated view of the operating condition of his or her virtual machine. From the view, the user is able to modify the virtual machine's configuration if needed (e.g., add servers, remove servers, allocate additional physical resources, etc.).

In some embodiments, the collected data assists in identifying bottlenecks within the user configuration. For instance, a first web server of a particular configuration allocated to a first node in the grid with only a minimal allocation of memory may be causing a second web server of the particular configuration allocated to a second node in the grid to lose performance. By retrieving and analyzing these performance statistics, some embodiments notify the user of the bottlenecks and allow the user to allocate additional resources to ameliorate the bottleneck.

In some embodiments, the process 1300 is continually run to provide a real-time view of the resource usage and availability. In some other embodiments, the process 1300 is run at specified intervals or is run over only a set of nodes. For instance, a particular user's virtual machine configuration may be deployed over three disparate nodes. In order to determine whether additional components may be allocated to the user's configuration, the hypervisor management module first monitors the three nodes. If sufficient available resources exist on the nodes, then the additional components are deployed to the nodes. Otherwise, the additional components must be deployed to other nodes.

D. Resource Allocation

In addition to monitoring resources of the nodes, the hypervisor management module of some embodiments controls the allocation and operation of the various virtual machines on the nodes. In some such embodiments, the hypervisor management module starts, stops, adds, and deletes virtual machines from the nodes. For instance, some embodiments of the hypervisor management module specify commands for adding a virtual machine configuration to one or more nodes. To do so, the hypervisor management module first allocates the necessary resources from the nodes using one or more of the above described provisioning messages.

Figure 14:
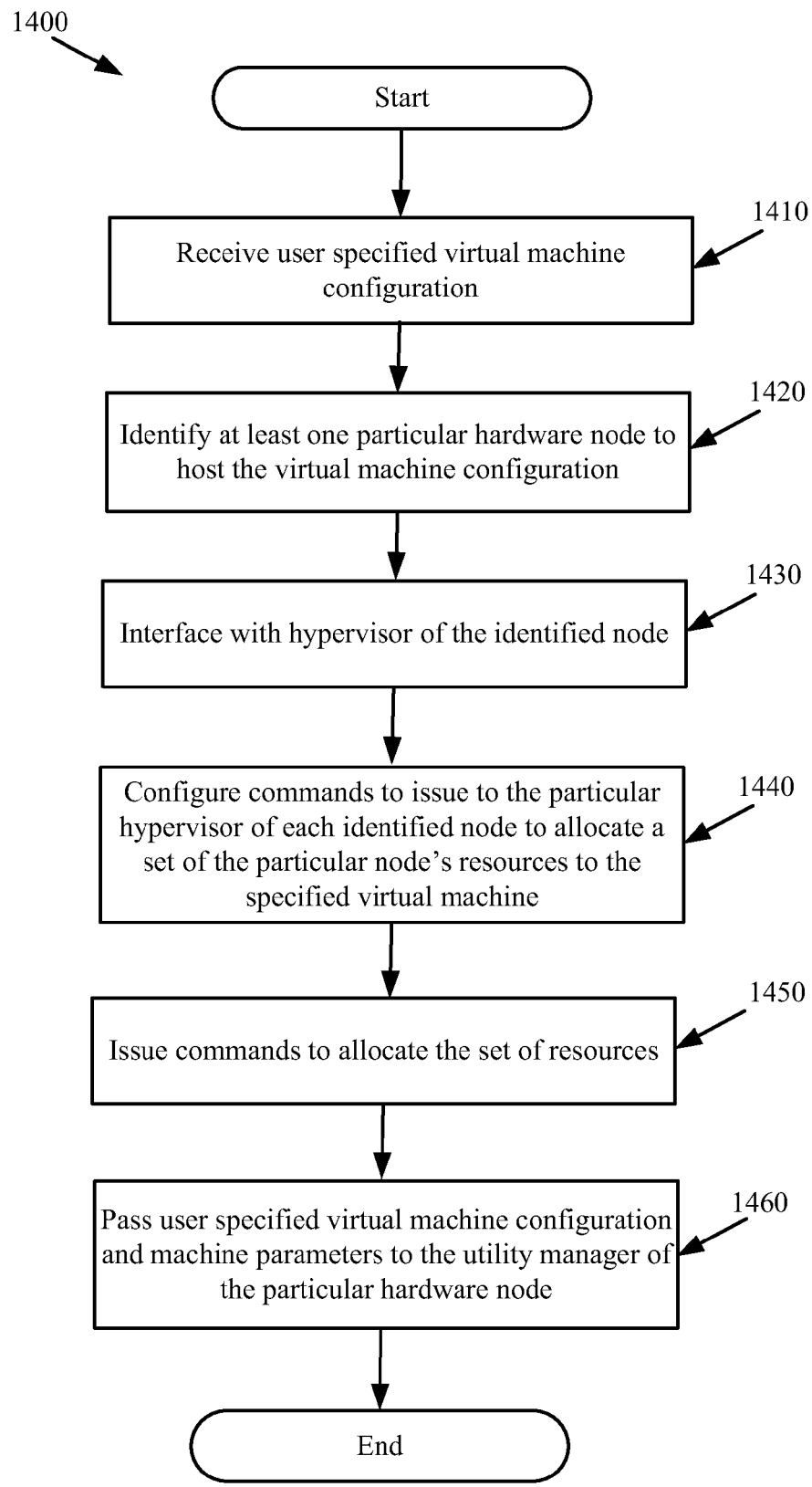
FIG. 14 presents a process performed by a hypervisor management module of some embodiments for the allocation of resources for a newly specified virtual machine configuration.

FIG. 14 presents a process 1400 performed by a hypervisor management module of some embodiments for the allocation of resources for a newly specified virtual machine configuration. The process 1400 begins by receiving (at 1410) a virtual machine configuration that is passed from the front-end logic to the hypervisor management module. The process then identifies (at 1420) at least one node within the grid of nodes to host the virtual machine configuration. In some embodiments, the one or more nodes can be identified by the resource management system of some embodiments such that the hypervisor management module simply performs a deployment of the virtual machine according to requirements specified within the virtual machine configuration. In other embodiments, the hypervisor management module identifies the one or more nodes based on resources requirements specified within the virtual machine configuration.

The process interfaces (at 1430) with the hypervisor of each identified node by identifying the proper set of API calls for communicating with the node. Since the hypervisors directly control the allocation of hardware resources for their respective nodes, the process issues (at 1440) a command to the one or more hypervisors to allocate a set of the identified nodes' resources to the virtual machine configuration.

Each hypervisor performs a mapping from the hypervisor's corresponding node physical resource space to a logical resource space allocated for the virtual machine configuration. The virtual machine receives the one or more logical mappings as a single resource space over which to operate. The virtual machine is provided exclusive use of the mapped resources such that operation of other virtual machines on the same node does not affect the performance of the newly created virtual machine. In this manner, some embodiments guarantee that an amount of processing resources is always available to the virtual machine.

In some embodiments, allocating the set of resources includes allocating one or more of the following processing resources to the virtual machine configuration: processor cycles, memory, block device (e.g., disk storage), network interfaces, network bandwidth, backup devices, and standalone devices such as firewalls and load balancers. It should be apparent to one of ordinary skill in the art that some embodiments allocate additional resources in addition to the resources enumerated above. Each of the various resources can be allocated in different amounts according to virtual machine configuration. Additionally, the nodes from which the set of resources are allocated need not reside at a single destination, but may instead be distributed across multiple different server farms at multiple destinations. Accordingly, the physically separate nodes in the grid of nodes logically appear as a unified grid of nodes.

With the resources allocated, the process then facilitates the configuration of the resources. The process does so by passing (at 1450) the specified virtual machine configuration and any additional configuration parameters to the corresponding utility management modules operating within each of the nodes. As will be described in Section IV below, the utility management modules perform the custom software configuration of the virtual machine configuration.

The process stores (at 1460) the allocation of resources for the virtual machine configuration into a database tracking the allocation of resources for the entire grid. In some embodiments, the process also receives the customized configuration data from the utility management modules to store within the database. The stored data permits the hypervisor management module to quickly access information for any virtual machines distributed across the entire grid of nodes and not just on a single node. Such information can be used by the hypervisor management module of some embodiments to identify and then to remove, migrate, modify, stop, or resume one or more components from any configuration operating within the grid of nodes.

It should be apparent to one of ordinary skill in the art that the process 1400 of FIG. 14 is similarly applicable to the removal or deallocation of resources for a virtual machine configuration. For example, the hypervisor management module receives a virtual machine configuration or component to remove. The hypervisor management module identifies the one or more nodes and the set of resources allocated for the operation of the virtual machine operation. The hypervisor management module interfaces with the hypervisors of the identified nodes to cause the hypervisors to remove the virtual machine configuration and free the resources allocated to the configuration. Additionally, the hypervisor management module in some embodiments causes the corresponding utility management modules of the identified nodes to destroy the data from the file systems as is described in further detail below.

E. Optimized Resource Allocation

Figure 15:
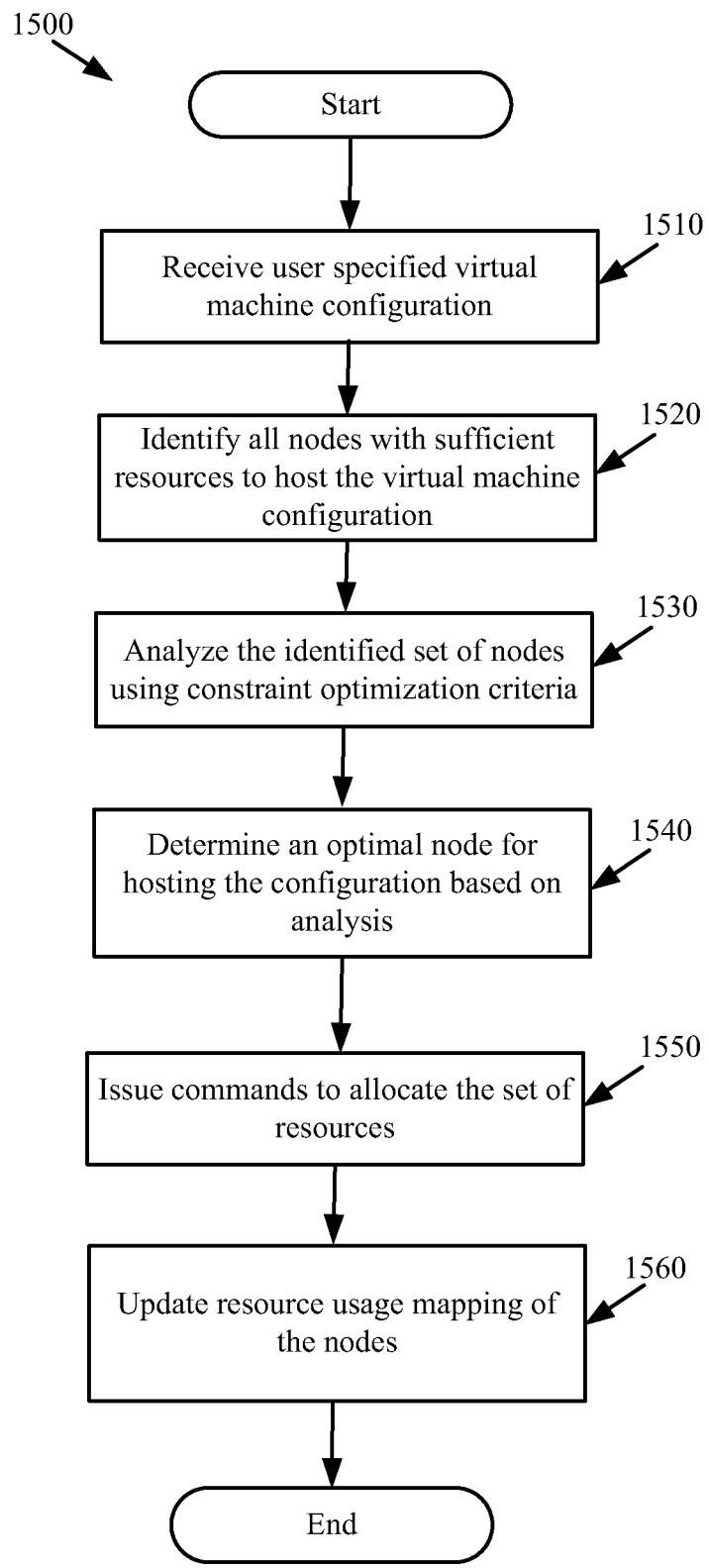
FIG. 15 presents a process implemented by the hypervisor management module of some embodiments to optimally allocate resources from the grid of nodes to a virtual machine configuration.

Some embodiments modify the process 1400 of FIG. 14 such that the hypervisor management module optimizes the allocation of resources to maximize resource usage and to maximize performance of the virtual machines. FIG. 15 presents a process 1500 implemented by the hypervisor management module of some embodiments to optimally allocate resources from the grid of nodes to a virtual machine configuration.

As in process 1400, the process 1500 begins by receiving (at 1510) a virtual machine configuration that is passed from the front-end logic to the hypervisor management module. The process then identifies (at 1520) all nodes within the grid of nodes with sufficient resources to host the virtual machine configuration.

The process analyzes (at 1530) the identified nodes based on a set of constraint optimization criteria to determine (at 1540) the optimal node from the identified nodes for hosting the configuration. In some embodiments, the constraint optimization criteria consider various factors of the nodes in order to decide which of the identified nodes is an optimal node.

For example, different nodes may have different hypervisors with each hypervisor executing certain operations more efficiently than other hypervisors. A first operating system specified in a first configuration may perform more efficiently using a node running Xen® virtualization, whereas a second operating system specified in a second configuration may perform more efficiently using a node running Parallels® virtualization. More specifically, a type 1 hypervisor (e.g., Xen®) with direct access to the hardware resources processes I/O requests more efficiently than a type 2 hypervisor since the type 1 hypervisor does not have to traverse through the OS stack before accessing the hardware resources. Accordingly, a virtual machine configuration that is heavily I/O dependent would be best served by a node operating with a type 1 hypervisor.

As another example, two nodes may be identified as having sufficient resources to host a particular configuration. A first node has 512 megabytes (Mb) of random access memory (RAM) available for allocation and a second node has 100 Mb of RAM available for allocation. If the particular configuration requires 90 Mb, the process may identify the second node as the most optimal node so that the resources of the second node are maximized with a larger amount of resources of the first node being available for hosting a configuration requiring a larger allocation of memory.

It should be apparent to one of ordinary skill in the art that the hypervisor management module of some embodiments performs other types of intelligent resource allocation for a modified virtual machine configuration. For instance, when a user specifies adding a particular software component, some embodiments identify nodes in the grid already configured with the proper licenses to run the software. In this manner, the hypervisor management module is able to reduce costs for hosted virtual machines.

Once the optimal node is identified, the process allocates (at 1550) the necessary resources for the configuration and updates (at 1560) the resource usage mapping for the nodes to indicate that the allocated resources are no longer available for use in hosting subsequent configurations.

Figure 16:
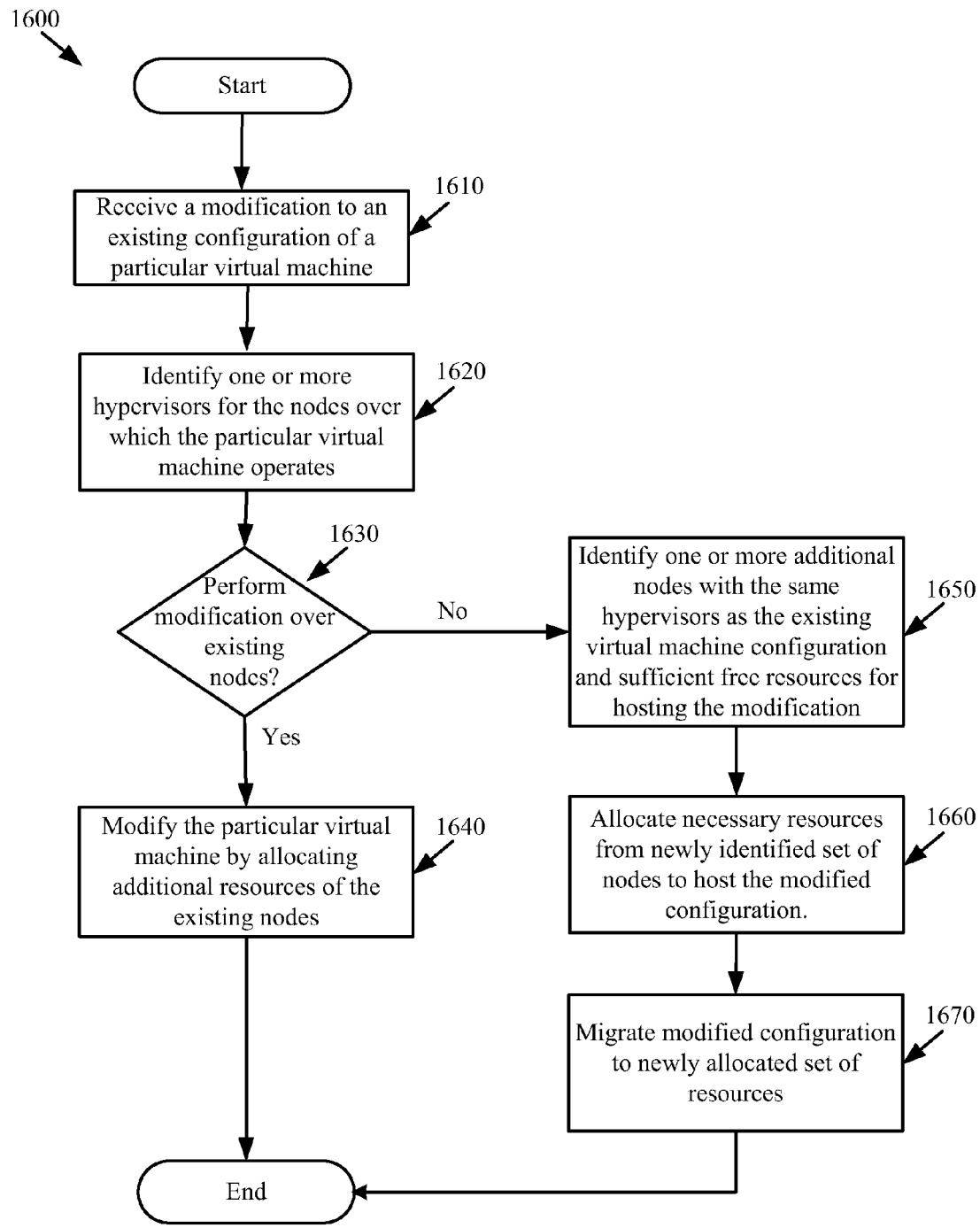
FIG. 16 presents a process performed by the hypervisor management module for modifying an existing virtual machine configuration for a virtual machine that operates within the grid of nodes.

The hypervisor management module of some embodiment also efficiently allocates resources when a virtual machine configuration is modified. FIG. 16 presents a process 1600 performed by the hypervisor management module for modifying an existing virtual machine configuration for a virtual machine that operates within the grid of nodes. The process 1600 begins by receiving (at 1610) a modification to an existing configuration of a particular virtual machine. In some embodiments, users are able to modify their configurations at any time through the front-end user interface. In some embodiments, user configurations are automatically modified by the hosting system to meet increased or decreased demand in resource usage.

The process identifies (at 1620) one or more hypervisors for the nodes over which the particular virtual machine operates. The process then determines (at 1630) whether the modification can be made to the identified nodes. In some embodiments, a modification involves allocating additional hardware resources such as network bandwidth or memory to a configuration. Additionally, the modification may involve adding additional virtual machine components such as a web server, database, cloud storage, or load balancer. If the identified nodes have sufficient unused resources, then the modification can be made on these nodes. In such instances, the hypervisor management module modifies (at 1640) the particular virtual machine by allocating additional resources of the existing nodes to the particular virtual machine.

In some instances, the process determines (at 1630) that the existing nodes over which the particular virtual machine operates do not have additional resources that may be allocated to the virtual machine. Accordingly, the hypervisor management module must migrate the configuration to a different set of nodes with sufficient resources for hosting the modified configuration.

In some embodiments, the hypervisor management module performs an intelligent allocation of resources from the other nodes using the constraint optimization analysis of process 1500. This is done in order to provide consistent performance when adding resources to a virtual machine. Accordingly, the process identifies (at 1650) one or more nodes with the same hypervisors as the existing virtual machine configuration and sufficient free resources for hosting the modification to the virtual machine. Once identified, the process allocates (at 1660) the necessary resources for the modified configuration from the newly identified set of nodes. The process then migrates (at 1670) the modified configuration onto the newly allocated nodes where operation of the modified virtual machine resumes.

IV. Utility Management Module

In some embodiments, the utility management module, also referred to as the utility virtual machine (UVM), compliments the functionality of the hypervisor management module by configuring resources that have been allocated by the hypervisor management module for a virtual machine. Specifically, the utility management module customizes a software configuration per the specifications of a virtual machine configuration before applying the configuration to the allocated resources. Each node within the grid of nodes includes a utility management module for configuring all virtual machines operating within the same node as the utility management module.

Figure 17:
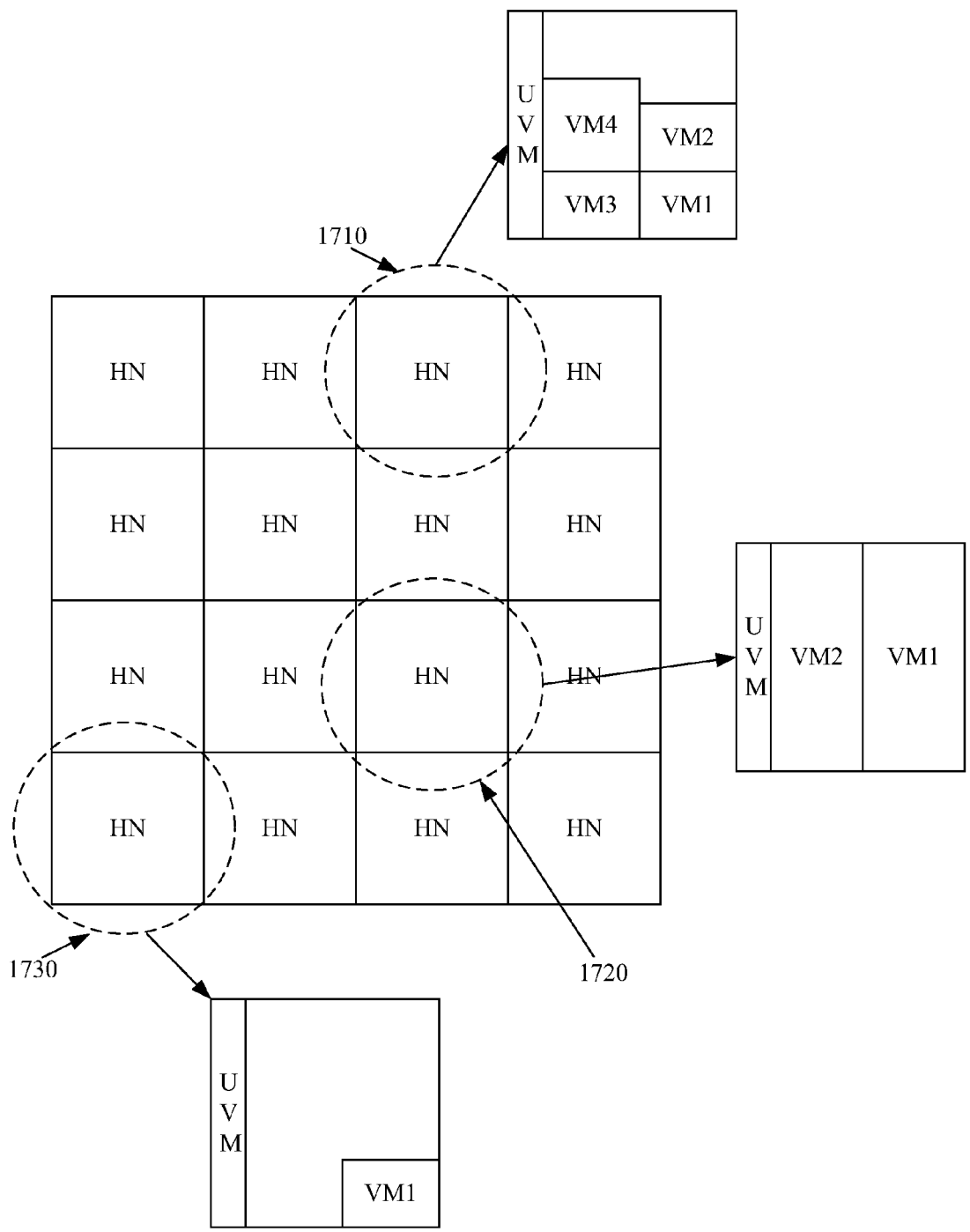
FIG. 17 presents a grid of sixteen nodes with three nodes expanded to illustrate the utility management module and various virtual machines running on each expanded node.

FIG. 17 presents a grid of sixteen nodes with three nodes 1710, 1720, and 1730 expanded to illustrate the utility management module and various virtual machines running on each of these nodes. Each utility management module is responsible for retrieving and passing the necessary configuration data to the virtual machines operating on the same node as the utility management module. By including a utility management module on each node, the hosting system avoids a bottleneck that would otherwise exist if a single entity within the hosting system was responsible for the configuration of all nodes in the grid of nodes. Instead, each node is independently configured with respect to other nodes by its own utility management module.

Also, by distributing utility management modules across each of the nodes, some embodiments remove a single point of failure for the nodes. If any single utility management module or node fails, all other utility management modules and nodes continue operating unaffected by the loss. Such an architecture allows for resources to be automatically diverted from a failed node to other operational nodes, minimizing downtime for virtual machines on the failing node. This is made possible by storing the virtual machine configurations in a database (e.g., data stores 950 or 955 of FIG. 9) that is not local to any particular node such that the configuration data for the virtual machines on a failing node can be retrieved. Moreover, since each node has its own local storage, some embodiments avoid the single point of failure potentially experienced by hosting services that utilize a storage area network (SAN) in which a centralized storage solution provides storage for all nodes and virtual machines.

In some embodiments, the utility management module is itself a virtual machine with an operating system that executes software processes running within the utility management module's own virtualized set of resources of a node. In some embodiments, the software processes executed by the utility management module are defined by a set of scripts located on a remote file system. The hypervisor management module directs each utility management module to execute one or more of the scripts at specified instances in time through the various control provisioning messages described above. For example, the hypervisor management module causes the hypervisor on a node to allocate resources for a virtual machine and then the hypervisor management module identifies one or more scripts for the utility management module to execute. The scripts cause the utility management module to configure the allocated resources per a user's configuration using the various provisioning messages and control messages described above.

To access the set of scripts, the utility management module mounts the remote file system. It should be apparent to one of ordinary skill in the art that in some embodiments the scripts are locally stored in the file system of the utility management module.

A hypervisor of a node therefore allocates a portion of the node's available resources for the operation of the utility management module. In this manner, the utility management module of some embodiments transforms a node from a general purpose computer to a special purpose computer once the utility management module begins operations on the node. The special purpose computer is then used by a hosting system operator to facilitate the automatic hosting of virtual machines across a grid of nodes.

The utility management module performs fully automated processes that configure the file system for each virtual machine based on a virtual machine configuration specified by a user using the front-end interfaces of some embodiments. Rather than uniformly configuring virtual machines with static configuration images, the customized configuration of some embodiments removes unnecessary or unused data and only configures the virtual machines with data related to the user-specified configuration. Moreover, parameters within the software configuration may be customized by the utility management module in the manners described below with reference to FIG. 22.

A. Utility Management Module Architecture

Figure 18:
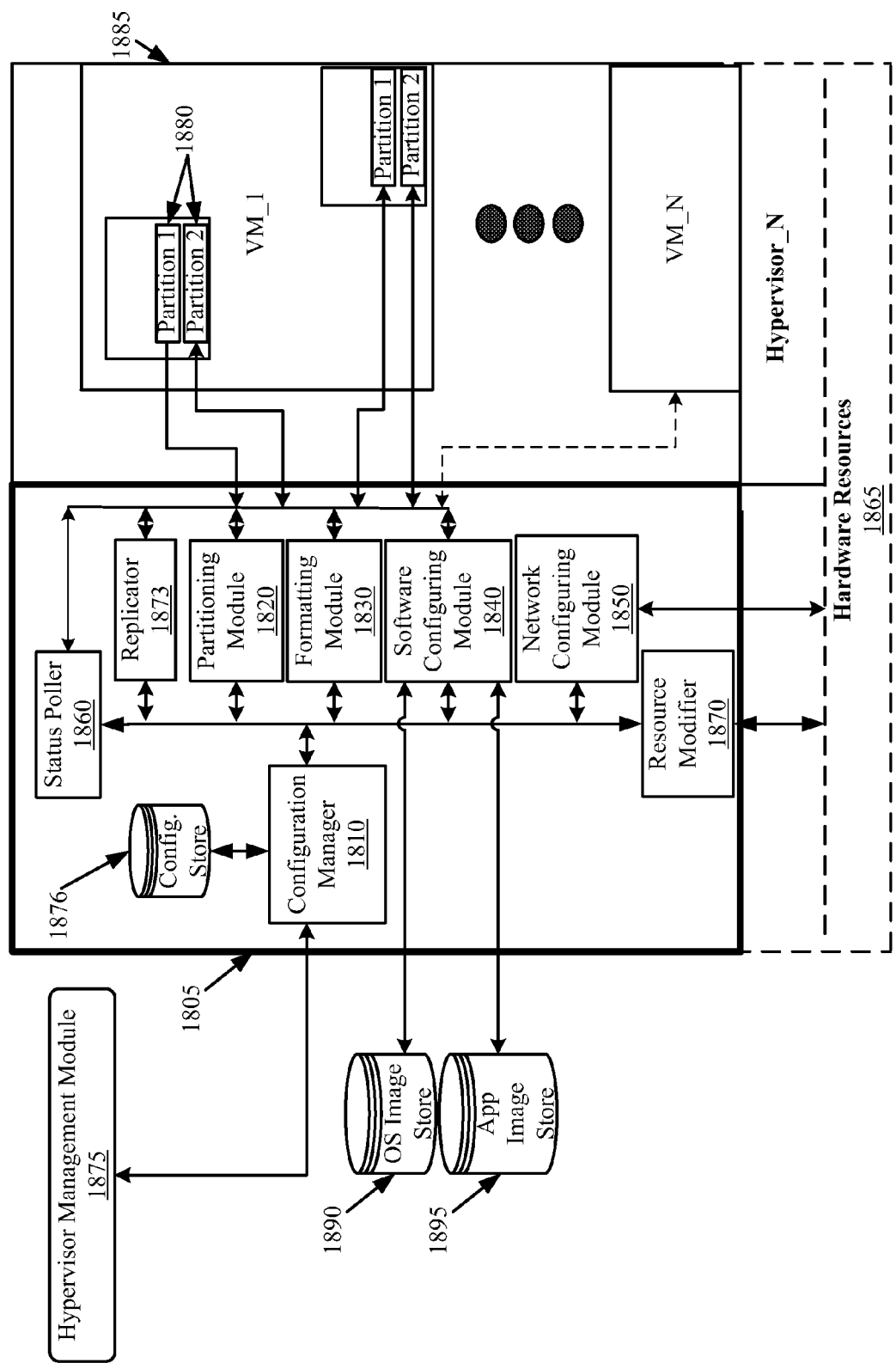
FIG. 18 illustrates various functional components of a utility management module for configuring resources allocated for a virtual machine configuration in accordance with some embodiments of the invention.

FIG. 18 illustrates various functional components of a utility management module 1805 for configuring resources allocated for a virtual machine configuration in accordance with some embodiments of the invention. In this figure, the utility management module 1805 includes: (1) a configuration manager 1810, (2) a partitioning module 1820, (2) a formatting module 1830, (3) a software configuration module 1840, (4) a network configuration module 1850, (5) a status poller 1860, (6) a resource modifier 1870, (7) a replicator 1873, and (8) a configuration store 1876. As noted above, the utility management module 1805 is a virtual machine that operates concurrently with the other virtual machines on a node. The various managers and modules (e.g., 1810-1873) of the utility management module 1805 execute one or more scripts as directed by the hypervisor management module to transform a set of the generic computing resources of a node into a specific machine implementation (i.e., the utility management module 1805) for automatedly configuring and instantiating other virtual machines on the same node.

Figure 19:
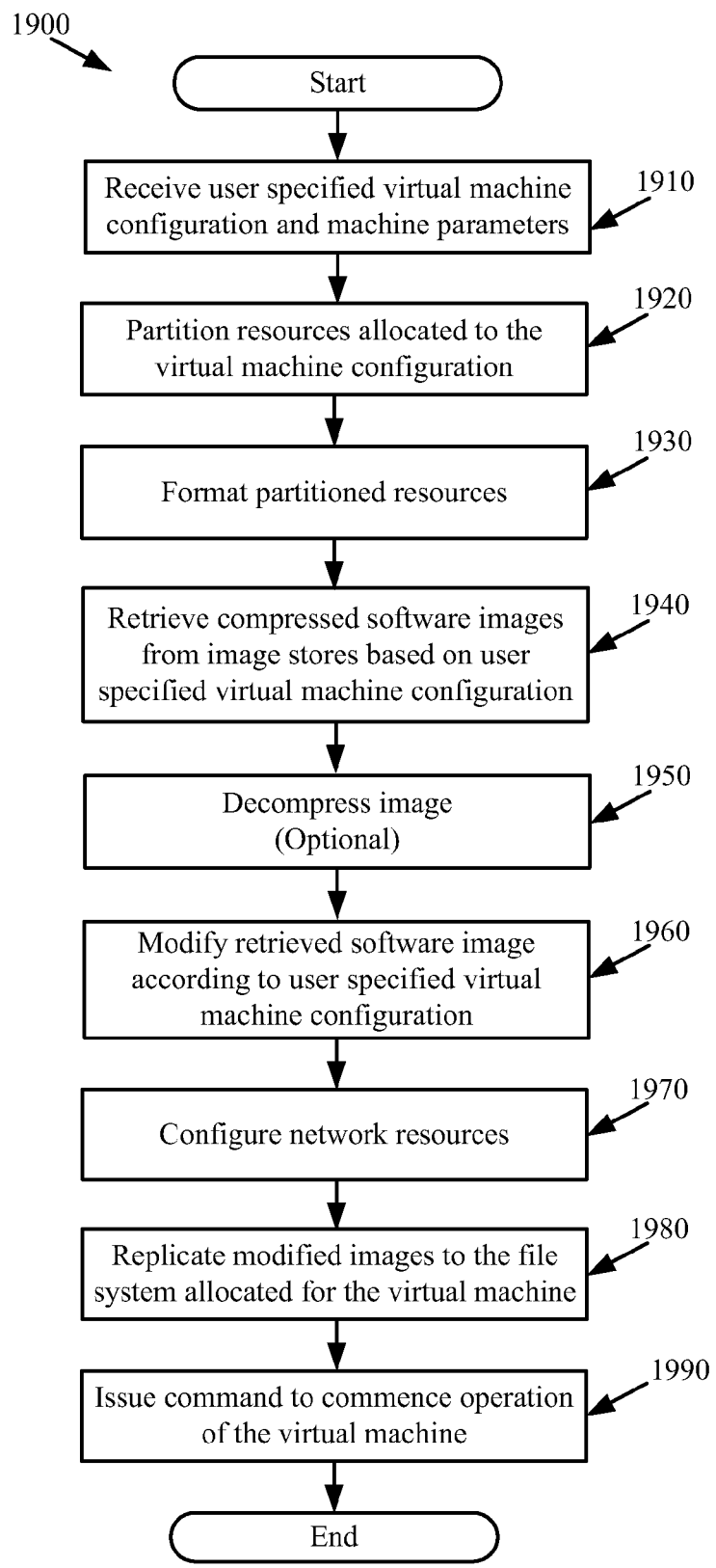
FIG. 19 presents a process performed by a utility management module to configure an allocated set of resources in accordance with some embodiments.

The modules of the utility management module 1805 will be described in conjunction with the process 1900 of FIG. 19. FIG. 19 presents a process 1900 performed by a utility management module to configure an allocated set of resources based on one or more scripts in accordance with some embodiments. The process 1900 begins by the configuration manager 1810 of the utility management module 1805 receiving (at 1910) a user-specified virtual machine configuration and associated configuration parameters for configuring a set of hardware resources allocated for hosting a virtual machine. In some embodiments, the user-specified virtual machine configuration is passed from the hypervisor management module to the configuration store 1876. In some embodiments, the configuration store 1876 specifies a directory within a file system of the utility management module 1805. The configuration manager 1810 then runs a script or process that periodically checks the configuration store 1876 for new configurations or modified configurations.

When a new or modified configuration is found, the configuration manager 1810 causes operations 1920-1990 to occur. In this manner, the configuration manager 1810 controls the operation of the functional components of the utility management module 1805. Specifically, the configuration manager 1810 parses through the user-specified configuration and identifies the various scripts to execute. One such script invokes the partitioning module 1820 of the utility management module 1805.

The partitioning module 1820 partitions (at 1920) disk storage resources of a block device that have been allocated by the hypervisor management module 1875 for the virtual machine configuration. The partitioning creates the one or more file systems to store the configuration files and user data for the user specified virtual machines. For instance, a virtual machine configuration that specifies two independently operating web servers will partition the allocated disk storage into two partitions 1880, one for each web server. Additionally, the utility management module 1805 contains logic to optimally provide the partitions such that a first web server that is expected to experience significant load and service a majority of user requests through several application programs is partitioned with more resources (e.g., a larger disk partition) than a second web server that is expected to experience only minimal load. The partitioning can also be based on an amount of resources that are requested by a user such that users customize the size of each of their respective partitions through the front end logic. In some embodiments, the partitioning involves creating a boot partition, data partition, and/or swap space for a virtual machine. In some embodiments, the partitioning module 1820 similarly partitions a local temporary file system of the utility management module that is used to construct the virtual machine before the virtual machine is copied to the actual file system allocated to the virtual machine.

It should be apparent to one of ordinary skill in the art that even though the disk partitions 1880 for virtual machine 1885 are shown separate from the hardware resources 1865 of the node, the partitions represent a portion of the hardware resources that have been allocated to the virtual machine 1885. Other shared resources (e.g., CPU, networking I/O, etc.) or unused resources are represented by the pool of hardware resources 1865.

After partitioning the block device, the configuration manager 1810 facilitates the formatting of the resources using the formatting module 1830 of the utility management module 1805 and a script retrieved from the remote file system that defines the formatting operations performed by the formatting module 1830. The formatting module 1830 formats (at 1930) the partitioned resources. Formatting defines the organization or structure of the virtual machine file system. For example, depending on the type of formatting, different file system may be created with blocks of different sizes (e.g., 512 bytes, 1 kilobyte, 4 kilobytes, etc.). The different sized blocks represent the smallest amount of the actual block device that can be allocated to hold a file or directory. By providing control over the formatting of the file system, some embodiments of the utility management module create customized file systems that are defined differently based on the user specified virtual machine configuration. Such customization is ideal in controlling the amount of fragmentation, speed, and storage overhead that result from the formatting characteristics of the file system.

In some embodiments, the formatting module 1830 formats the actual file system of the virtual machine and also the local temporary file system of the utility management module that is used to construct the virtual machine. Different configurations may require different formatting of the partitioned resources. For example, a first component in the virtual machine configuration may require FAT32 formatting for its partitioned set of resources and a second component in the virtual machine configuration may require another file system formatting (e.g., NTFS, FAT16, etc.) for its partitioned set of resources. In some embodiments, the image to be installed is a self-booting image that need only be copied onto the allocated file system. In some such embodiments, the configuration manager 1810 bypasses the formatting of the resources.

In some embodiments, the formatting module 1830 installs specific block device drivers that provide access to the disk storage device of the node. Specifically, the formatting module 1830 installs the block device drivers to facilitate disk access for the user specified operating system image that is to be used for the virtual machine. Accordingly, the formatting module 1830 analyzes the user virtual machine configuration to determine the appropriate set of block device drivers to install to the file systems before the software configuration module 1840 installs the OS image.

Once the partitioning and formatting of the resources are complete, the configuration manager 1805 tasks the software configuration module 1840 with constructing the virtual machine image based on one or more scripts for creating the user's custom configuration. The software configuration module 1840 configures the local temporary file system of the utility management module according to the user specified parameters. The software configuration module 1840 retrieves, customizes, and installs onto the temporary file system the software configuration specified within the virtual machine configuration. The software configuration module 1840 retrieves (at 1940) an operating system software image (e.g., Windows Vista®, Linux, or UNIX) from an OS image store 1890 based on the virtual machine configuration. The software configuration module 1840 also retrieves (at 1940) the various application programs specified within the virtual machine configuration from an applications image store 1895. These application programs may include any commercially available software application as well as user provided proprietary software applications. It should be apparent to one of ordinary skill in the art that the retrieved OS image may include various application programs. As such, different images may exist within the image store for the same OS, where each image includes different application programs (e.g., Windows Server 2003 with an SQL database and Windows Server 2003 with an APACHE Web Server).

In some embodiments, the software images include default configuration parameters for each software component. These images are static images intended for generalized application and for providing a template from which the utility management module is able to customize the virtual machine based on the user-specified configuration for the virtual machine. Therefore, the utility management module identifies a best matching image for a virtual machine based on the user's virtual machine configuration.

The software configuration module 1840 decompresses (at 1950) the image locally at the temporary file system if the image is compressed. By retrieving a compressed image from the data store, some embodiments reduce the data that is transferred across the hosting system in order to minimize bottlenecks at the data store or elsewhere in the system.

The software configuration module 1840 then installs (at 1960) the operating system with any specified customizations, deploys the kernel, and installs and customizes any other software that is specified for the virtual machine configuration per the virtual machine configuration to the temporary file system of the utility management module. In some embodiments, installing the operating system involves also making the operation system bootable. Modifying and/or customizing an image is described in further detail with reference to FIG. 22 below.

As noted above, since each node directly retrieves images from the image stores, some embodiments avoid having a single point of failure impact the performance of the overall hosting system. A further benefit of having the utility management modules retrieve and install the images is that the instantiation of a virtual machine occurs locally on a node. The result is a distributed system and method of virtual machine configuration as each utility management module on a particular node can simultaneously or in parallel instantiate a virtual machine configuration with other utility management modules of other nodes. Each node is therefore not dependent on other nodes. As such, the hypervisor management module can assign multiple instantiations of virtual machines across the utility management modules of multiple nodes at any time without having to wait until each node finishes installing an assigned configuration.

Referring back to FIG. 19, in some embodiments, steps 1940-1960 are performed from a batch process that is executed by the allocated set of resources. In such instances, the batch process is a script that defines the various components to be installed which are then retrieved directly from the image store by the batch process.

Once the images are installed, the configuration manager 1810 then invokes the network configuration module 1850 of the utility management module 1805 to configure (at 1970) the networking resources. Specifically, the network configuration module 1850 installs and configures the networking drivers for the virtual machine on a particular node. For instance, the network configuration module configures IP addresses, netmasks, ports, load balancing, etc. for the virtual machine. In some embodiments, the network configuration module 1850 performs other network related tasks such as acquiring a DHCP lease.

At this stage the utility management module will have constructed the virtual machine according the user-specified requirements of the virtual machine configuration. However, the constructed virtual machine resides within the temporary file system of the utility management module. Therefore, the process then uses the replicator 1873 to copy virtual machine from the temporary file system of the utility management module to the file system that has been allocated for the virtual machine. The configuration manager 1810 then instructs (at 1980) the virtual machine to begin execution and the process 1900 ends.

The utility management module 1805 also includes a status poller 1860. In some embodiments, the status poller 1860 directly monitors the performance and allocation of the hardware resources on the particular node in which the utility management module 1805 operates. In some embodiments, the data gathered by the status poller 1860 is passed to the status poller of the hypervisor management module. The status poller of the hypervisor management module may then aggregate the statistical data in order to form an overall picture of the resource usage and performance of the grid of nodes as opposed to each individual node.

The resource modifier 1870 of the utility management module 1805 compliments the resource allocation functionality of the hypervisor management module. In some embodiments, the provisioning messages from the hypervisor management module are received at the resource modifier 1870. The resource modifier 1870 may then process the provisioning messages and allocate the desired set of resources (e.g., processing cycles, memory, disk storage, etc.) in conjunction with the hypervisor operating on the same node as the utility management module.

As noted above, the utility management module performs the various configuration and modification operations to new or previously installed configurations using a set of automated scripts. According to the set of scripts, the utility management modules execute system level commands that result in the transformation of the computer readable medium of the node hosting the virtual machines. As noted above, some examples of the physical transformation include (1) the partitioning and formatting of hardware resources, (2) the retrieving, modifying, and installing of the custom software configurations onto the allocated resources of a node to instantiate the execution and processing of the virtual machine using allocated resources of the node, (3) the establishing of networking interfaces to facilitate communications for the virtual machines, and (4) the deleting, migrating, and encrypting of the virtual machines operating on the nodes.

In some embodiments, the partitioning and formatting of hardware resources performs a physical transformation on the computer readable medium by creating a file system on the block device that is used to store files according to a particular format and by designating various partitions for the file system. In some embodiments, the retrieving, modifying, and installing of the custom software configuration performs a physical transformation on the computer readable medium by modifying the contents of the computer readable medium. In some embodiments, the establishing of network interfaces performs a physical transformation on the node by configuring the node in a manner that enables the node to communicate with other nodes. In some embodiments, deleting, migrating, and encrypting virtual machines also cause physical transformation to occur on the node. For example, deleting a virtual machine causes the contents of the virtual machine to become unreadable on the computer readable medium unless a readily available backup copy of the virtual machine was made. Similarly, migrating a virtual machine causes the virtual machine to execute operations on a different node using a different set of hardware resource. Additionally, migrating the virtual machines causes previously used resources of a first node to be freed (e.g., processing resources, memory, disk, etc.) and previously unused resources of a second to node be allocated and used in the execution and processing of a virtual machine that was migrated from the first node to the second node. Encrypting a virtual machine causes a file system of the virtual machine to become unreadable unless the proper decryption keys are known.

Figure 20A:
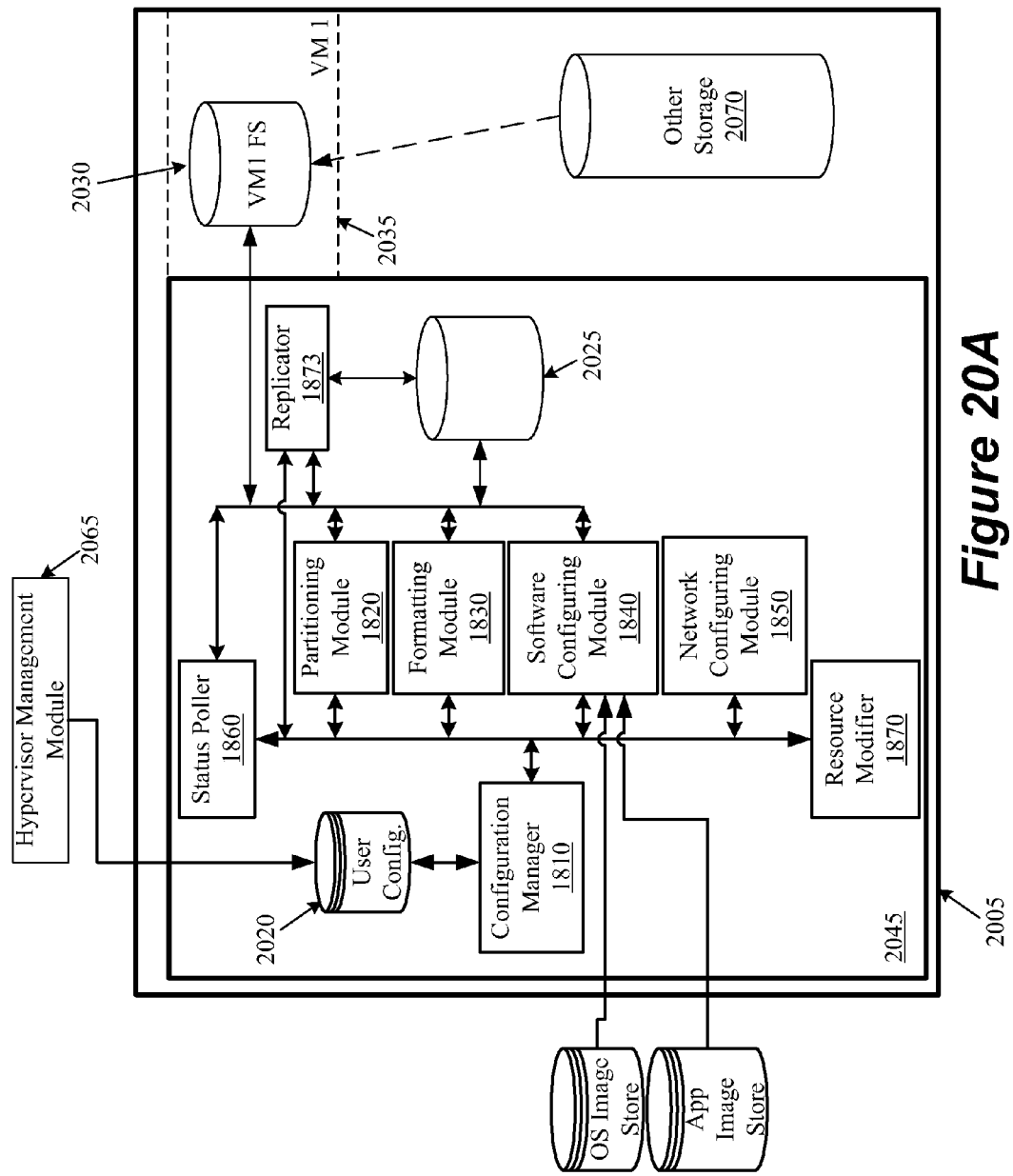
FIGS. 20A-20E provide a utility management module of some embodiments and some operations performed by the utility management module to configure a virtual machine according to a user-specified configuration.

FIGS. 20A-20E provide a more detailed description of a utility management module of some embodiments, as well as some operations performed by this module to configure a virtual machine according to a user-specified configuration. FIG. 20A illustrates a node 2005 from a gird of nodes of a hosting system of some embodiments. The node includes a utility management module 2045. The utility management module 2045 includes: (1) modules and managers 1810-1873, which were described above by reference to FIG. 18, (2) the configuration store 2020, and (3) a temporary virtual machine file system 2025. The node 2005 also has an amount of storage 2030 that has been allocated to a virtual machine 2035 and other available storage 2070, which represents unused portions of the block device of the node that may be allocated to other virtual machines. In some embodiments, these storage devices 2020, 2025, 2030 and 2070 each correspond to one or more physical storage devices. In some other embodiments, each of these storage devices 2020, 2025, 2030 and 2070 is a partition of one or more physical storage devices of the node 2005. It should be apparent to one of ordinary skill in the art that the dashed line connecting the other available storage 2070 represents that an amount of storage resources are allocated to the virtual machine. It should also be apparent to one of ordinary skill in the art that the various managers and modules 1810-1873 of the utility management module 2045 are stored within a file system storage of the utility management module 2045. Each of the modules or managers 1810-1873 includes executable instructions that the utility management module 2045 executes using processing resources of the node 2005.

The configuration store 2020 stores a user-specified virtual machine configuration. In some embodiments, the hypervisor management module 2065 passes the virtual machine configuration to the utility management module 2045 after the hypervisor management module 2045 has allocated the necessary resources from the node 2005. As noted above, the configuration manager of the utility management module 2045 periodically checks the configuration store 2020 to identify a new or modified configuration that is to be configured for a particular virtual machine on the node 2045.

The temporary virtual machine file system 2025 is used by the utility management module 2005 to construct the file system of a virtual machine according to the user-specified configuration. In some embodiments, the temporary virtual machine file system 2025 is separate from the actual block device 2030 allocated to the virtual machine 2035 by the hypervisor management module 2065. The temporary virtual machine file system 2025 thus stores a working copy of the virtual machine that when complete and functional is copied over to the block device 2030 allocated to the virtual machine 2035.

In some embodiments, the separation is necessary as the virtual machine is provisioned a large amount of storage where only a small fraction of this provisioned storage is used to store the virtual machine configuration. The remaining storage may be used for user data. Accordingly, by separating the temporary virtual machine file system 2025 from the actual allocated block device 2030 for the virtual machine 2035, the size of the temporary virtual machine file system 2025 may include a much smaller set of storage resources than the allocated block device for the actual virtual machine.

The other storage 2070 stores other data stored on the node that have not been provisioned for use by the virtual machine to be configured. In some embodiments, the other storage 2070 stores virtual machine configurations not mentioned with reference to FIGS. 20A-20E, as well as unallocated storage of the node 2005.

Figure 20B:
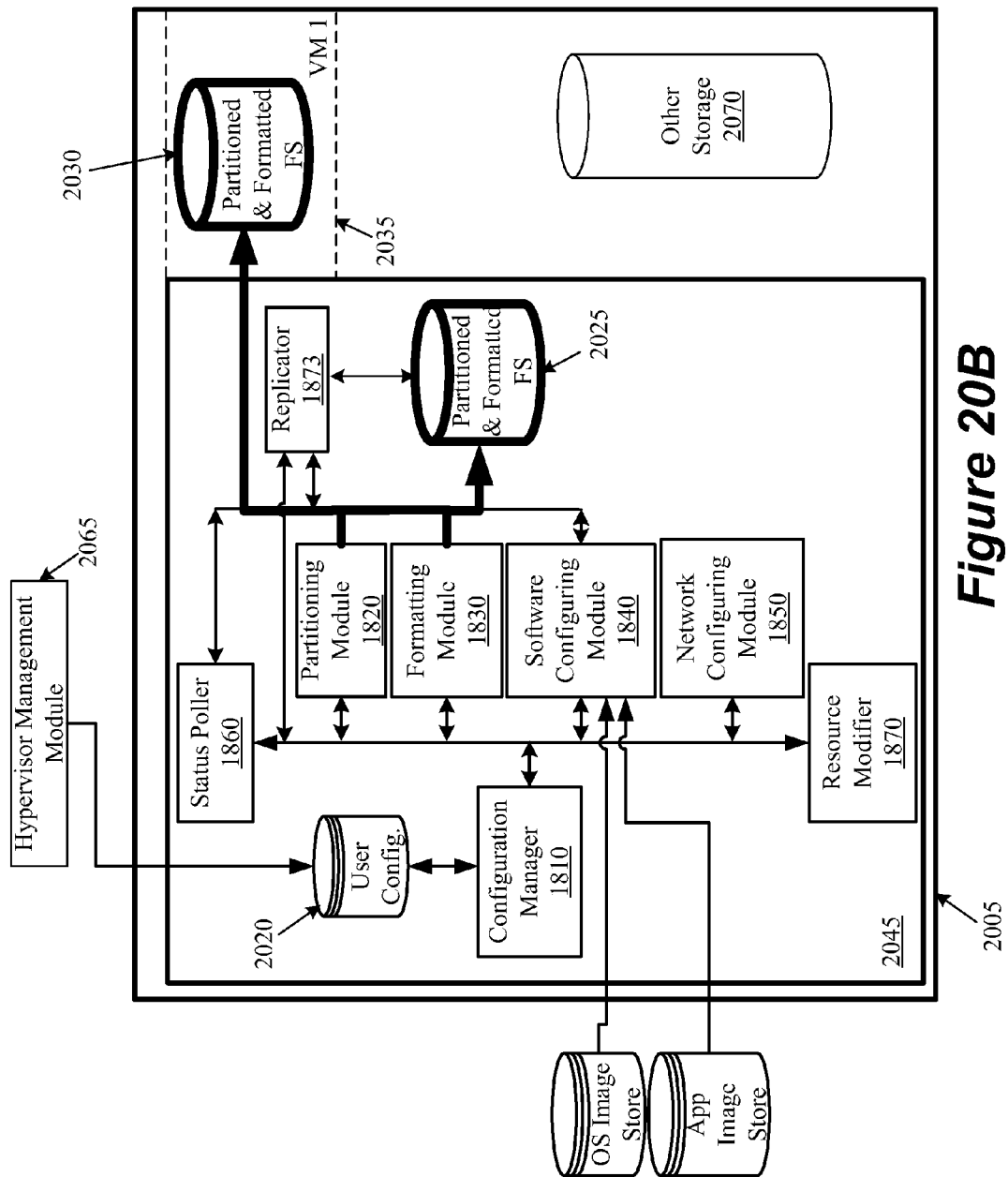

FIG. 20B illustrates the node 2005 of FIG. 20A (1) after the partitioning module of the utility management module 2045 partitions the temporary virtual machine file system 2025 and the actual block device of the virtual machine 2035 as per step 1920 described above and (2) after the formatting module of the utility management module 2045 formats the temporary virtual machine file system 2025 and the actual block device 2030 of the virtual machine 2035 as per step 1930 described above. At this stage, the utility management module 2045 has performed a first set of customizations to the file system 2030 of the virtual machine 2035. Namely, creating user-specified partitions and user-specified formatting of the partitions.

Figure 20C:
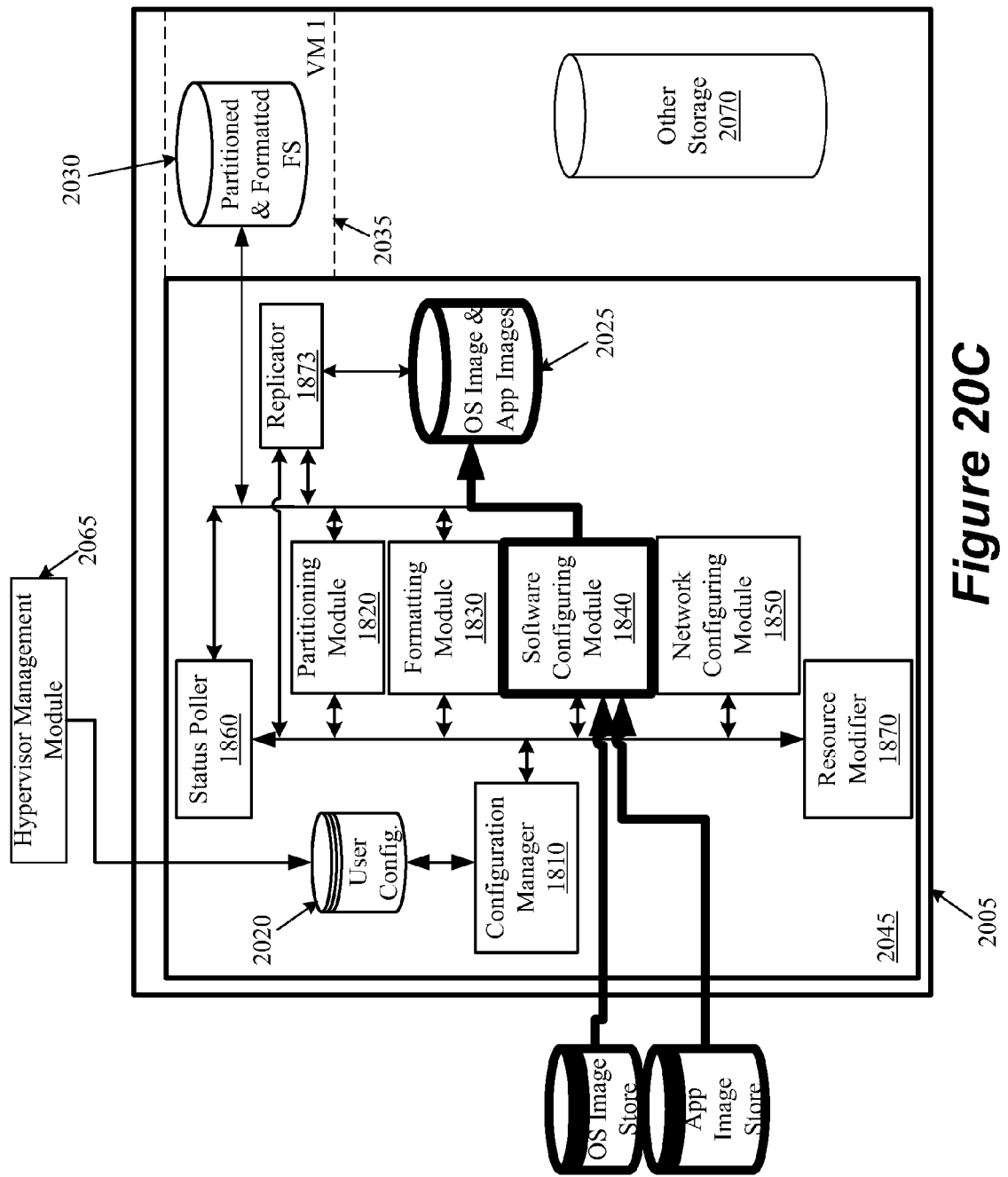
Figure 20D:
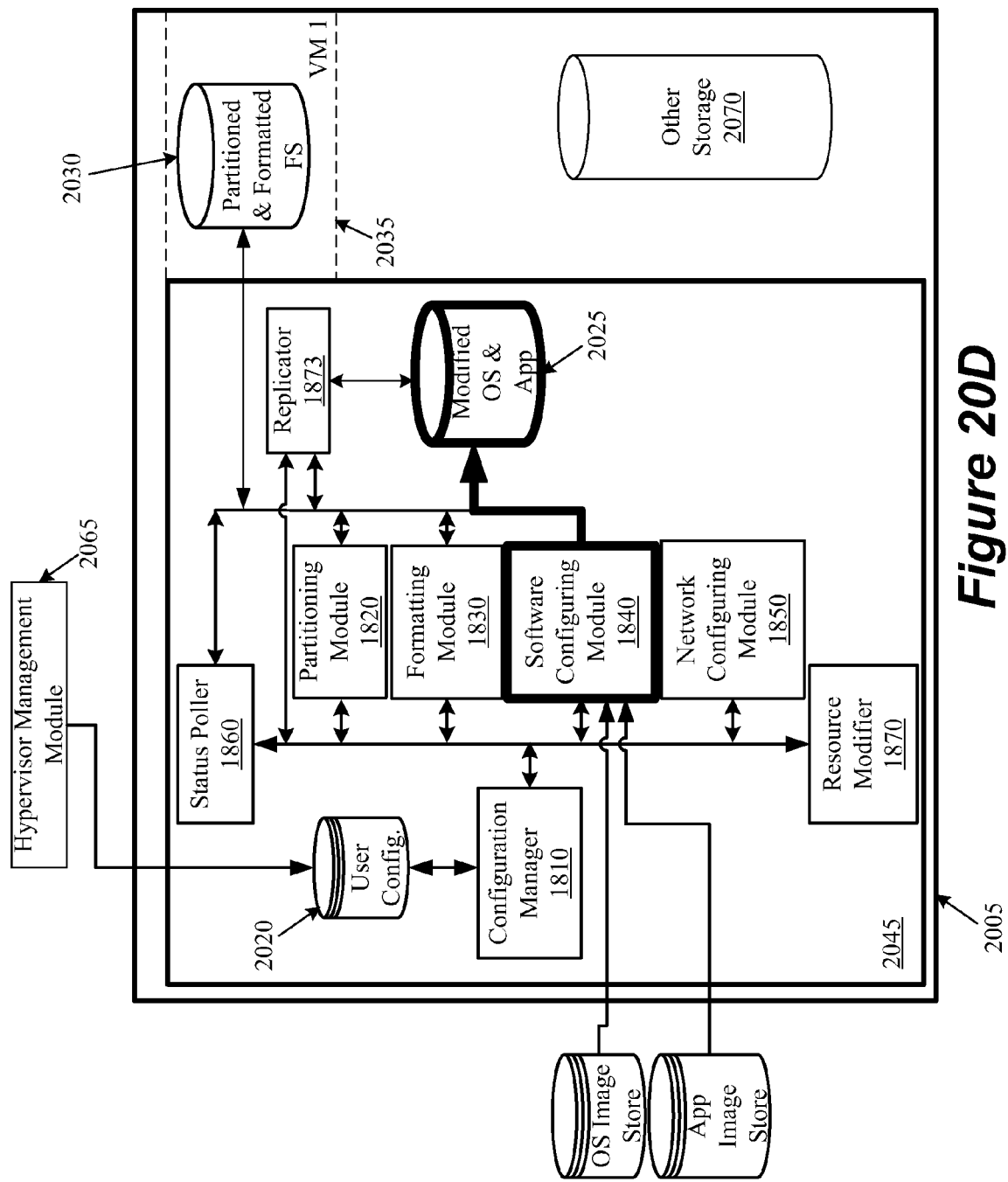

FIG. 20C illustrates the node 2005 after the software configuration module retrieves and installs an operating system image and zero or more application images onto the temporary virtual machine file system 2025 as per steps 1940 and 1950 above. The software configuration module then customizes the images according to the user-specified configuration as per step 1960 above. In some embodiments, the customizations include modifying the images to configure networking parameters for the virtual machine. FIG. 20D illustrates the node 2005 after the software configuration module customizes the retrieved set of images per step 1960 above.

Figure 20E:
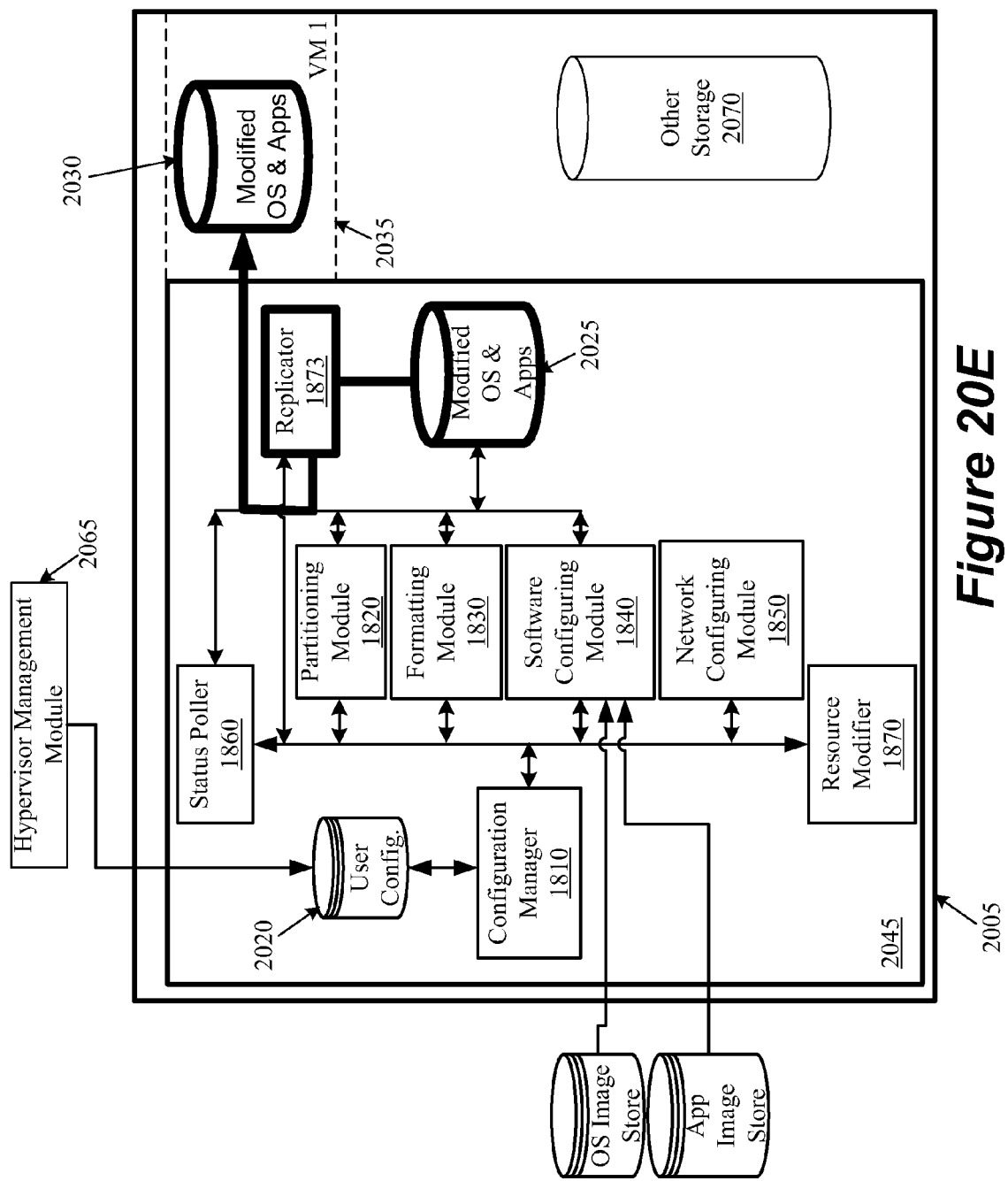

The temporary virtual machine file system 2025 now stores a complete and functional user-specified virtual machine. As shown in FIG. 20E, the replicator 1873 of the utility management module 2045 copies the contents of the temporary virtual machine file system 2025 to the actual block device 2030 allocated to the virtual machine 2035. The virtual machine can then be instantiated by calls to the hypervisor. In some such embodiments, the replicator 1873 then securely deletes the contents of the temporary virtual machine file system 2025.

Additionally, the utility management module 2045 of some embodiments notifies the hypervisor management module 2065 that the configuration has been installed on the node 2005 (i.e., installed on the hypervisor of the node 2005 in some embodiments). In some embodiments, the notification includes a copy of the customized virtual machine image such that the image is stored for later access or modification. In some embodiments, the hypervisor management module 2065 informs a front-end provisioning manager (e.g., the front-end provisioning manager 920 of FIG. 9) that the virtual machine configuration has been installed on the node 2005. The front-end provisioning manager then presents a notification to a user (e.g., through a service request server, such as the service request server 910 of FIG. 9). In some embodiments, this notification is a visual notification presented in a GUI (e.g., a GUI of a standalone application or a web browser).

Figure 21:
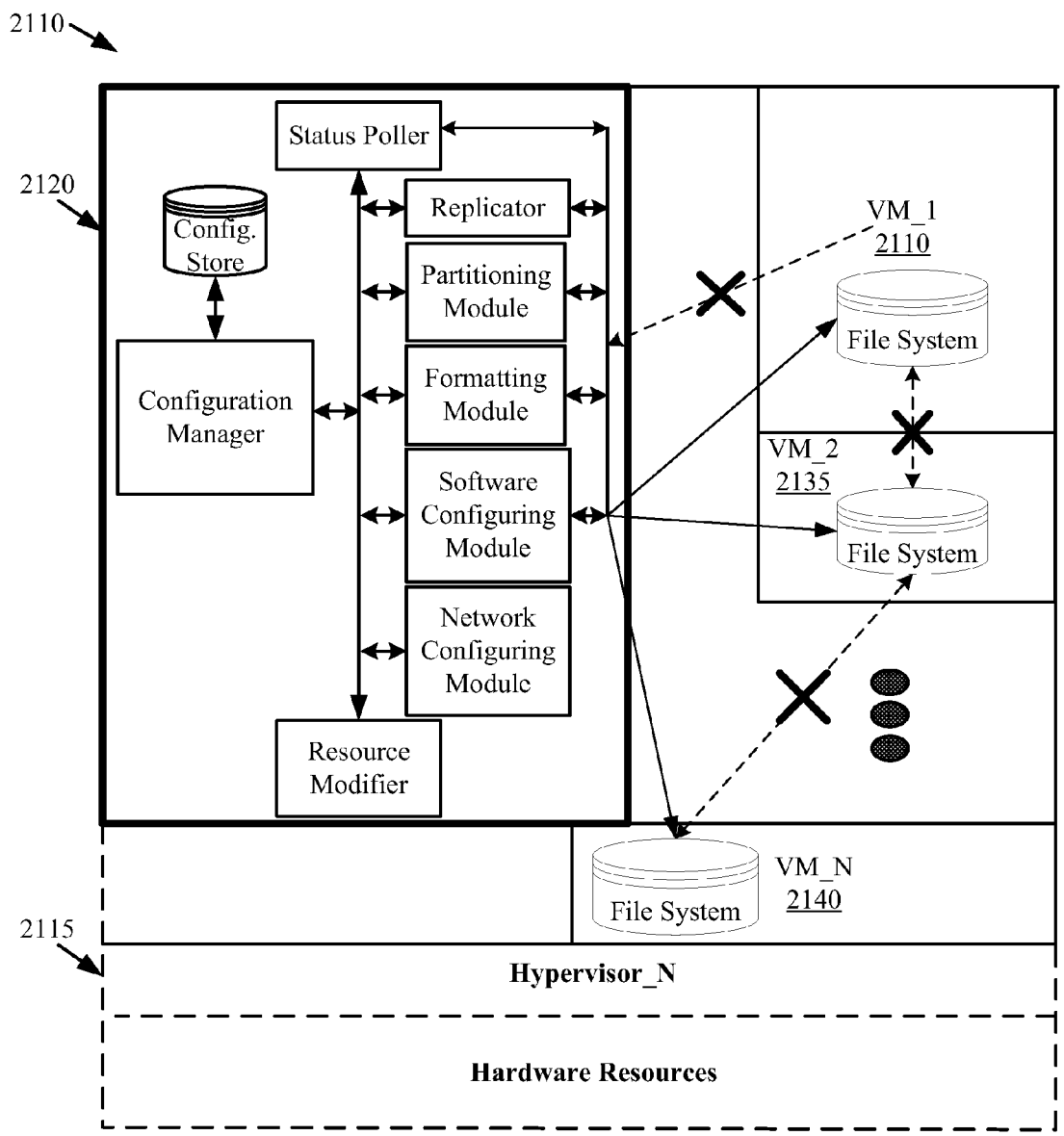
FIG. 21 conceptually illustrates the ability of a utility management module of some embodiments to access file systems of other virtual machines operating on the same node as the utility management module.

To partition the file systems of the virtual machines, format the file systems of the virtual machines, and duplicate the customized images to the allocated block device of the virtual machines, the utility management module and its various modules and managers are allowed direct access to the file system resources of every virtual machine allocated to the same node as the utility management module. In some embodiments, directly accessing the file system includes system calls made to the hypervisor that then authorize the access. FIG. 21 conceptually illustrates the ability of a utility management module of some embodiments to access file systems of other virtual machines operating on the same node as the utility management module.

In FIG. 21, a node 2110 includes a hypervisor 2115, a utility management module 2120, and several user virtual machines 2130-2140 that perform operations using the hardware resources of the node 2110. As shown, the utility management module 2120 is able to access the file systems of each of the virtual machines 2130-2140. However, the virtual machines 2130-2140 are prevented from accessing the file systems of the utility management module 2120 or the file systems of other virtual machines.

Specifically, the hypervisor 2115 maps a set of resources that include some amount of block storage from the block device of the node 2110 to each virtual machine 2130-2140. The allocated storage can then be configured in any manner to store the virtual machine configuration files, such as operating system files, application programs, etc., and other data used in the operations of the virtual machines, such as customer specific data. However, since each virtual machine 2130-2140 is only aware of those resources to which it is allocated, the virtual machines 2130-2140 are unable to accidentally overwrite data of another virtual machine. Any call to access a file system or a portion of a file system outside of the set of resources mapped to a particular virtual machine is intercepted by the hypervisor 2115 and prevented from being executed.

As noted above, the utility management module 2120 is also a virtual machine, but the utility management module 2120 requires access to the other file systems. Therefore, in some embodiments, node 2110 and other nodes used within the grid of nodes of the hosting system provider of some embodiments are modified with a specialized set of instructions that permit the utility management module 2120 to access each of the file systems of each virtual machine 2130-2140 and thus perform various functions over the file systems.

In some embodiments, the hypervisor 2115 operating on the node 2110 is also modified to recognize the calls and provide the utility management module 2120 special access to file systems of the different virtual machines. For example, the utility management module 2120 is provided with administrator level access permissions and each of the virtual machines 2130-2140 are provided only user level access permissions.

Using the file system access, the utility management module configures the allocated resources for a given configuration by adding, removing, or modifying files to and from the file system in order to instantiate the custom configuration. For example, the utility management module may use a resize command for an Ext3, NTFS, or LVM disk partition to modify a configuration by adding additional disk space to the configuration. In some embodiments, access to the file system is made by the utility management module in the same manner that the hypervisor of the node accesses the file system.

Several advantages result from having the utility management module operate at the same levels as the other virtual machines of a node. For example, by having one virtual machine such as the utility management module configure the file systems of other virtual machines, the host operating system of a node (e.g., Domain 0 of a type 2 hypervisor) is freed from having to devote processing, memory, and storage resources that would otherwise be required to configure the file systems of the virtual machines. Additionally, the host operating system would become a bottleneck. Specifically, some virtual machines would compete for configuration or modification resources of the host operating system while other virtual machines would compete for traditional hypervising operations that require input/output processing. A further bottleneck is avoided as the host operating system is at a different level of abstraction than the virtual machines. As such, the host operating system would be unable to directly issue commands and perform operations on the file systems of the virtual machines, whereas the utility management module is able to do so. Therefore, in some embodiments, the utility management module includes its own operating system and application programs as shown above. In this manner, the utility management module is able to access and modify file systems that would otherwise be unable to standalone virtualized applications that are not standalone virtual machines.

B. Customizing Configurations

Figure 22:
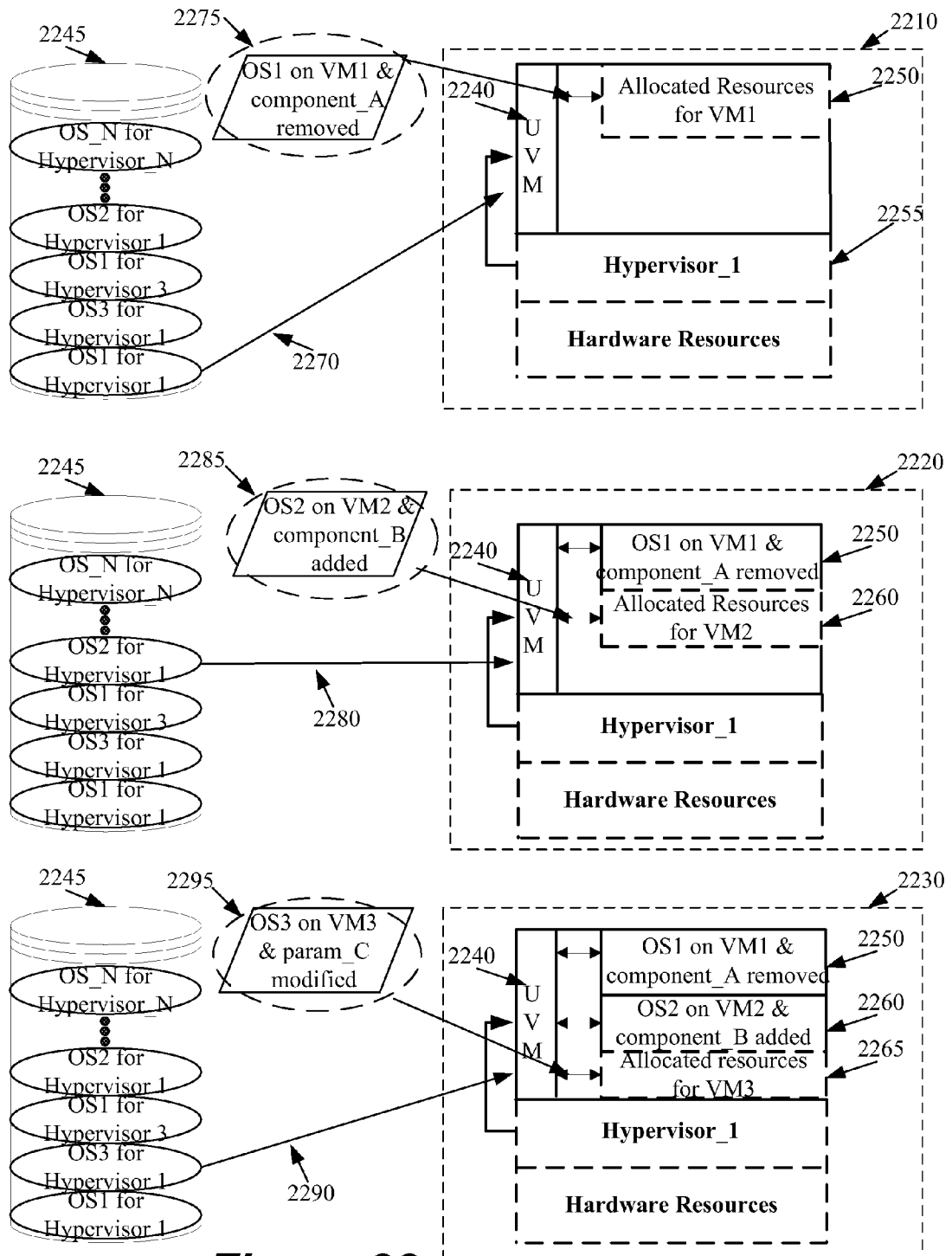
FIG. 22 illustrates the various customizations performed by a utility management module in accordance with some embodiments of the invention.

FIG. 22 illustrates the various customizations performed by a utility management module in accordance with some embodiments of the invention. In this figure, a particular node is shown at three different stages of operation 2210, 2220, and 2230 with each stage configuring an additional virtual machine to operate using the allocated sets of resources. In some embodiments, each stage is dependent on the other stages and therefore the stages are performed sequentially. In other embodiments, the stages are independent of one another and therefore may occur in parallel.

At the first stage of operation 2210, the utility management module 2240 configures a first allocation of resources 2250 represented by the dashed lines. To perform the configuration, the utility management module 2240 retrieves a first OS image 2270 from an OS image store 2245. The utility management module 2240 then customizes the retrieved image based on the user's specification within the virtual machine configuration. A first level of customization reduces the number of components from the retrieved image to produce the customized image 2275. For example, the user's virtual machine configuration specifies which components are extraneous. If the user's virtual machine configuration only specifies a virtual storage server and the retrieved image also includes a web/internet related application, then the utility management module 2240 removes web/internet related applications from the retrieved image 2270 before configuring the resources 2250. The utility management module 2240 then applies the modified image 2275 to the allocated set of resources. Thereafter, the virtual machine is configured according to the user's specifications and the virtual machine begins operating.

At the second stage of operation 2220, a second level of customization occurs to an image 2280 retrieved for configuring a second set of resources 2260 allocated for a second virtual machine of the node. This second level of customization involves modifying the retrieved image 2280 by adding additional components not within the retrieved image based on the user's virtual machine configuration to produce the customized image 2285. For instance, some users may execute, test, or develop their proprietary software solutions on the hosted nodes. Accordingly, in some embodiments, the utility management module 2240 installs the desired components that were specified and made available at the time of defining the configuration. The modified image 2285 is then applied to the allocated set of resources 2260 to create and configure the resources per the user's specification in the second virtual machine configuration. In some other embodiments, the utility management module first retrieves an OS image from an OS image store. Then, based on the user configuration, the utility management module retrieves additional software application images from an applications image store. In this manner, the utility management module modularly builds the user specified configuration, one software component at a time and modifying parameters of each component when necessary.

At the third stage of operation 2230, a third level of customization occurs to an image 2290 retrieved for configuring a third set of resources 2265 allocated for a third virtual machine of the node. This third level of customization involves modifying values for parameters and settings of the operating system or applications within the retrieved image 2270 to produce the customized image 2295. These settings are often unique to each user and may require that the modifications be made at the time of installation or after installation of the image. Such values cannot be known or accounted for when creating and storing the images within the image store. Typically, these values are manually changed by a system operator after the configuration is applied to the set of resources. However, some embodiments of the utility management module 2240 automate such modifications by applying the changes directly to the retrieved image or by applying the changes to a running image that has been previously applied to the allocated set of resources for the configuration. The modified image 2295 is then applied to the allocated set of resources 2260 to create and configure the resources per the user's specification in the second virtual machine configuration.

Some examples of custom parameters include: (1) a user adding a web server through the front-end logic and specifying custom IP addresses for the server or (2) a user adding a data server through the front-end logic and specifying custom queries to run with the data server. It should be apparent to one of ordinary skill in the art that each of the various customizations illustrated above can be performed to a single retrieved image for a particular virtual machine configuration. Moreover, the three customizations illustrated above are not intended to be a comprehensive set of customizations, but rather an illustrative set of customizations performed by the utility management module of some embodiments.

Figure 23:
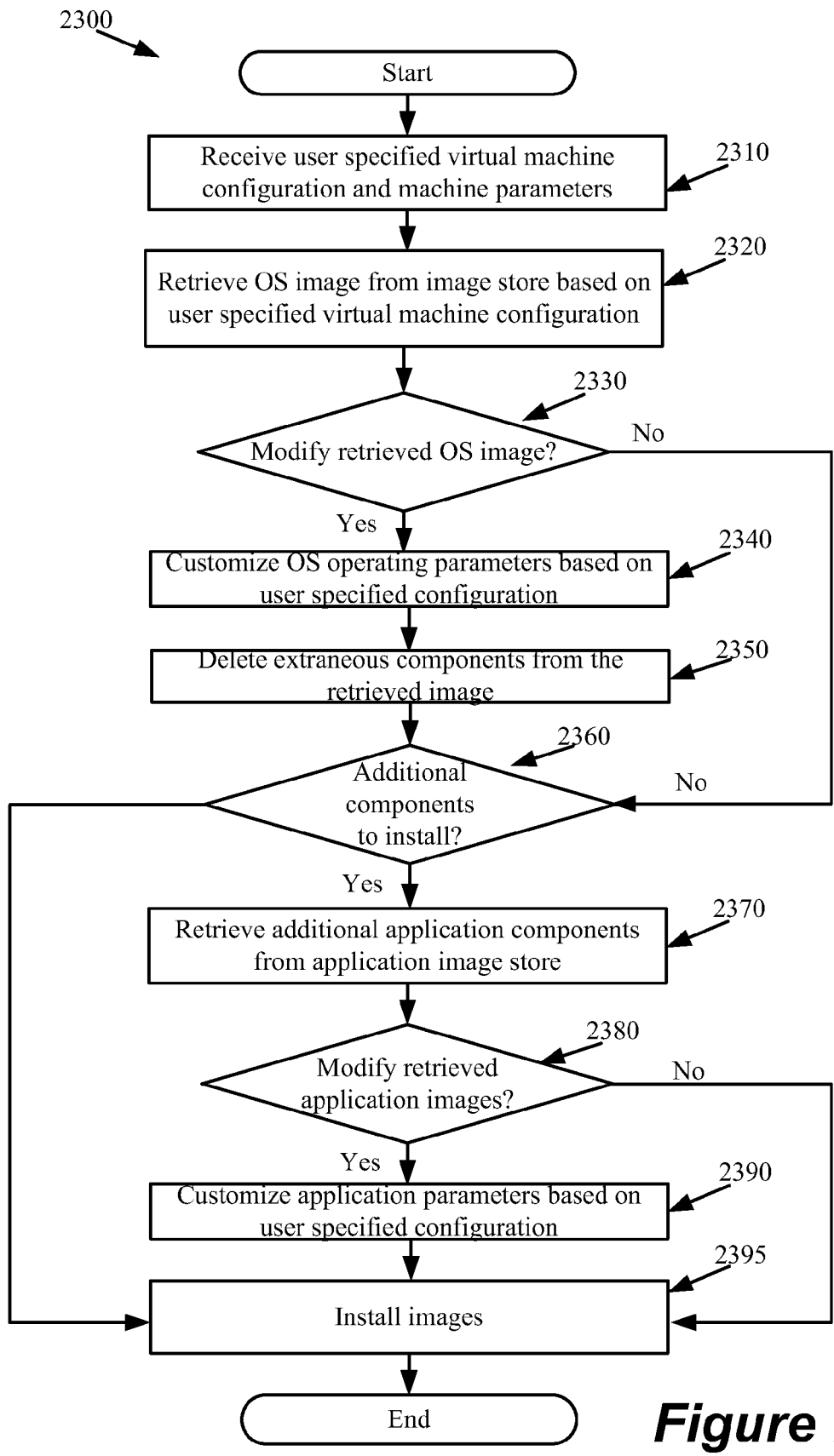
FIG. 23 presents a process implemented by a utility management module of some embodiments to customize an image in accordance with FIG. 22.

FIG. 23 presents a process 2300 implemented by a utility management module of some embodiments to customize an image in accordance with FIG. 22. The process 2300 begins when the utility management module receives (at 2310) a user specified virtual machine configuration to install. The process retrieves (at 2320) an OS image from an OS image store that closely matches the OS requested within the user specified virtual machine configuration. The process then determines (at 2330) if the retrieved OS image requires modification based on the parameters specified within the configuration. As described above, this determination is based on whether operational parameters for the OS have been set by the user (e.g., IP address, hostnames, proxy server parameters, etc.).

When the process determines that no modifications are to be made to the OS image, the process proceeds to step 2360. Otherwise, the process customizes (at 2340) the OS parameters based on the user specified configuration. Accordingly, the utility management module configures the various operational parameters for the OS. Additionally, the user specified configuration may specify the deletion of various OS components. For example, a particular OS may include a web server application. However, the user may opt to delete the included web server application and instead install a proprietary or other web server application. Therefore, the process deletes (at 2350) any extraneous components from the configuration.

At 2360, the process determines whether additional components are to be installed in conjunction with the OS image. When no further additional components are required, the process proceeds to install (at 2395) the retrieved and modified images for the virtual machine. Otherwise, the process retrieves (at 2370) the desired application images from the application image store.

The process performs an additional determination (at 2380) as to whether the application images are to be modified. When necessary, the process customizes (at 2390) the application parameters according the user specified configuration. For instance, certain applications may require access to data stored in a data server that is installed on a different node. Accordingly, the process configures the application with the necessary authentication and authorization parameters. The process then installs (at 2395) the retrieved and modified images and ends.

C. Modifying Configurations

Should any of configurations be modified after commencement of operations, some embodiments of the utility management module provide the functionality to further modify the configurations. As mentioned above, the utility management module is able to access the file systems of any of virtual machines. Therefore, the utility management module of some embodiments makes the changes during operation of the virtual machine. Alternatively, the utility management module of some embodiments suspends operation of the virtual machine until the changes are complete. In still other embodiments, the utility management module creates a duplicate image on which to apply the changes. Once the changes are complete, the modified configuration begins operations and the unmodified configuration is suspended resulting in little to no downtime to the user's virtual machine.

FIG. 24 illustrates an exemplary set of operations performed by a utility management module of some embodiments to modify a configuration. Specifically, FIG. 24 illustrates the utility management module resizing disk storage that was previously allocated to a virtual machine configuration and configuring an image on the modified resource.

On lines 1-2, the utility management module identifies the hostname of the virtual machine to be modified and determines the OS image from the OS image store to install. A password is set for security in line 3. On line 4, the utility management module executes a script that uses SSH to log into the virtual machine where the image will be installed and removes unexecuted tasks for the last job that was to be processed. The utility management module creates (e.g., partitions and formats) a local logical file system to temporarily store the virtual machine image as the image is built by the utility management module. In creating the local file system, the utility management module specifies various parameters that include the user account number (16323), session identification (730), job number (5756), and the size of the disk storage (60 Gb) to allocate to the modified virtual machine. The utility management module then attaches the block device to the utility management module as a secondary disk at line 7.

On line 8, the utility management module performs an install script that installs the modified configuration with a user-specified configuration. Then on lines 9-19, the utility management module copies the contents of the local file system to the file system of the virtual machine in order to instantiate the virtual machine with the resized storage. Lines 12-19 illustrate various statistical information that is generated during the transfer of the virtual machine from the utility management module's local file system to the file system of the virtual machine. In some embodiments, the collected statistics are reported back to the hypervisor management module.

The image is then made bootable through a set of system level commands at lines 20-22. Partition tables are updated at line 23. The file system that now contains the transferred image is mounted to the virtual machine at line 24. The utility management module performs consistency checks to ensure the proper installation of the image on the disk and collects additional statistics for reporting at lines 25-43. Once the resources have been resized and the installation of the image is complete, some embodiments then modify the configuration files of the hypervisor running on the node on which the virtual machine was installed. The utility management module modifies the configuration files so that the hypervisor is able to recognize the newly installed virtual machine.

It should be apparent to one of ordinary skill in the art that the set of operations presented in FIG. 24 is meant to provide an exemplary set of operations performed by the utility management module in order to modify a configuration. Additional operations may be performed in conjunction with or instead of the enumerated set of operations in order to produce the modified configuration.

The utility management module of some embodiments automatically modifies an existing virtual machine based on one or more performance thresholds specified for the virtual machine. In some embodiments, when a user defines a virtual machine configuration, the user defines each of the hardware resources and software resources that form the overall virtual machine. For instance, a user specifies an amount of memory and processing resources to be used in conjunction with web servers, application servers, databases, etc. as software resources of a virtual machine. Then for each of the specified resources, the user may specify one or more thresholds. Based on whether the specified thresholds are met or exceeded during runtime operation of the virtual machine, the utility management module of some embodiments automatically up-scales or down-scales the various resources of the virtual machine.

To determine whether to up-scale or down-scale resources, the hosting system monitors the usage of the virtual machine resources in order to determine which thresholds are met or exceeded. As noted above, the hardware resources of each node, and more particularly the resources of each virtual machine, may be monitored by the hypervisor management module or by the utility management module.

Figure 25:
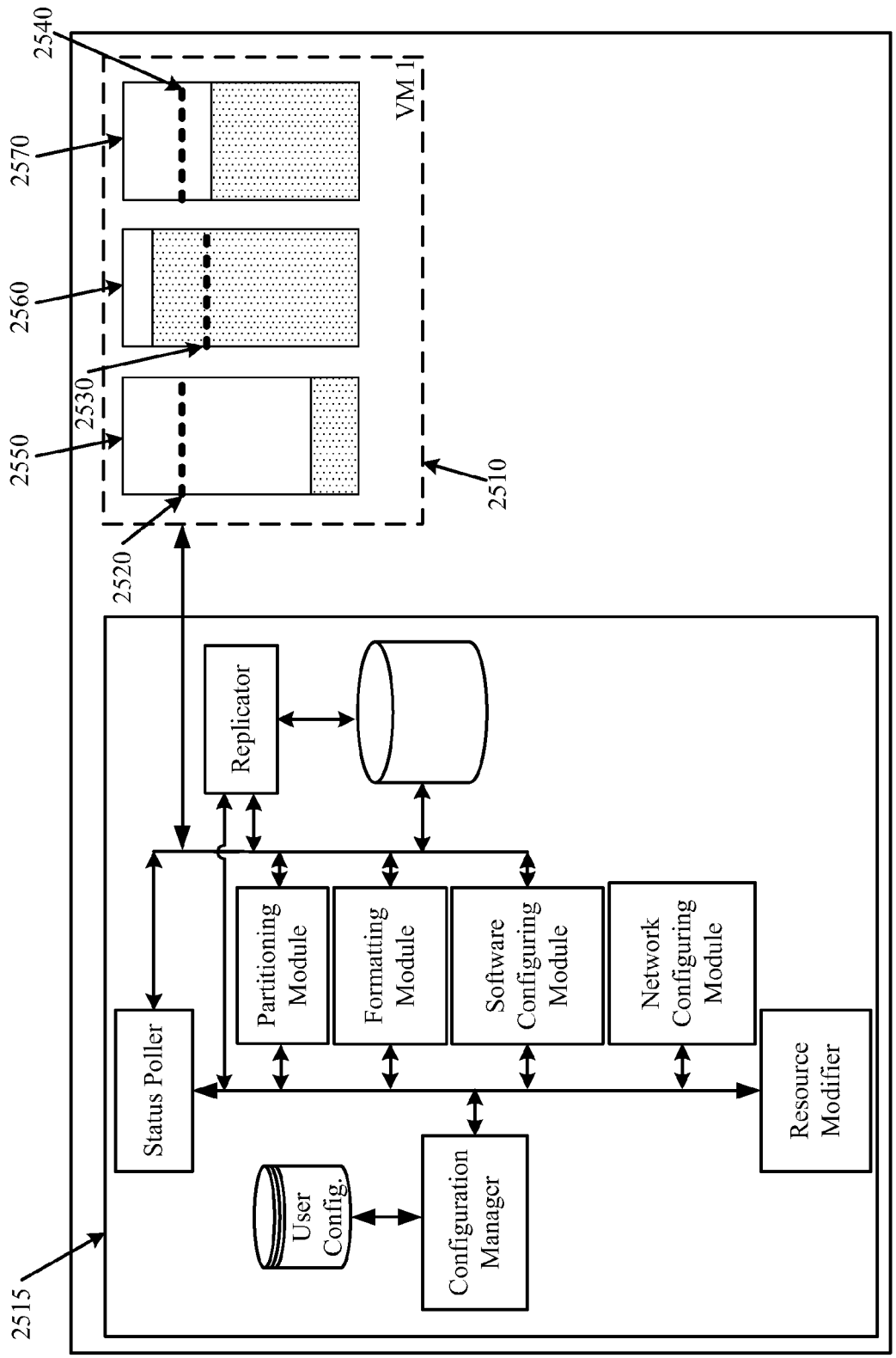
FIG. 25 conceptually illustrates thresholds for various resources of a running virtual machine that are used by a utility management module of some embodiments to automatically scale the virtual machine resources.

FIG. 25 conceptually illustrates thresholds for various resources of a running virtual machine 2510 that are used by a utility management module 2515 of some embodiments to automatically scale the virtual machine resources. FIG. 25 illustrates three thresholds 2520-2540 for three separate resources 2550-2570 of the virtual machine 2510: (1) a threshold 2520 specified for allocated processor resources 2550 of the virtual machine 2510, (2) a threshold 2530 specified for allocated memory resources 2560 of the virtual machine 2510, and (3) a threshold 2540 specified for performance (e.g., average latency for executing user requests) of a software resource 2570 of the virtual machine 2510. Specifically, the figure illustrates usage of the three resources 2550-2570 at a specific instance in time during the runtime operation of the virtual machine 2510.

As shown, resources 2550 and 2570 remain within the acceptable bounds of their respective thresholds 2520 and 2540. However, usage of the memory resource 2560 exceeds the user specified threshold 2530. In some such instances, the utility management module 2515 automatically up-scales the memory resource 2560 to increase the amount of memory that is allocated to the virtual machine 2510. By having the utility management module 2515 automatically up-scale the allocated memory, the virtual machine 2510 avoids performance issues related to exceeding the memory resource 2560. Some such performance issues include excessive disk paging or memory thrashing. It should be apparent to one of ordinary skill in the art that though the thresholds of FIG. 25 are shown are upper bound limits, users may also specify lower bound thresholds the when met cause the utility management module 2515 to down-scale one or more resources. For example, the utility management module 2515 decreases the amount of allocated memory for the virtual machine 2510. In this manner, the hosting system automatically guarantees performance of a user's virtual machine (e.g., by up-scaling resources) without having the user continually monitor and adjust the resources of his or her hosted virtual machine. Additionally, the hosting system automatically reduces the cost associated with hosting a virtual machine in a hosting system by automatically downscaling resources of the user's virtual machine at times when the resources of the virtual machine are under-utilized or demand fails to meet expected usage levels.

To up-scale a resource, the utility management module increases the amount of an already allocated resource. Such up-scaling of a resource includes horizontally up-scaling the resource and vertically up-scaling the resource. The utility management module of some embodiments horizontally up-scales a resource by replicating the resource such that a single resource performing a particular task is duplicated to include a second such resource that also performs the same task. In some embodiments, horizontally up-scaling a resource includes replicating a software resource of the virtual machine to provide a second instance of the software resource that processes in parallel those operations that were previously processed by only a first instance of the software resource.

For example, prior to a horizontal up-scaling of a software resource, a virtual machine operates using a single web server. The virtual machine is allocated 1 GHz of processing cycles and 1 Gb of RAM and the processing cycles and memory are only 40% utilized during operating of the virtual machine. However, the reason for the 40% utilization is that the web server is over-burdened and therefore causes a bottleneck in the operation of the virtual machine. The utility management module horizontally scales the virtual machine by adding a second web server where 500 MHz of processing cycles and 500 Mb of RAM are allocated to the first web server and the other 500 MHz of processing cycles and 500 Mb of RAM are allocated to the second web server in order to cure the bottleneck.

The utility management module of some embodiments vertically up-scales a resource by increasing the allotment of the resource. In some embodiments, vertically up-scaling a resource includes increasing an amount of a hardware resource that has been allocated to a virtual machine. In some such embodiments, the hypervisor management module in conjunction with the utility management module allocates additional processing power, memory, storage, or network resources to vertically up-scale the resource.

For example, prior to a vertical modification, a virtual machine operates using a single web server. The virtual machine is allocated 1 GHz of processing cycles and 500 Mb of RAM where the RAM is fully utilized resulting in page faults and more frequent access to the slower block device. The hypervisor management module in conjunction with the utility management module vertically up-scales the virtual machine by adding an additional 500 Mb of RAM to the virtual machine. The additional memory results in fewer page faults and thus faster overall performance.

In some embodiments, horizontally or vertically down-scaling a resource is performed when excessive resources are allocated to the virtual machine. In a hosting system, such excess allocation results in the user being charged for resources that are not being used. Therefore, by specifying down-scaling thresholds, the utility management module can automatically release the unused resources and thus prevent the user from being overcharged when demand for the resources are lower than expected. In some embodiments, horizontally down-scaling a resource involves the utility management module removing a second resource of a virtual machine that redundantly performs a task already performed by a first resource of the virtual machine. In some embodiments, vertically down-scaling a resource involves the utility management module decreasing an amount of a resource allocated to the virtual machine.

Figure 26:
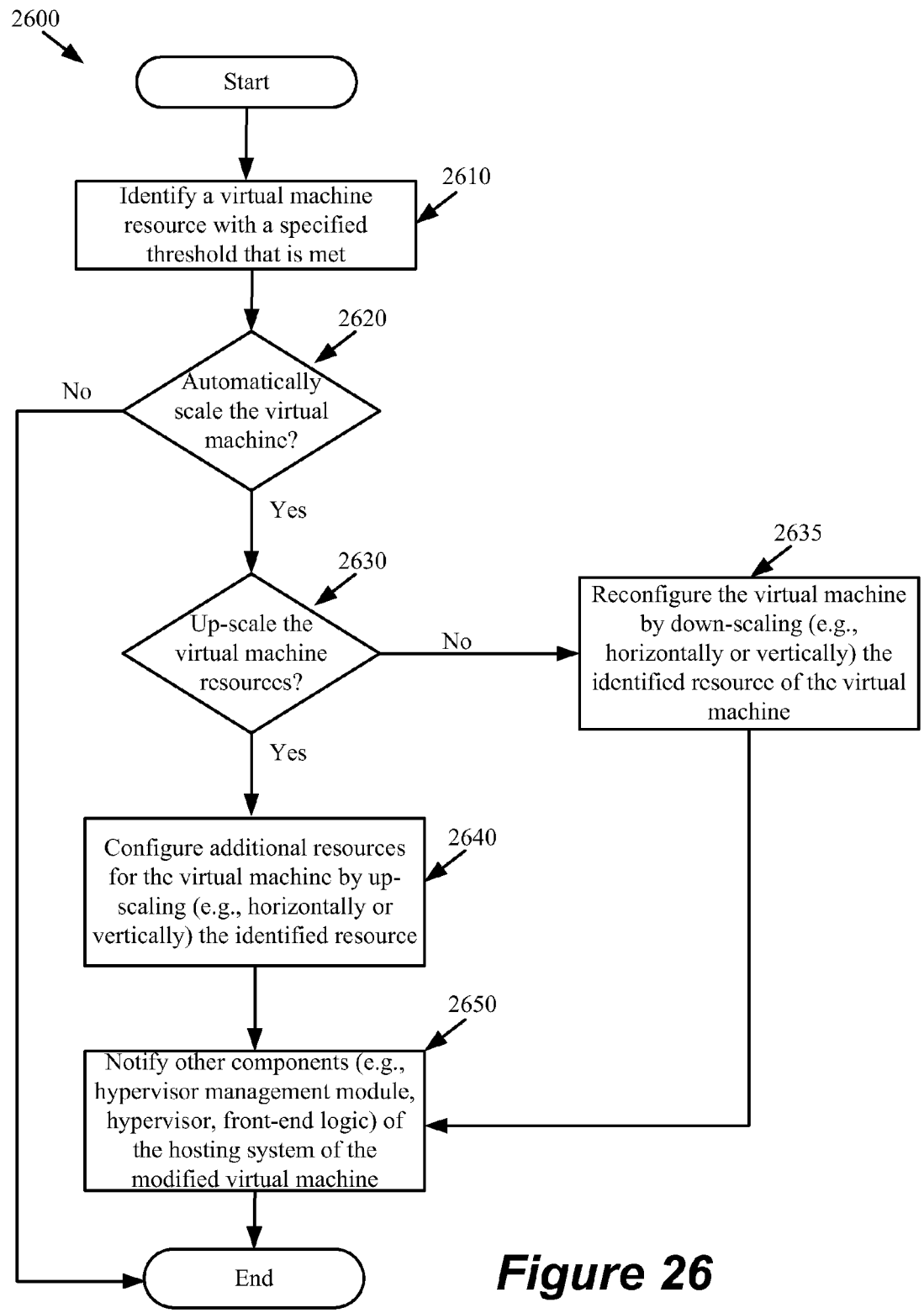
FIG. 26 presents a process performed by a utility management module of some embodiments to automatically scale a user virtual machine when one or more resource thresholds for the virtual machine have been met.

FIG. 26 presents a process 2600 performed by a utility management module of some embodiments to automatically scale a user virtual machine when one or more resource thresholds for the virtual machine have been met. The process 2600 begins by identifying (at 2610) a virtual machine resource with a specified resource threshold that is met at some instance in time during runtime operation of the virtual machine. In some embodiments, the utility management module directly monitors the resources of the virtual machine that a user has specified with the threshold. In other embodiments, the hypervisor management module monitors the virtual machines and the resources of the virtual machine and reports any threshold that is met to the utility management module.

After identifying the resource, the process then determines (at 2620) whether the resource is one that the user desires to be automatically scaled. Should the user not desire the resource to be automatically scaled, the process ends. In some such instances, the user may be notified via an email, text message, or through the front-end logic of the threshold being met so that the user can take manual action to remedy the situation. Should the user desire the resource to be automatically scaled, the process then determines (at 2630) whether to up-scale or down-scale the resource. In some embodiments, this determination is based on whether the threshold that is met is an upper bound threshold that specifies when to up-scale the resource or a lower bound threshold that specifies when to down-scale the resource.

The process up-scales (at 2640) the resource by using the utility management module of some embodiments to horizontally up-scale the resource or vertically up-scale the resource as described above. Similarly, the process down-scales (at 2635) the resource by using the utility management module of some embodiments to horizontally down-scale the resource or vertically down-scale the resource as described above. After scaling the resource, the process notifies other components of the hosting system of the changes to the virtual machine. These components may include the hypervisor management module of some embodiments, the front-end logic of the hosting system that provides the graphical view of the virtual machine to the user, and the hypervisor on the node that manages the resource allocation to the virtual machine. Once the modifications to the virtual machine are complete, the threshold will either be reset or the resource allocation will be such that the threshold is no longer met and the process ends.

D. Optimizing Configuration Install

Figure 27:
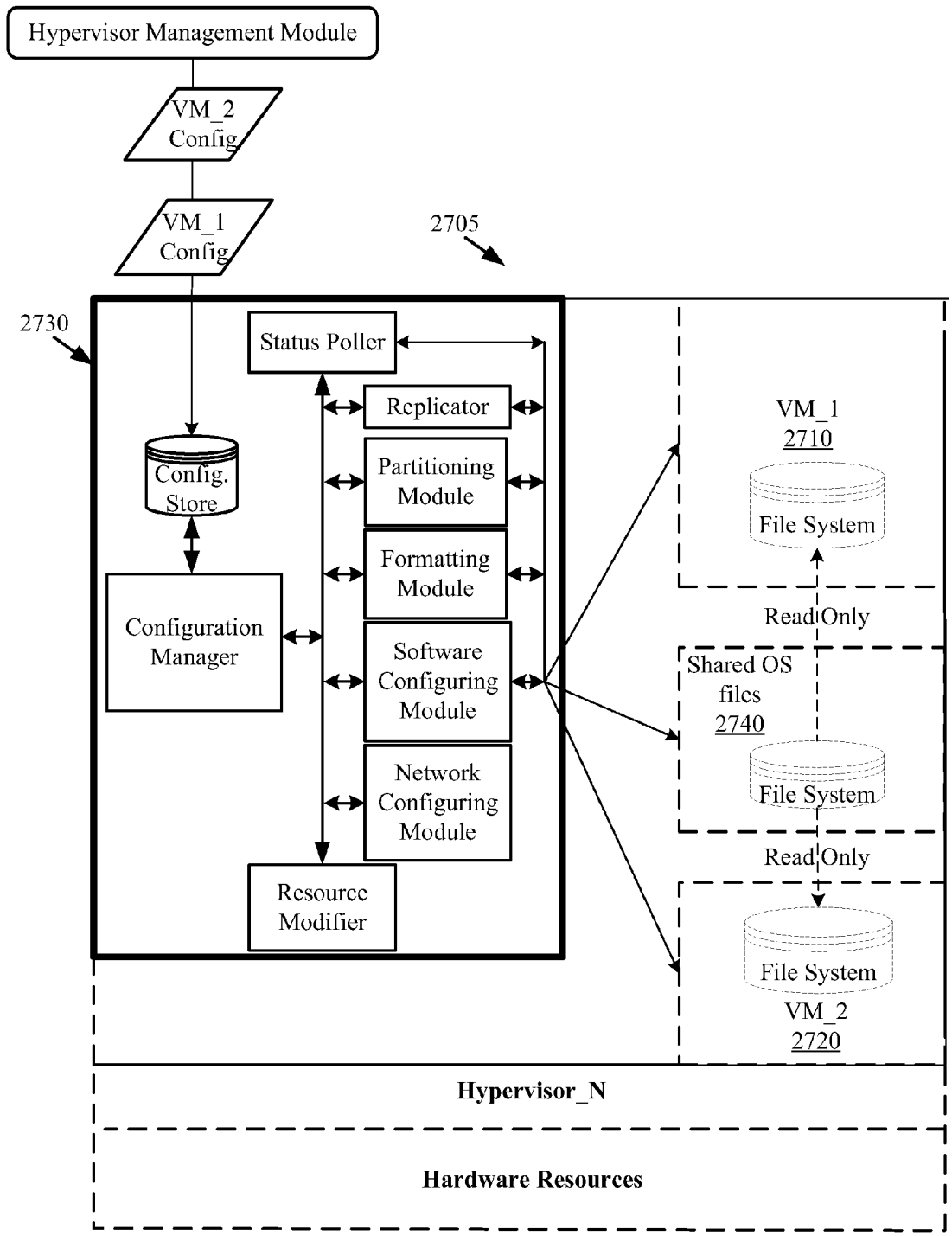
FIG. 27 conceptually illustrates an example of optimizing a virtual machine installation and configuration in accordance with some embodiments of the embodiment.

In some embodiments, the utility management module optimizes virtual machine installation and configuration by minimizing the usage of the node's resources. FIG. 27 conceptually illustrates an example of optimizing a virtual machine installation and configuration in accordance with some embodiments of the embodiment.

FIG. 27 illustrates a node 2705 that is to host two separate virtual machines 2710 and 2720 and a utility management module 2730 that installs and configures each of the virtual machines 2710 and 2720. To optimize the virtual machine installation and configuration, the utility management module 2730 identifies that the multiple virtual machines 2710 and 2720 are configured with the same operating system (e.g., Windows Server 2003). Rather than install a separate version of the operating system for each virtual machine, the utility management module 2730 creates a shared partition 2740 for some or all of the operating system files. Then, the utility management module 2730 installs the non-shareable files for the virtual machines 2710 and 2720 in their separate partitions and configures the virtual machines 2710 and 2720 to access the shared partition 2740 for the shareable files. In some embodiments, the shared files include static operating system files (e.g., network stacks) that are not customized for the virtual machine configurations.

As a result of this optimized virtual machine installation and configuration, the disk space usage on the node is minimized. Additionally, the users who have specified the virtual machines need allocate a smaller amount of their hosting resources to the operating system of their configuration. The unused disk space may then be allocated to other applications or data storage. It should be apparent to one of ordinary skill in the art that such an optimized image installation applies to any application program. For example, rather than create separate installs for the same application program for each virtual machine, some embodiments create a single base install of an application program in a shared partition of the block device that each of the virtual machines may access and saved data or other virtual machine specific files can be stored locally within the virtual machine's own disk partition that is not the shared partition.

Additionally, it should be apparent to one of ordinary skill in the art that certain such optimizations may be carried to other node resources. For example, system memory (e.g., random access memory (RAM)) may store shared operating system files that are required at runtime. In some such embodiments, the utility management module may share this portion of memory amongst multiple virtual machines.

E. Secure Deletion of Virtual Machines

By accessing the file systems within the utility management module's own node, the utility management modules of some embodiments provide automated secure deletion for a virtual server that is removed from the node's resources. For instance, rather than simply reallocating the resources to a different virtual machine, the utility management module of some embodiments writes random data to the file system (i.e., overwrites the values stored on a physical storage) such that subsequent configurations on the file system will be unable to extract any of the previously stored data. Alternatively, some embodiments perform the secure deletion by "zeroing out" the bits of the previously allocated file system.

Figure 28:
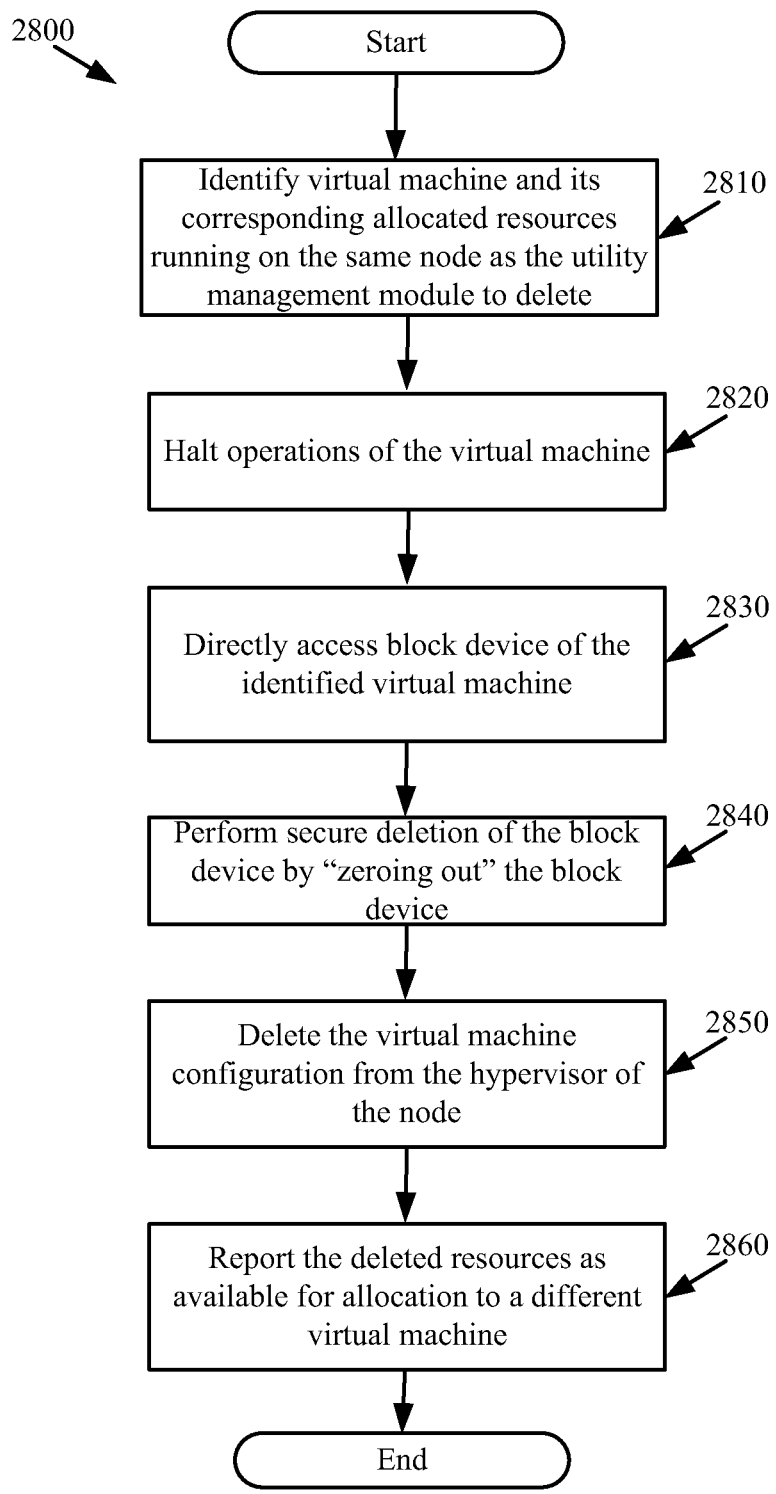
FIG. 28 presents a process for securely deleting a virtual machine automatically using a utility management module of some embodiments.

FIG. 28 presents a process 2800 for securely deleting a virtual machine automatically using a utility management module of some embodiments. The process 2800 begins when a utility management module operating at a node of a hosting system is directed to securely delete a virtual machine on the same node. Specifically, the process identifies the virtual machine (at 2810) to be deleted and the corresponding set of resources allocated to the virtual machine.

The process then stops (at 2820) the virtual machine's operations through a set of override commands that turn-off the virtual machine. The process accesses (at 2830) the block device of the virtual machine and performs (at 2840) a secure deletion of the virtual machine configuration and data. To perform the secure deletion, the process writes sets of random data to the disk storage (i.e., block device) ensuring that none of the customer's data remains on the disk storage before the disk storage is allocated to another customer.

The process removes (at 2850) other resources allocated to the virtual machine and deletes the virtual machine from the hypervisor controlling the node's resources. The process then reports (at 2860) the released set of resources back to the hypervisor management module and the process ends. The released resources are mapped to the pool of available hosting resources of the hosting system provider where the resources may be allocated to other virtual machines hosted by the hosting system provider.

Without the secure deletion performed by some embodiments, the virtual machine is removed, but the data physically remains on the disk device. The disk storage storing the previous user's data may then be allocated for use by a second virtual machine. Thereafter, the newly allocated second virtual machine may scan the block device providing the disk storage and extract the undeleted data. However, by using the automated secure deletion functionality provided by the utility management module of some embodiments, the data is never accessible by subsequent virtual machines ensuring customer privacy.

F. Virtual Machine Migration

Figure 29:
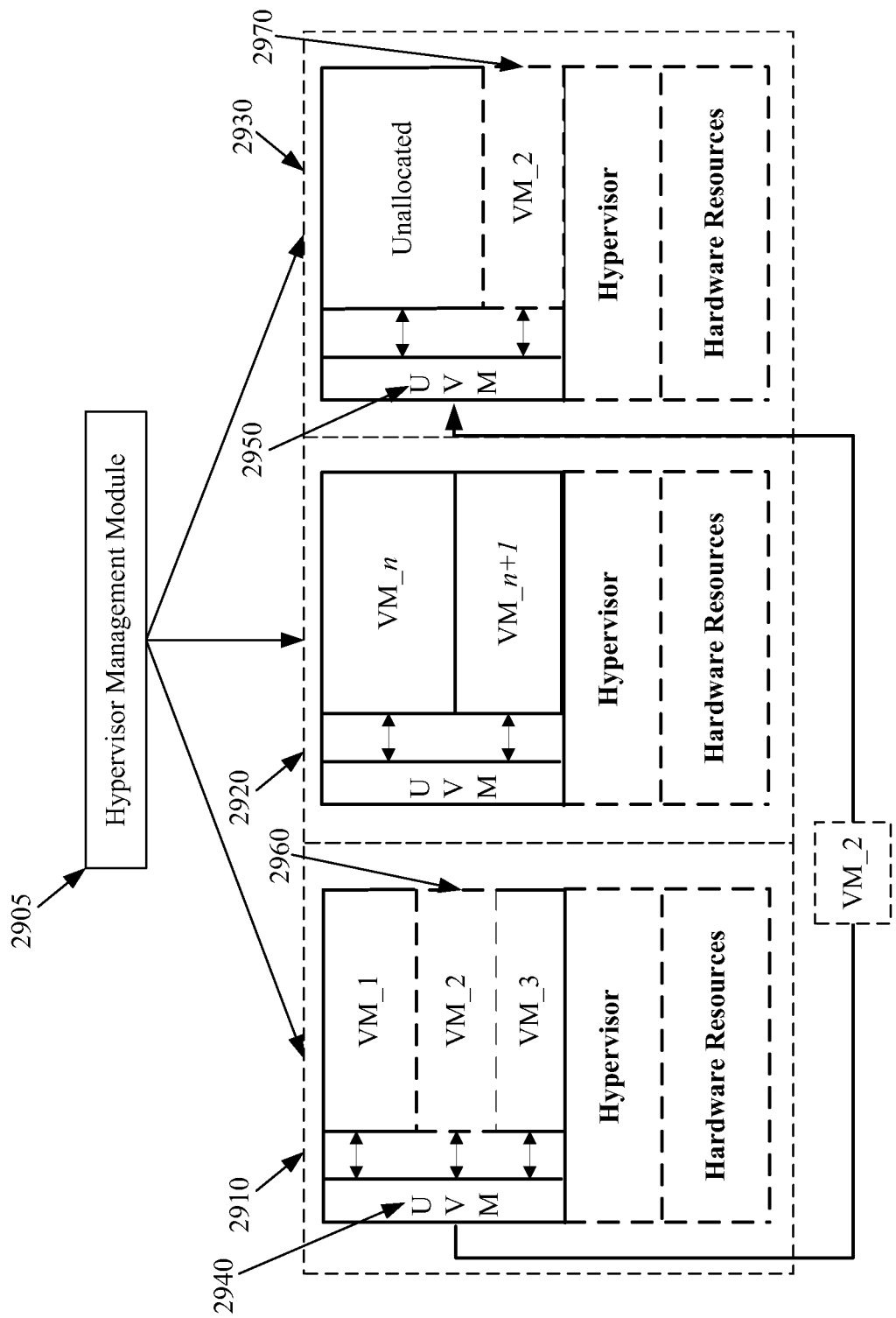
FIG. 29 illustrates an interfacing between utility management modules in order to migrate a virtual machine configuration from one node to another.

In addition to accessing file systems within the utility management module's own node and the image store, some embodiments allow utility management modules access to each other. FIG. 29 illustrates the interfacing between utility management modules in order to migrate a virtual machine configuration from one node to another. In this figure, the grid of nodes includes three nodes 2910, 2920, and 2930 with the utility management module 2940 of node 2910 communicating with the utility management module 2950 of node 2930 in order to reallocate and reconfigure configuration 2960 onto node 2930.

In some embodiments, the hypervisor management module 2905 initiates the migration. To do so, the hypervisor management module 2905 first instructs a hypervisor of the destination node 2930 to allocate sufficient resources for the virtual machine that is to be migrated. These instructions may include allocating processing resources, memory, etc. The hypervisor management module 2905 then instructs the utility management module 2940 to transfer the virtual machine 2960 from node 2910 to node 2930. The utility management module 2940 initiates the transfer by communicating with the utility management module 2950 of node 2930 and the configuration for the virtual machine 2960 is transferred from node 2910 to node 2930 where it is reconfigured to operate as virtual machine 2970.

Figure 30:
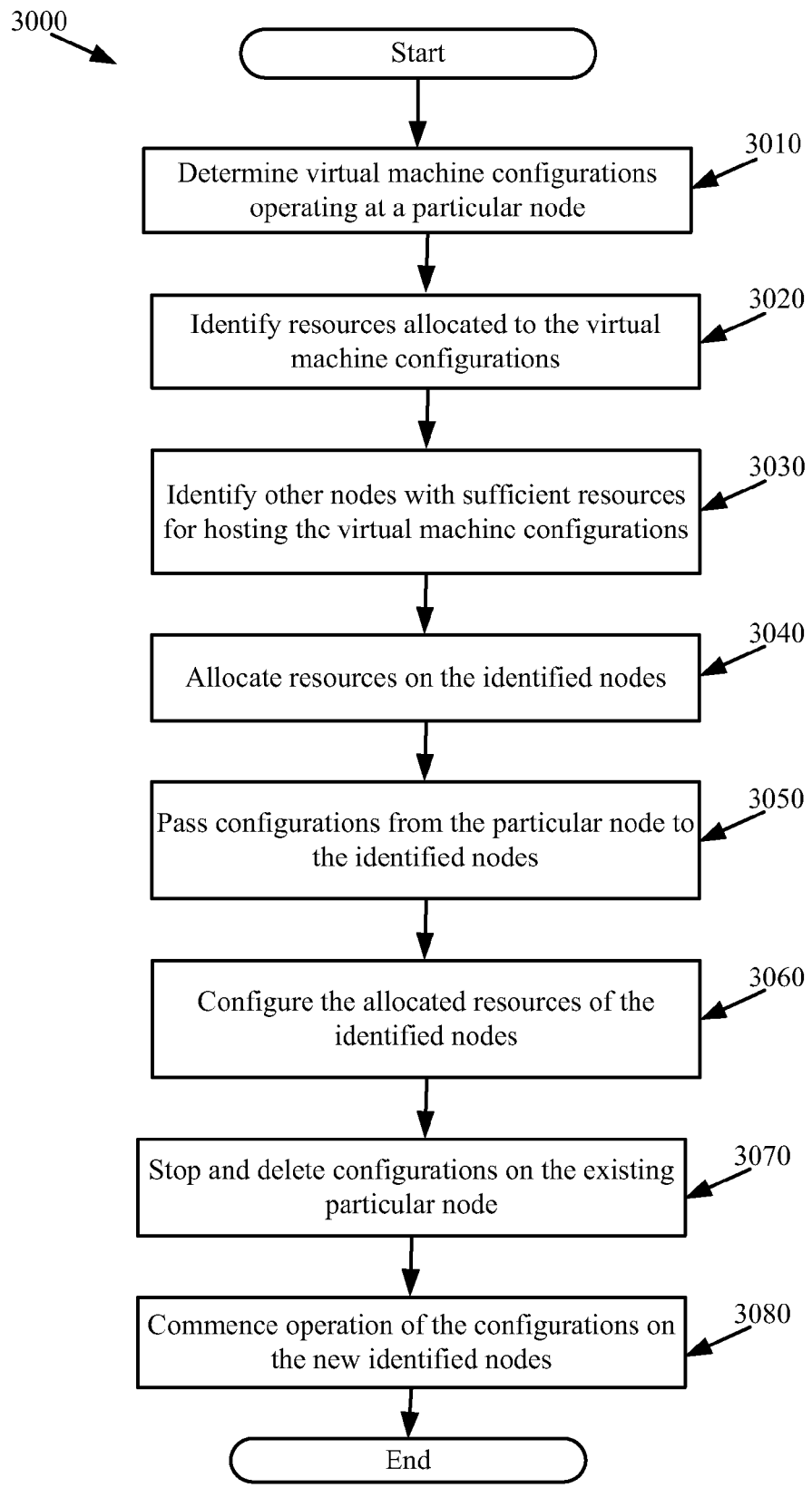
FIG. 30 presents a process for migrating a virtual machine from a first node to a second node in a grid of nodes in accordance with some embodiments.

FIG. 30 presents a process 3000 for migrating a virtual machine from a first node to a second node in a grid of nodes in accordance with some embodiments. The process 3000 begins by determining (at 3010) one or more configurations for virtual machines at a particular node that are to be migrated over to a different node. In some embodiments, determining the configuration involves identifying (at 3020) the software resources and particular configuration parameters for the virtual machines. Additionally, in determining the configuration, the process also identifies (at 3020) the physical resources allocated to each of the virtual machines.

The process then attempts to locate a suitable host for the configurations by identifying (at 3030) other nodes with sufficient available resources to host the migrating virtual machines. This may occur via services provided by the hypervisor management module of some embodiments. The hypervisor management module retains a complete view of the available and unavailable resources of the grid of nodes and is therefore able to quickly identify the replacement nodes. In some embodiments, one or more different nodes are identified for each virtual machine. The process allocates (at 3040) resources of the identified nodes in a manner that maximizes the hosting capabilities of the nodes. The configuration for each particular virtual machine is then passed (at 3050) to the corresponding new host node in order to configure (at 3060) the allocated resources.

In order to complete the migration, the process stops (at 3070) the operation of the previous virtual machines and deletes the previous virtual machines. At the same time, the process commences (at 3080) the operation of the newly configured nodes completing the migration process.

In some embodiments, such virtual machine migration is useful in order to avoid downtime when a node within the grid of nodes is malfunctioning. Rather than suspend the operation of all virtual machines on that node, some embodiments identify other nodes within the grid of nodes with sufficient available resources to temporarily or permanently host the one or more virtual machine configurations on the failed node. In some embodiments, the utility management modules leverage the functionality of the hypervisor management module to identify the nodes with the available resources and to communicate with the other nodes in order to allocate the resources necessary for the migration.

Such virtual machine migration is also useful when upgrading a node with additional functional components (i.e., additional memory or disk storage) or upgrading a configuration where the node currently hosting the configuration runs out of available resources to satisfy the upgrade. For instance, a particular configuration on a first node is allocated two gigabytes of memory. However, at a subsequent time, the user modifies the configuration to request four gigabytes of memory. If the node on which the configuration currently operates only has an additional one gigabyte of free memory, then either a portion of the configuration or the entire configuration must be migrated to a different node with the necessary free memory resources.

V. Computer System

Many of the above-described processes and modules are implemented as software processes that are specified as a set of instructions recorded on a computer readable hardware medium (also referred to as computer readable medium or a computer readable storage medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable hardware media are described below in greater detail.

In this specification, the term "software" is meant in its broadest sense. It can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 31:
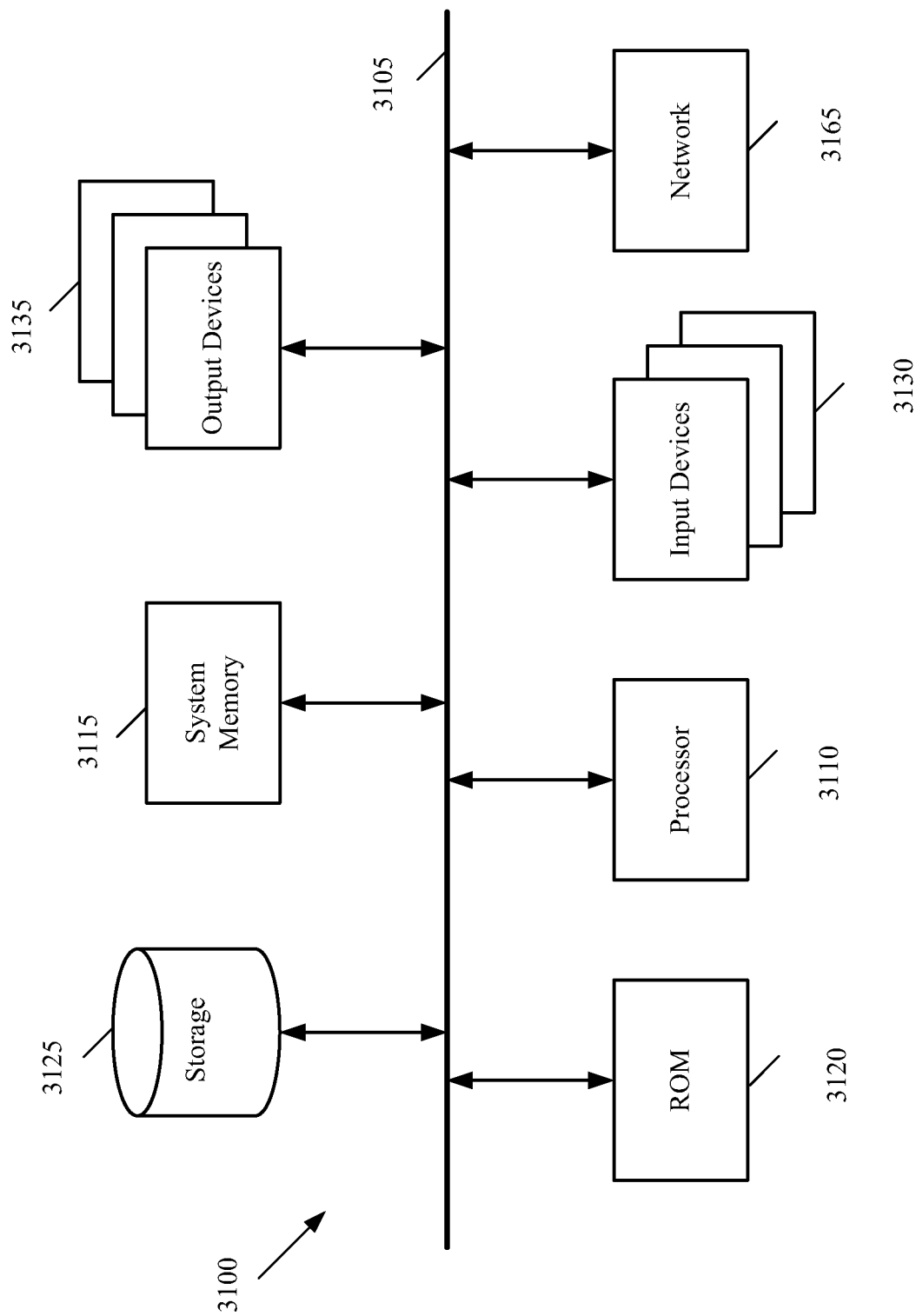
FIG. 31 illustrates a computer system with which some embodiments of the invention are implemented.

FIG. 31 illustrates a computer system with which some embodiments of the invention are implemented. Such a computer system includes various types of computer readable hardware media and interfaces for various other types of computer readable hardware media that implement the various processes and modules described above (e.g., hypervisor management module and utility management modules). Computer system 3100 includes a bus 3105, a processor 3110, a system memory 3115, a read-only memory 3120, a permanent storage device 3125, input devices 3130, and output devices 3135.

The bus 3105 collectively represents all system, peripheral, and chipset buses that communicatively connect the numerous internal devices of the computer system 3100. For instance, the bus 3105 communicatively connects the processor 3110 with the read-only memory 3120, the system memory 3115, and the permanent storage device 3125. From these various memory units, the processor 3110 retrieves instructions to execute and data to process in order to execute the processes of the invention. The processor 3110 is a processing device such as electronic circuitry.

The read-only-memory (ROM) 3120 stores static data and instructions that are needed by the processor 3110 and other modules of the computer system. The permanent storage device 3125, on the other hand, is a read-and-write memory device. This device is a non-volatile memory unit that stores instructions and data even when the computer system 3100 is off. Some embodiments of the invention use a mass-storage device (such as a magnetic or optical disk and its corresponding disk drive) as the permanent storage device 3125.

Some other embodiments use a removable storage device (such as a floppy disk, flash drive, read-only compact discs (CD-ROM), read-only digital versatile discs (e.g., DVD-ROM, dual-layer DVD-ROM), or ZIP® disks) as the permanent storage device. Like the permanent storage device 3125, the system memory 3115 is a read-and-write memory device. However, unlike storage device 3125, the system memory is a volatile read-and-write memory, such a random access memory (RAM). The system memory stores some of the instructions and data that the processor needs at runtime. In some embodiments, the invention's processes are stored in the system memory 3115, the permanent storage device 3125, and/or the read-only memory 3120. Some other examples of such computer readable hardware media include rewritable compact discs (CD-RW), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, any other optical or magnetic media, and floppy disks.

The ROM 3120, system memory 3115, permanent storage device 3125, and other above enumerated physical storage devices of the computer system 3100, collectively or separately, represent the computer readable hardware medium of each of the hypervisor management module of some embodiments, utility management modules of some embodiments, and the nodes of some embodiments.

In some embodiments, the computer readable hardware media stores the processes and executable instructions that implement the functionality of the hypervisor management module. For example, the computer readable hardware media stores the processes for generating the provisioning messages and the control messages used by the hypervisor management module in order to control operation of the grid of nodes.

Similarly, in some embodiments, the computer readable hardware media stores the processes and executable instructions that implement the functionality of the utility management module. For example, the computer readable hardware media stores the scripts that define the customizations that the utility management module performs to a retrieved software image in order to generate a virtual machine that is customized according to user specifications.

As used in this specification and any claims of this application, the term computer readable hardware medium is entirely restricted to tangible, physical objects that store information in a form that is readable by a computer. These terms exclude any wireless signals, wired download signals, and any other ephemeral signals. However, such signals may define other forms of non-computer readable medium.

The bus 3105 also connects to the input and output devices 3130 and 3135. The input devices enable the user to communicate information and select commands to the computer system. The input devices 3130 include alphanumeric keyboards and pointing devices (also called "cursor control devices"). The input devices 3130 also include audio input devices (e.g., microphones, MIDI musical instruments, etc.). The output devices 3135 display images generated by the computer system. For instance, these devices display a GUI. The output devices include printers and display devices, such as cathode ray tubes (CRT) or liquid crystal displays (LCD).

Finally, as shown in FIG. 31, bus 3105 also couples computer 3100 to a network 3165 through a network adapter (not shown). In this manner, the computer can be a part of a network of computers (such as a local area network ("LAN"), a wide area network ("WAN"), or an Intranet, or a network of networks, such as the Internet. For example, the computer 3100 may be coupled to a web server (network 3165) so that a web browser executing on the computer 3100 can interact with the web server as a user interacts with a GUI that operates in the web browser.

Any or all components of computer system 3100 may be used in conjunction with the invention. Though type 1 or type 2 hypervisors are shown in some of the various figures, it should be apparent to one of ordinary skill in the art that any type of hypervisor may operate with the various components of some embodiments, such as the hypervisor management module and the utility management module.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A virtual machine hosting system comprising:
    a plurality of nodes, each node comprising resources for hosting at least one virtual machine;
    a centralized hypervisor management module, separate from the nodes, that interfaces with the plurality of nodes, the hypervisor management module for automatedly provisioning resources of the plurality of nodes to a plurality of virtual machines by identifying a particular node with sufficient available resources to host a particular user-specified virtual machine configuration and by allocating to the virtual machine configuration an amount of resources of the particular node required to host said virtual machine configuration; and
    at the particular node, a utility management module operating as a virtual machine on the particular node, the utility management module for receiving the user-specified virtual machine configuration from the hypervisor management module and for configuring the allocated resources of the particular node to configure the virtual machine as specified within the user-specified virtual machine configuration, wherein the utility management module and the configured virtual machine operate on a same hypervisor on the particular node.

2. The virtual machine hosting system of claim 1 further comprising an image store for storing a plurality of software images for use by the utility management module to configure the allocated resources of the particular node.

3. The virtual machine hosting system of claim 1, wherein the utility management module is for configuring the allocated resources by partitioning disk storage of the allocated resources.

4. The virtual machine hosting system of claim 3, wherein the utility management module is further for configuring the allocated resources by installing a software image to the partitioned disk storage.

5. The virtual machine hosting system of claim 1, wherein the plurality of nodes are distributed across multiple geographic regions.

6. The virtual machine hosting system of claim 1, wherein the plurality of nodes comprises a plurality of server computers managed by the hypervisor management module.

7. The virtual machine hosting system of claim 1, wherein the plurality of nodes are located at a single geographic location.

8. The virtual machine hosting system of claim 1, wherein the hypervisor management module identifies the particular node by monitoring resource usage of the plurality of nodes in order to generate a mapping of available resources for nodes of the plurality of nodes.

9. The virtual machine hosting system of claim 1, wherein each of the plurality of nodes further comprises one of a plurality of different hypervisors for facilitating access to resources of a node for the virtual machines, wherein the hypervisor management module is for provisioning resources of a node by interfacing with a hypervisor of the node to instruct the hypervisor to allocate a set of resources.

10. A method for automatedly deploying a plurality of virtual machines to a plurality of nodes of a hosting system, the method comprising:
    providing a hypervisor management module for operation on a centralized set of servers, the hypervisor management module for (i) interfacing with each particular node of the plurality of nodes and (ii) automatedly provisioning resources of the plurality of nodes to the plurality of virtual machines by identifying a particular node with sufficient available resources to host a user-specified virtual machine configuration and by allocating to the virtual machine configuration, an amount of resources of the particular node required to host said virtual machine configuration; and providing a utility management module for operation as a virtual machine on the particular node separate from the user-specified virtual machines hosted on the particular node, the utility management module for receiving the user-specified virtual machine configuration from the hypervisor management module and for configuring the allocated resources of the particular node to configure the virtual machine as specified within the user-specified virtual machine configuration.

11. The method of claim 10, wherein the plurality of nodes are distributed across multiple geographic regions.

12. The method of claim 10, wherein the plurality of nodes comprise a plurality of server computers managed by the hypervisor management module.

13. The method of claim 10, wherein the plurality of nodes are located at a single geographic location.

* * * * *